US012044992B2

(12) United States Patent
Minoshima et al.

(10) Patent No.: US 12,044,992 B2
(45) Date of Patent: Jul. 23, 2024

(54) IMAGE-FORMING APPARATUS PROVIDED WITH MECHANISM FOR OPENING AND CLOSING SHUTTER OF FIXING DEVICE

(71) Applicant: BROTHER KOGYO KABUSHIKI KAISHA, Nagoya (JP)

(72) Inventors: Saya Minoshima, Gifu (JP); Tomonori Watanabe, Ichinomiya (JP); Yuichi Ikeno, Maibara (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 18/160,503

(22) Filed: Jan. 27, 2023

(65) Prior Publication Data

US 2023/0280675 A1 Sep. 7, 2023

(30) Foreign Application Priority Data

Jan. 31, 2022 (JP) ................................ 2022-013694
Jan. 31, 2022 (JP) ................................ 2022-013695
Apr. 1, 2022 (JP) ................................ 2022-062133

(51) Int. Cl.
*G03G 15/20* (2006.01)
*G03G 15/00* (2006.01)
(Continued)

(52) U.S. Cl.
CPC ..... *G03G 15/2028* (2013.01); *G03G 15/2017* (2013.01); *G03G 15/657* (2013.01);
(Continued)

(58) Field of Classification Search
CPC .......... G03G 15/2017; G03G 15/2028; G03G 15/657; G03G 21/1842; G03G 21/1853; G03G 2215/00413; G03G 2221/1884
(Continued)

(56) References Cited

U.S. PATENT DOCUMENTS 5,732,309 A * 3/1998 Okuno .............. G03G 15/2003 399/68
8,478,176 B2 * 7/2013 Tagami .............. G03G 15/2003 399/322
(Continued)

FOREIGN PATENT DOCUMENTS

JP 2012-230297 A 11/2012
JP 2012230297 A * 11/2012
(Continued)

*Primary Examiner* — Robert B Beatty
(74) *Attorney, Agent, or Firm* — Merchant & Gould P.C.

(57) ABSTRACT

An image-forming apparatus includes a housing, a cartridge, and a fixing device. The fixing device includes a heating member, a fixing frame, and a shutter movable between an open position for opening an opening of the fixing frame and a closed position for closing the opening. The housing includes: a guide frame for guiding a guide protrusion of the cartridge for attachment of the cartridge to the housing; and a connection link connected to the shutter and positioned opposite the cartridge with respect to the guide frame. The connection link moves the shutter to the open position in conjunction with the attachment of the cartridge to the housing, and moves the shutter to the closed position in conjunction with detachment of the cartridge from the housing. The connection link abuts on the guide protrusion through a through-hole of the guide frame during the attachment of the cartridge to the housing.

19 Claims, 40 Drawing Sheets

(51) Int. Cl.

| | |
|---|---|
| ***G03G 21/00*** | (2006.01) |
| ***G03G 21/18*** | (2006.01) |
| *G03G 15/08* | (2006.01) |
| *G03G 21/16* | (2006.01) |

(52) U.S. Cl.
CPC ..... *G03G 21/1853* (2013.01); *G03G 15/0886* (2013.01); *G03G 21/1685* (2013.01); *G03G 2215/00413* (2013.01); *G03G 2215/0692* (2013.01); *G03G 2221/1684* (2013.01); *G03G 2221/1884* (2013.01)

(58) Field of Classification Search
USPC .......................................... 399/111, 122, 400
See application file for complete search history.

(56) References Cited

U.S. PATENT DOCUMENTS

| | | | | |
|---|---|---|---|---|
| 9,671,745 | B2 * | 6/2017 | Maeda | G03G 21/1633 |
| 2004/0052548 | A1 * | 3/2004 | Shimizu | G03G 15/2028<br>399/122 |
| 2019/0163103 | A1 | 5/2019 | Iizuka | |
| 2019/0163121 | A1 | 5/2019 | Wada et al. | |
| 2019/0286023 | A1 * | 9/2019 | Cho | G03G 15/2017 |
| 2021/0318657 | A1 | 10/2021 | Johnson, Jr. | |
| 2021/0389692 | A1 * | 12/2021 | Oguni | G03G 21/1853 |
| 2023/0082752 | A1 * | 3/2023 | Toyota | G03G 15/2017<br>399/328 |

FOREIGN PATENT DOCUMENTS

| | | | |
|---|---|---|---|
| JP | 2019-095643 | A | 6/2019 |
| JP | 2019-101165 | A | 6/2019 |
| JP | 2021-173918 | A | 11/2021 |

* cited by examiner

IMAGE-FORMING APPARATUS PROVIDED WITH MECHANISM FOR OPENING AND CLOSING SHUTTER OF FIXING DEVICE

REFERENCE TO RELATED APPLICATIONS

This application claims priorities from Japanese Patent Application Nos. 2022-013694 filed on Jan. 31, 2022, 2022-013695 filed on Jan. 31, 2022, and 2022-062133 filed on Apr. 1, 2022. The entire contents of the priority applications are incorporated herein by reference.

BACKGROUND ART

In a conventional image-forming apparatus, a shutter is provided in front of a fixing device incorporating a heating member in order to prevent a user's hand from touching the fixing device.

There has been known a conventional image-forming apparatus including a link member connected to the shutter and configured to abut on a cartridge attached to the image-forming apparatus. The link member abuts on the cartridge upon attachment of the cartridge, so that the link member can be moved together with the cartridge to open the shutter in accordance the movement of the link member. Upon detachment of the cartridge, the link member is urged to move in an opposite direction due to an urging force of a spring, thereby closing the shutter. In a state where the cartridge is attached to the image-forming apparatus, the cartridge is kept in contact with the link member.

DESCRIPTION

In the above-described conventional image-forming apparatus including the link member connected to the shutter, in a case where the link member is positioned in an accommodation space for accommodating the cartridge, conceivably, a user may contact the link member when detaching the cartridge from the accommodation space. Such user's contact with the link member may result in accidental opening of the shutter.

Further, in the above-described conventional image-forming apparatus, the attached cartridge is kept in contact with the link member connected to the movable shutter. In this configuration, there is a likelihood that unnecessary force may be imparted on the attached cartridge from the link member, which may cause degradation in printing accuracy.

Still further, in the above-described conventional image-forming apparatus, the shutter is configured to be opened and closed in interlocking relation to the movement of the cartridge which is subject to user's operations. Specifically, according to this conventional image-forming apparatus, the shutter is configured to about on a restricting portion of the device body to restrict further rotation of the shutter when the shutter is opened. However, since nothing is known as to how the shutter is closed, conceivably, the shutter may not be accurately moved to its closed position.

In view of the foregoing, it is an object of the disclosure to provide an image-forming apparatus having a structure for opening and closing a shutter in conjunction with attachment and detachment of a cartridge, and capable of suppressing accidental opening of the shutter.

It is another object of the present disclosure to provide an image-forming apparatus capable of reducing a likelihood that the structure for opening and closing the shutter in conjunction with attachment and detachment of a cartridge may have any adverse effects in printing accuracy.

It is still another object of the present disclosure to provide an image-forming apparatus including a shutter configured to open and close in interlocking relation to the movement of a movable member which is subject to user's operation (such as a cartridge and a front cover, for example), and capable of accurately moving the shutter to its closed position.

In order to attain the above and other object, according to one aspect, the present disclosure provides an image-forming apparatus including: a housing; a cartridge attachable to and detachable from the housing; and a fixing device configured to fix a toner image to a sheet conveyed in a sheet conveying direction. The cartridge has a guide protrusion. The fixing device includes: a heating member; a fixing frame covering the heating member; and a shutter. The fixing frame has an opening positioned upstream relative to the heating member in the sheet conveying direction. The shutter is movable between an open position where the shutter opens the opening and a closed position where the shutter closes the opening. The housing includes: a guide frame; and a connection link. The guide frame is configured to guide the guide protrusion for attachment of the cartridge to the housing. The guide frame has a through-hole. The connection link is connected to the shutter and is configured to move the shutter from the closed position to the open position in conjunction with the attachment of the cartridge to the housing, and to move the shutter from the open position to the closed position in conjunction with detachment of the cartridge from the housing. The connection link is positioned opposite the cartridge attached to the housing with respect to the guide frame. The connection link is configured to abut on the guide protrusion of the cartridge through the through-hole during the attachment of the cartridge to the housing.

This configuration can restrain the user from touching the connection link after the cartridge is detached from the housing. Accordingly, unexpected opening of the shutter attributed to the movement of the connection link can be suppressed.

According to another aspect, the present disclosure also provides an image-forming apparatus including: a housing; a cartridge attachable to and detachable from the housing; a fixing device configured to fix a toner image to a sheet conveyed in a sheet conveying direction; and a connection link. The cartridge is configured to be inserted in an inserting direction thereof into the housing from an attachment starting position to an attachment position for attachment to the housing. A leading end of the cartridge in the inserting direction is inserted in the housing at the attachment starting position, and the cartridge is completely attached to the housing at the attachment position. The fixing device includes: a heating member; a fixing frame covering the heating member; and a shutter. The fixing frame has an opening positioned upstream relative to the heating member in the sheet conveying direction. The shutter is movable between an open position where the shutter opens the opening and a closed position where the shutter closes the opening. The connection link is connected to the shutter and is configured to move the shutter from the closed position to the open position in conjunction with attachment of the cartridge to the housing, and to move the shutter from the open position to the closed position in conjunction with detachment of the cartridge from the housing. The cartridge is configured to abut on and move the connection link to move the shutter from the closed position to the open position in a process where the cartridge moves from the attachment starting position toward the attachment position in the inserting direction. The cartridge is configured to be separated from the connection link when the cartridge arrives at the attachment position after the shutter moves to the open position.

With this structure, since the cartridge at the attachment position is separated from the connection link, the cartridge attached to the housing is less likely to be applied with unnecessary force from the connection link. Accordingly, the structure for opening and closing the shutter in accordance with attachment and detachment of the cartridge can have little adverse effects on printing precision.

According to still another aspect, the present disclosure also provides an image-forming apparatus including: a fixing device configured to fix a toner image to a sheet conveyed in a sheet conveying direction; and an opening/closing link. The fixing device includes: a heating member; a pressing member configured to nip the sheet in cooperation with the heating member; a fixing frame covering the heating member and the pressing member; and a shutter. The fixing frame has an opening positioned upstream of the heating member in the sheet conveying direction. The fixing frame has a first abutment surface. The shutter is movable between a closed position where the shutter closes the opening and an open position where the shutter opens the opening. The shutter is configured to abut on the first abutment surface at the closed position. The opening/closing link is connected to the shutter and is configured to move the shutter between the open position and the closed position. The opening/closing link is movable in a first direction to move the shutter to the closed position and in a second direction opposite the first direction to move the shutter to the open position. In a case where the shutter abuts on the first abutment surface to be placed at the closed position, the opening/closing link is further movable in the first direction while the shutter is maintained at the closed position.

With this structure, when the opening/closing link is urged in the first direction while the shutter is at the closed position due to the abutment of the shutter on the first abutment surface, only the opening/closing link can move in the first direction W1 while the shutter no longer moves further in the first direction. Accordingly, since the shutter at the closed position is constantly in abutment with the first abutment surface, the shutter can be stably held at the closed position with accuracy.

1. FIRST EMBODIMENT

Hereinafter, an image-forming apparatus 1 according to a first embodiment of the present disclosure will be described with reference to FIGS. 1 through 21.

<Outline of Image-Forming Apparatus 1>

Figure 1:
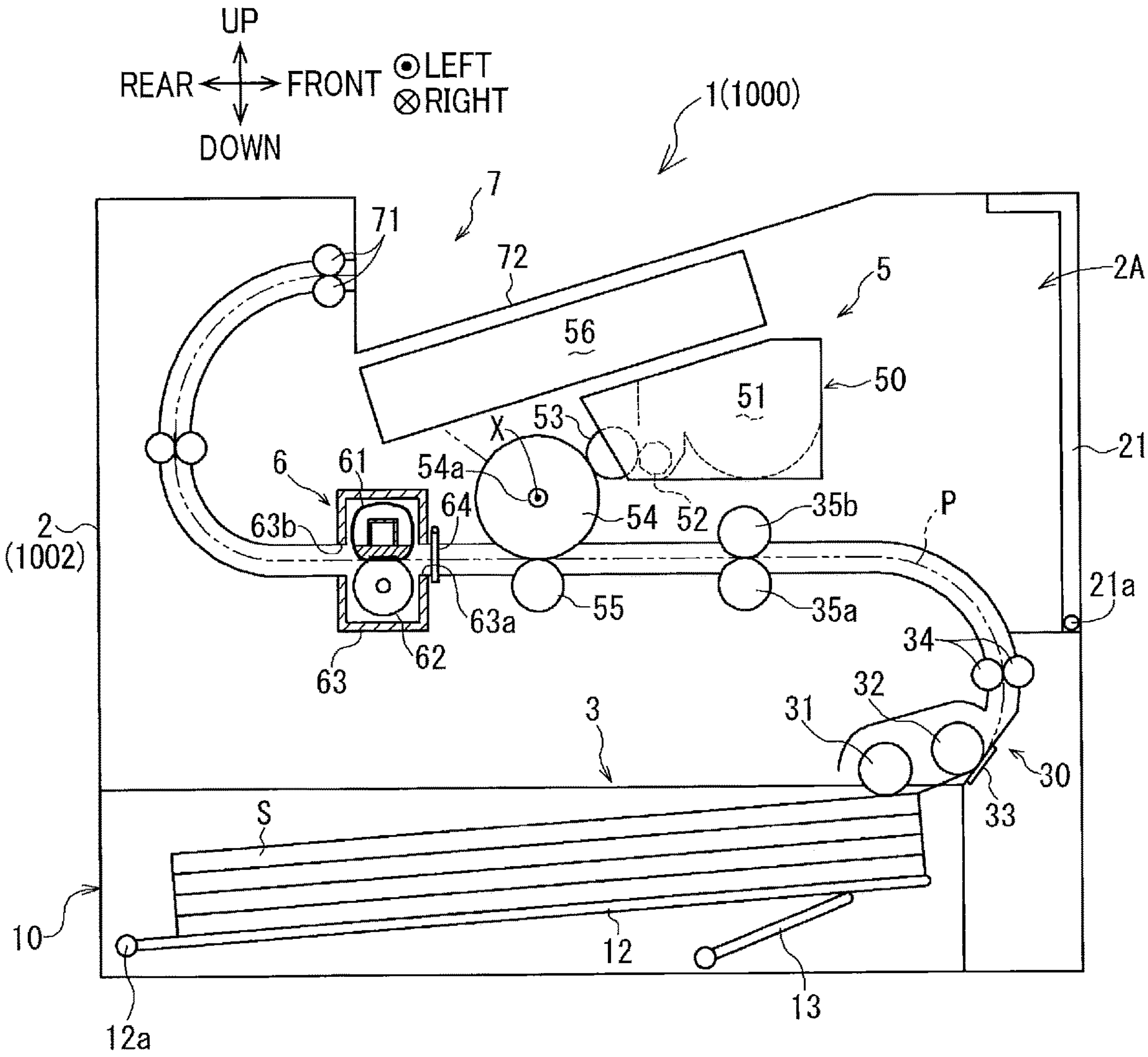
FIG. 1 is a schematic cross-sectional view of an image-forming apparatus according to a first embodiment taken along a vertical plane passing through a widthwise center of the image-forming apparatus.

The image-forming apparatus 1 illustrated in FIG. 1 is an electrophotographic-type laser printer configured to form an image on a sheet S.

In the following description, the right side and the left side of FIG. 1 will be defined as a front side and a rear side of the image-forming apparatus 1, respectively, and the near side and the far side of FIG. 1 will be defined as a left side and a right side of the image-forming apparatus 1, respectively. Further, the upper side and the lower side of FIG. 1 will be defined as an upper side and a lower side of the image-forming apparatus 1, respectively.

The image-forming apparatus 1 includes a housing 2, a sheet supplying unit 3, an image forming unit 5, a fixing device 6, and a sheet discharge unit 7.

The housing 2 houses therein the sheet supplying unit 3, the image forming unit 5, the fixing device 6, and the sheet discharge unit 7. The housing 2 has a front surface where an opening 2A is open. The housing 2 has a front cover 21 configured to open and close the opening 2A. The front cover 21 has a lower end defining a pivot axis 21*a*. The front cover 21 is pivotally movable about the pivot axis 21*a* between a closed position where the front cover 21 closes the opening 2A and an open position where the front cover 21 opens the opening 2A.

The sheet supplying unit 3 includes a sheet supply tray 10 configured to support a stack of the sheets S, a sheet pick-up unit 30, a pair of conveyor rollers 34, and a registration roller 35*a*. The sheet supplying unit 3 is positioned at a lower internal portion of the housing 2, and is configured to convey the sheet S supported on the sheet supply tray 10 to the image forming unit 5. The image-forming apparatus 1 defines a sheet conveying passage P extending from the sheet supplying unit 3 to the sheet discharge unit 7 via the image forming unit 5.

The sheet supply tray 10 includes a lifter plate 12 and a pressure plate 13. The lifter plate 12 is a plate-like member for supporting the sheets S from below. The lifter plate 12 is pivotally movable about a pivot axis 12*a* defined at a rear end portion thereof. The lifter plate 12 is movable upward and downward between an ascent position and a descent position by the pivotal movement about the pivot axis 12*a*. The pressure plate 13 is positioned below the lifter plate 12 and is configured to move the lifter plate 12 up and down between the ascent position and the descent position.

The sheet pick-up unit 30 is a conveying mechanism configured to pick-up one sheet S from the stack of sheets S supported on the sheet supply tray 10 and to convey the sheet S toward the image forming unit 5. The sheet pick-up unit 30 includes a pick-up roller 31, a separation roller 32, and a separation pad 33.

The pick-up roller 31 is configured to pick-up the sheets S supported on the sheet supply tray 10 and to convey the sheets S toward the separation roller 32. The separation roller 32 is positioned downstream of the pick-up roller 31 in a sheet conveying direction. The separation pad 33 is positioned to face the separation roller 32 and is urged toward the separation roller 32.

The sheets S conveyed by the pick-up roller 31 toward the separation roller 32 are separated one by one at a position between the separation roller 32 and the separation pad 33. Each separated sheet S is then fed into the sheet conveying passage P.

The sheet S fed to the sheet conveying passage P is then conveyed to the image forming unit 5 by the pair of conveyor rollers 34, the registration roller 35*a*, and a pinch roller 35*b* (described later) facing the registration roller 35*a*. The registration roller 35*a* is configured to regulate a leading end of the sheet S to temporarily stop the same, and then to convey the sheet S toward the image forming unit 5 at a prescribed timing.

The image forming unit 5 is positioned downstream of the sheet supplying unit 3 in the sheet conveying direction. The image forming unit 5 is configured to form an image on the sheet S conveyed from the sheet supplying unit 3. The image forming unit 5 includes a process cartridge 50, a transfer roller 55, and an exposing device 56.

The process cartridge 50 is configured to transfer an image on the sheet S conveyed from the sheet supplying unit 3. The process cartridge 50 is positioned above the sheet supplying unit 3 when accommodated in the housing 2. The process cartridge 50 includes a developer accommodation chamber 51, a supply roller 52, a developing roller 53, and a photosensitive drum 54. The pinch roller 35*b* is supported by the process cartridge 50.

The process cartridge 50 is configured of: a drum cartridge including the photosensitive drum 54; and a developing cartridge including the developing roller 53 and attachable to the drum cartridge. The process cartridge 50 is attachable to and detachable from the housing 2. Specifically, the process cartridge 50 is attached to the housing 2 by inserting, into the housing 2, the drum cartridge and the developing cartridge attached to the drum cartridge as a unit. The process cartridge 50 is detached from the housing 2 by removing, from the housing 2, the drum cartridge and the developing cartridge attached thereto altogether as a unit.

Attachment and detachment of the process cartridge 50 to and from the housing 2 can be performed when the front cover 21 is at the open position.

The photosensitive drum 54 defines an axis X extending in a left-right direction in a state where the process cartridge 50 is attached to the housing 2. The photosensitive drum 54 includes a drum shaft 54*a* defining the axis X. The drum shaft 54*a* is made from metal.

In the present embodiment, the process cartridge 50 includes the drum cartridge including the photosensitive drum 54, and the developing cartridge attachable to the drum cartridge and including the developing roller 53. However, the process cartridge 50 may be configured by a cartridge including the photosensitive drum 54 and the developing roller 53, and a toner box attachable to the cartridge and configured to accommodate therein toner. Further, in the image-forming apparatus 1, the drum cartridge including the photosensitive drum 54 and the developing cartridge including the developing roller 53 may be individually attachable to the housing 2. That is, the process cartridge 50 is a detachable cartridge that includes at least one of a photosensitive drum, a developing roller, and a toner container.

The exposing device 56 is configured to expose a surface of the photosensitive drum 54 to light. The exposing device 56 includes a laser diode, a polygon mirror, a lens, and a reflection mirror, and the like. The exposing device 56 is configured to irradiate laser light to the photosensitive drum 54 of the process cartridge 50 attached to the housing 2, on a basis of image data inputted in the image-forming apparatus 1, to form an electrostatic latent image on the surface of the photosensitive drum 54.

The developer accommodation chamber 51 is configured to accommodate therein toner as developer. The toner accommodated in the developer accommodation chamber 51 is supplied to the supply roller 52 while being agitated by an agitator (not illustrated). The supply roller 52 is configured to supply the toner conveyed from the developer accommodation chamber 51 to the developing roller 53.

The developing roller 53 is in close contact with the supply roller 52. The developing roller 53 is configured to carry the toner supplied from the supply roller 52 and positively charged by a friction member (not illustrated). Further, the developing roller 53 is applied with a developing bias by a bias application member (not illustrated).

The photosensitive drum 54 is positioned adjacent to the developing roller 53. The surface of the photosensitive drum 54 is uniformly charged by a charger (not illustrated), and then the surface is exposed to light by the exposing device 56. The exposed region on the surface of the photosensitive drum 54 has a potential lower than that of a non-exposed region thereon, whereby the electrostatic latent image corresponding to the image data is formed on the surface (exposed region) of the photosensitive drum 54. The positively charged toner is supplied from the developing roller 53 to the surface of the photosensitive drum 54 where the electrostatic latent image is formed (exposed region), so that a visible toner image corresponding to the electrostatic latent image is formed on the surface of the photosensitive drum 54.

The transfer roller 55 is positioned to face the photosensitive drum 54 of the process cartridge 50 attached to the housing 2. The transfer roller 55 is applied with a transfer bias by a bias application member (not illustrated). The toner image formed on the surface of the photosensitive drum 54 is transferred onto a surface of the sheet S while the sheet S, which is nipped between the transfer roller 55 and the photosensitive drum 54 on which the toner image is formed, is conveyed therebetween in a state where the transfer bias is applied to the surface of the transfer roller 55. The sheet S on which the toner image is transferred is then conveyed to the fixing device 6.

The fixing device 6 is configured to fix the toner image transferred to the sheet S by the process cartridge 50 thermally to the sheet S. The fixing device 6 includes a heating unit 61 and a pressure roller 62. The heating unit 61 is configured to be heated when supplied with power from a power source (not illustrated). The pressure roller 62 is positioned to face the heating unit 61. One of the heating unit 61 and the pressure roller 62 is urged toward the other (toward a remaining one of the heating unit 61 and the pressure roller 62) by an urging mechanism (not illustrated), so that the heating unit 61 and the pressure roller 62 are in close contact with each other.

When the sheet S on which the toner image has been transferred is conveyed to the fixing device 6, the heating unit 61 and the pressure roller 62 convey the sheet S while nipping the sheet S therebetween to apply heat to the sheet S to thermally fix the toner image to the sheet S. In this way, the fixing device 6 thermally fixes the toner image to the sheet S being conveyed.

The sheet discharge unit 7 is positioned downstream of the image forming unit 5 in the sheet conveying direction. The sheet discharge unit 7 is configured to discharge the image-formed sheet S to an outside of the image-forming apparatus 1. The sheet discharge unit 7 includes a pair of discharge rollers 71 and a discharge tray 72. The pair of discharge rollers 71 is configured to discharge the sheet S conveyed from the fixing device 6 along the sheet conveying passage P toward the outside of the housing 2. The discharge tray 72 is defined by an upper surface of the housing 2, and is configured to receive the sheet S discharged to the outside of the housing 2 by the pair of discharge rollers 71.

<Details of the Housing 2>

Figure 2:
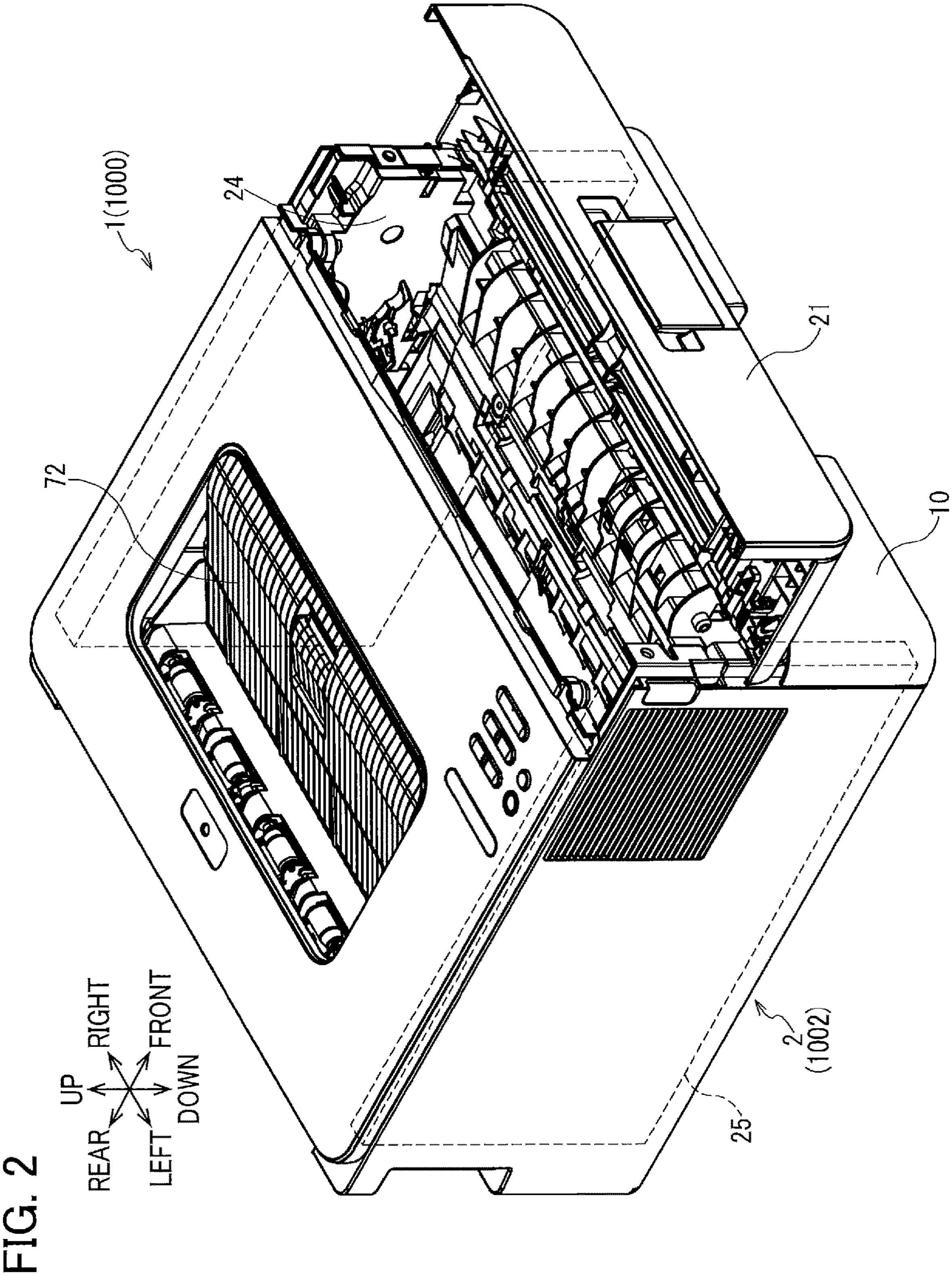
FIG. 2 is a perspective view of the image-forming apparatus in a state where a front cover thereof is at its open position.

As illustrated in FIG. 2, the housing 2 includes a first main frame 24 and a second main frame 25 spaced away from each other in the left-right direction. The first main frame 24 is positioned at a right end portion of the housing 2, and the second main frame 25 is positioned at a left end portion of the housing 2. The first main frame 24 extends in a front-rear direction and an up-down direction, and has a major surface perpendicular to the left-right direction. The second main frame 25 extends in the front-rear direction and up-down direction, and has a major surface perpendicular to the left-right direction.

The process cartridge 50 (attached to the housing 2) and the fixing device 6 are positioned between the first main frame 24 and the second main frame 25. The first main frame 24 is positioned rightward of the process cartridge 50 and the fixing device 6, and the second main frame 25 is positioned leftward of the process cartridge 50 and the fixing device 6. The process cartridge 50 is detachably supported by the first main frame 24 and the second main frame 25.

<Fixing Device 6>

Figure 3:
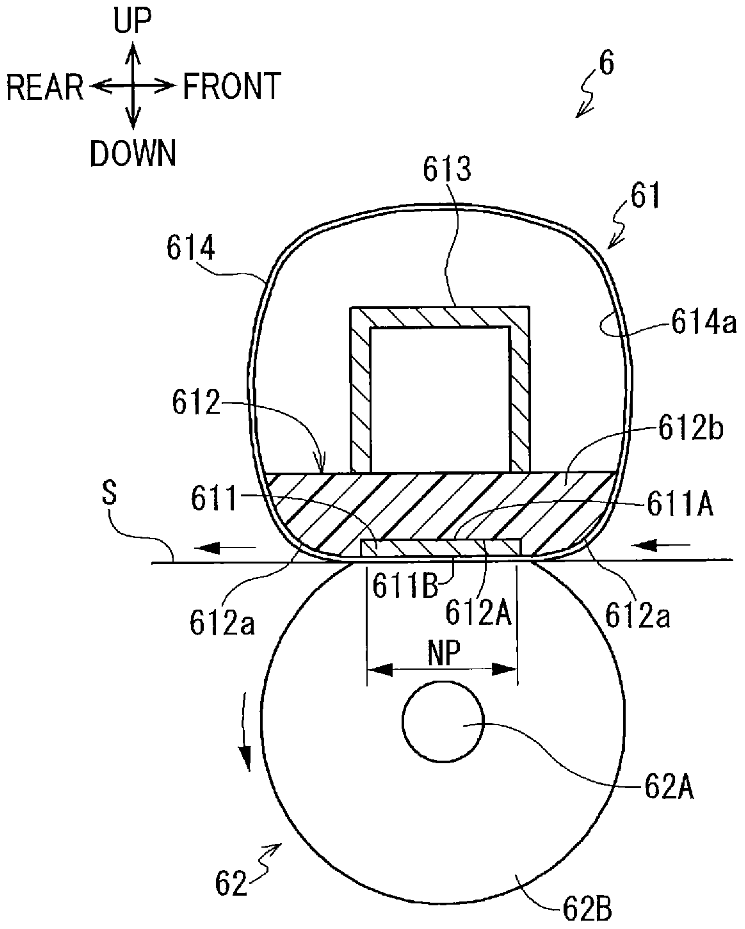
FIG. 3 is a cross-sectional side view illustrating a fixing device in the image-forming apparatus.
Figure 4:
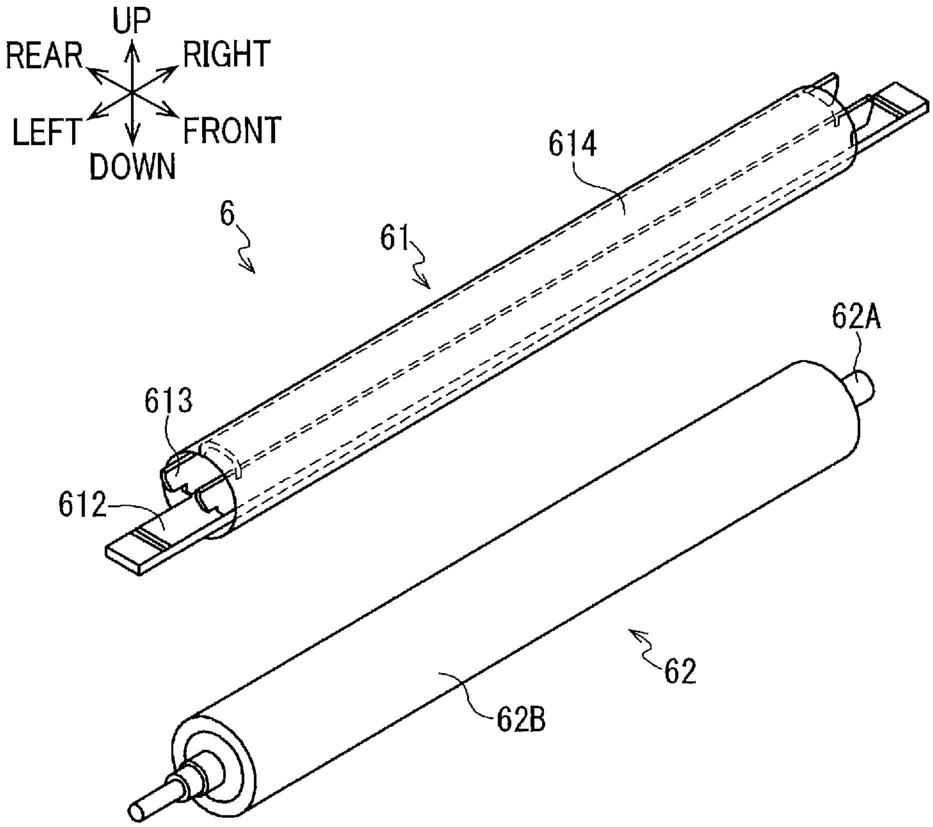
FIG. 4 is a perspective view of a heater unit and a pressure roller of the fixing device.

As illustrated in FIGS. 3 and 4, the heating unit 61 includes a heater 611, a holder 612, a stay 613, and a belt 614. The heater 611 has a flat plate-like shape extending in the left-right direction. The heater 611 has a first surface 611A and a second surface 611B opposite the first surface 611A. The first surface 611A is supported by the holder 612.

The holder 612 is made from resin, for example. The holder 612 includes a support wall 612*b*. The support wall 612*b* has a guide surface 612*a* and a supporting surface 612A. The guide surface 612*a* contacts an inner peripheral surface 614*a* of the belt 614 for guiding a circular movement of the belt 614. The supporting surface 612A is in contact with the first surface 611A of the heater 611 for supporting the same. The stay 613 supports the holder 612, and has a higher rigidity than the holder 612 made from resin. For example, the stay 613 is provided by bending a steel plate (having higher rigidity than the holder 612) to have a U-shape in cross-section.

The belt 614 is an endless belt having heat resistivity and flexibility. The belt 614 is constituted by a metal hollow tubular member made from, for example, stainless steel, and a fluorine resin layer coated over the hollow tubular member. The heater 611, the holder 612, and the stay 613 are positioned in an internal space provided by the endless belt 614. The belt 614 is configured to circularly move around the heater 611, the holder 612, and the stay 613. The inner peripheral surface 614*a* of the belt 614 is in contact with the heater 611.

The pressure roller 62 includes a shaft 62A made from metal and an elastic layer 62B provided over the shaft 62A. The pressure roller 62 is pressed against the heater 611 through the belt 614. The pressure roller 62 and the heater 611 define a nipping region NP therebetween at which the belt 614 is nipped therebetween for heating and pressing the sheet S. That is, the pressure roller 62 is configured to heat and press the sheet S at the nipping region NP in cooperation with the heater 611.

The pressure roller 62 is rotatable by a driving force transmitted from a motor (not illustrated) of the image-forming apparatus 1. Following the rotation of the pressure roller 62, the belt 614 is configured to circularly move through a frictional force generated at the belt 614 or the sheet S (if any) nipped at the nipping region NP. In the fixing device 6, the toner image on the sheet S is thermally fixed thereto when the sheet S is conveyed through between the pressure roller 62 and the belt 614 at the nipping region NP.

As illustrated in FIGS. 1, and 5 through 7, the fixing device 6 further includes a fixing frame 63 covering the heating unit 61 and the pressure roller 62. The fixing frame 63 holds the heating unit 61 and the pressure roller 62. The fixing frame 63 covers the heating unit 61 and the pressure roller 62 to surround the same. The fixing frame 63 is formed with a first opening 63*a* positioned upstream of the heating unit 61 and the pressure roller 62 in the sheet conveying direction, and a second opening 63*b* positioned downstream of the heating unit 61 and the pressure roller 62 in the sheet conveying direction.

The fixing device 6 further includes a shutter 64 supported by the fixing frame 63. The shutter 64 is positioned upstream of the first opening 63*a* in the sheet conveying direction, and is pivotally movable about a pivot axis extending in the left-right direction. The shutter 64 is movable between a closed position where the shutter 64 closes the first opening 63*a* and an open position where the shutter 64 opens the first opening 63*a* in accordance with the pivotal movement of the shutter 64 about the pivot axis.

Incidentally, in the present embodiment, the fixing device 6 includes the pressure roller 62, and the heating unit 61 which includes the heater 611 and the belt 614. As an alternative, the fixing device 6 may be configured of a heat roller incorporating a heater, and a pressure roller configured to be pressed by the heat roller. Still alternatively, the fixing device 6 may be provided by a heat roller incorporating a heater, and a pressure belt urged toward the heat roller by an urging member. That is, the "heating member" of the disclosure may be a unit (like the heating unit 61 in the embodiment), or a heat roller incorporating a heater therein.

<Drum Shaft 54*a*>

Figure 8:
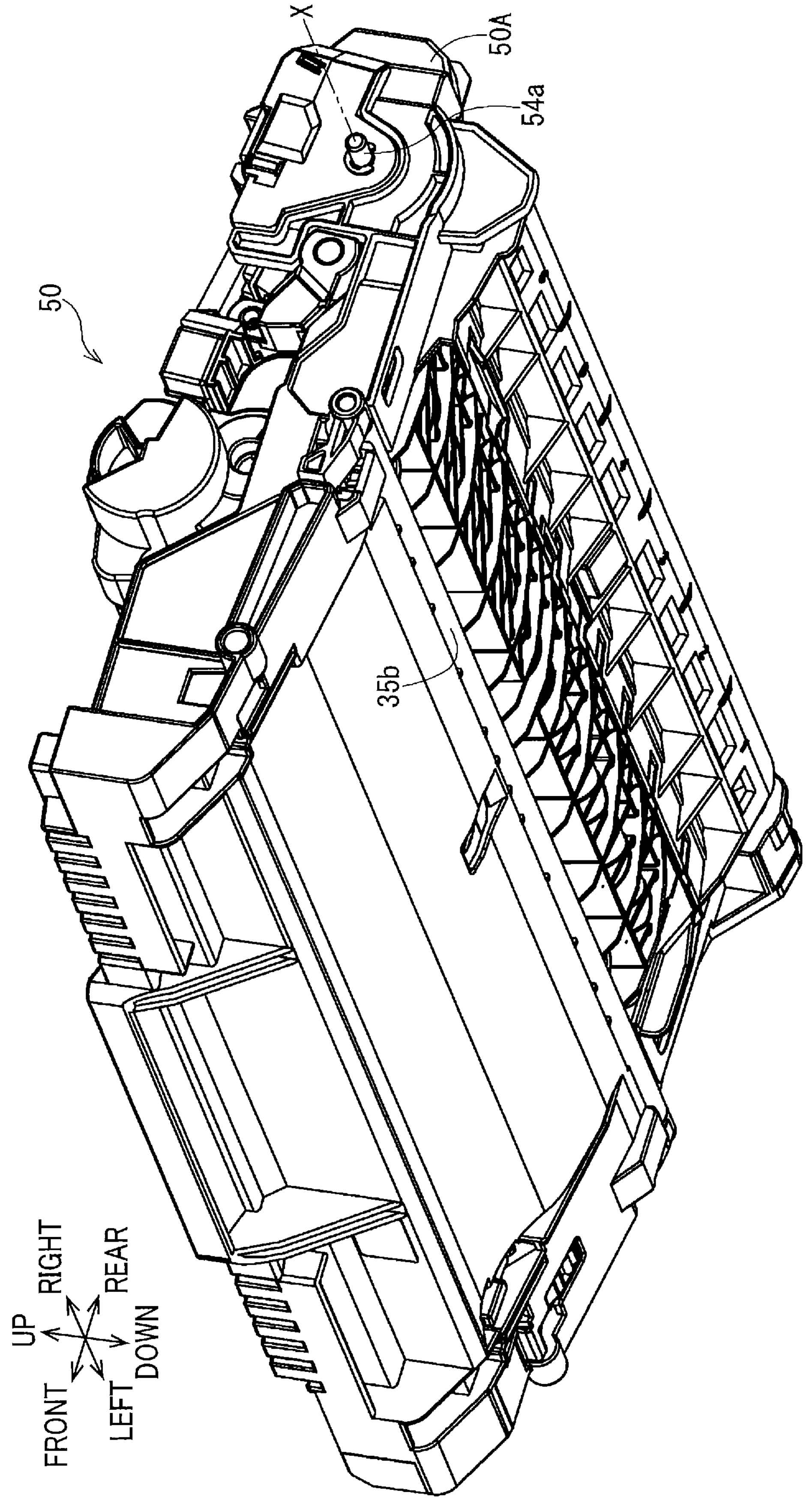
FIG. 8 is a perspective view of a process cartridge attachable to the image-forming apparatus.
Figure 9:
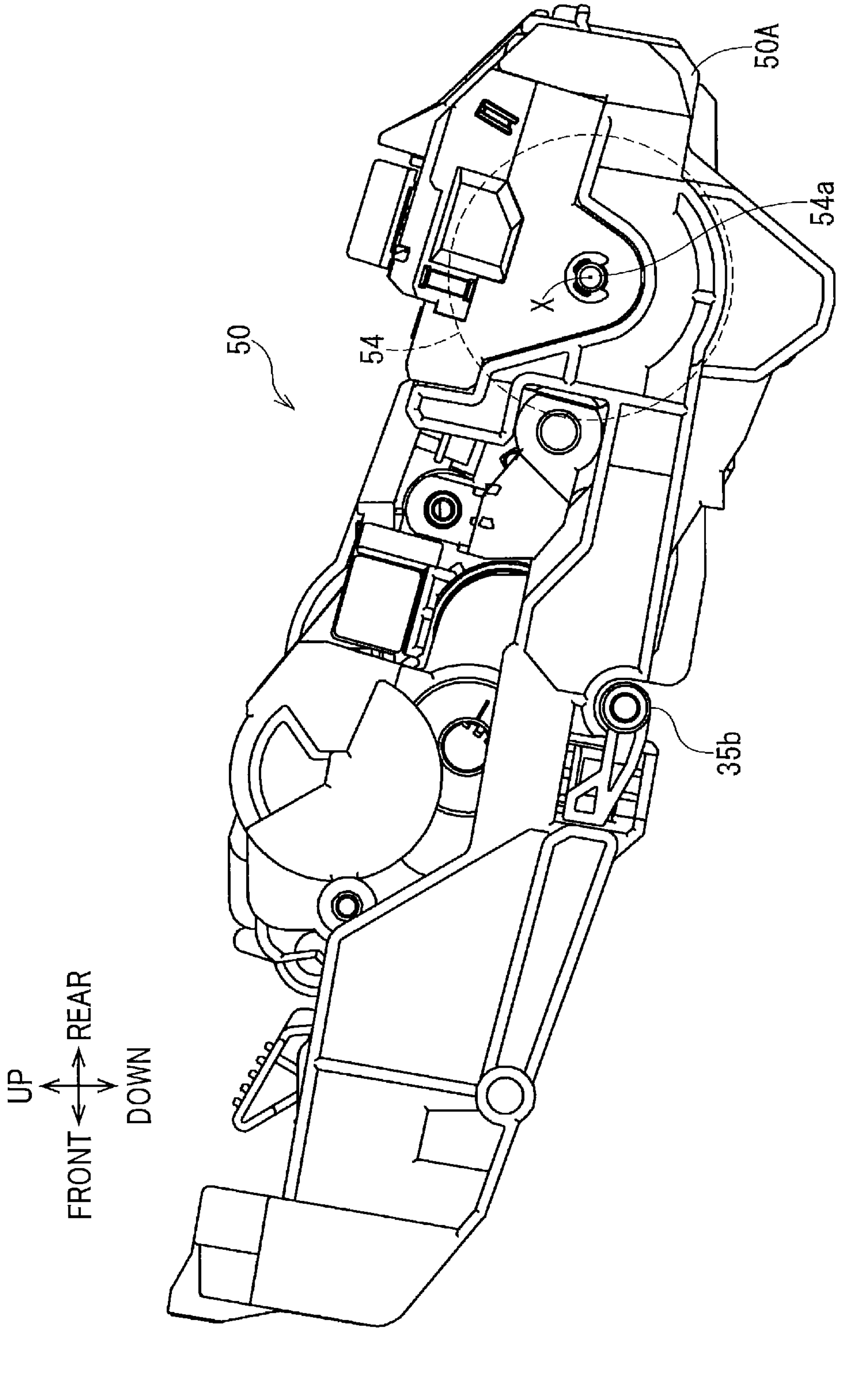
FIG. 9 is a side view of the process cartridge.

As illustrated in FIGS. 8 and 9, the drum shaft 54*a* of the photosensitive drum 54 protrudes rightward along the axis X from a right end of the process cartridge 50. That is, the drum shaft 54*a* protrudes toward the first main frame 24 along the axis X.

<First Main Frame 24>

Figure 10:
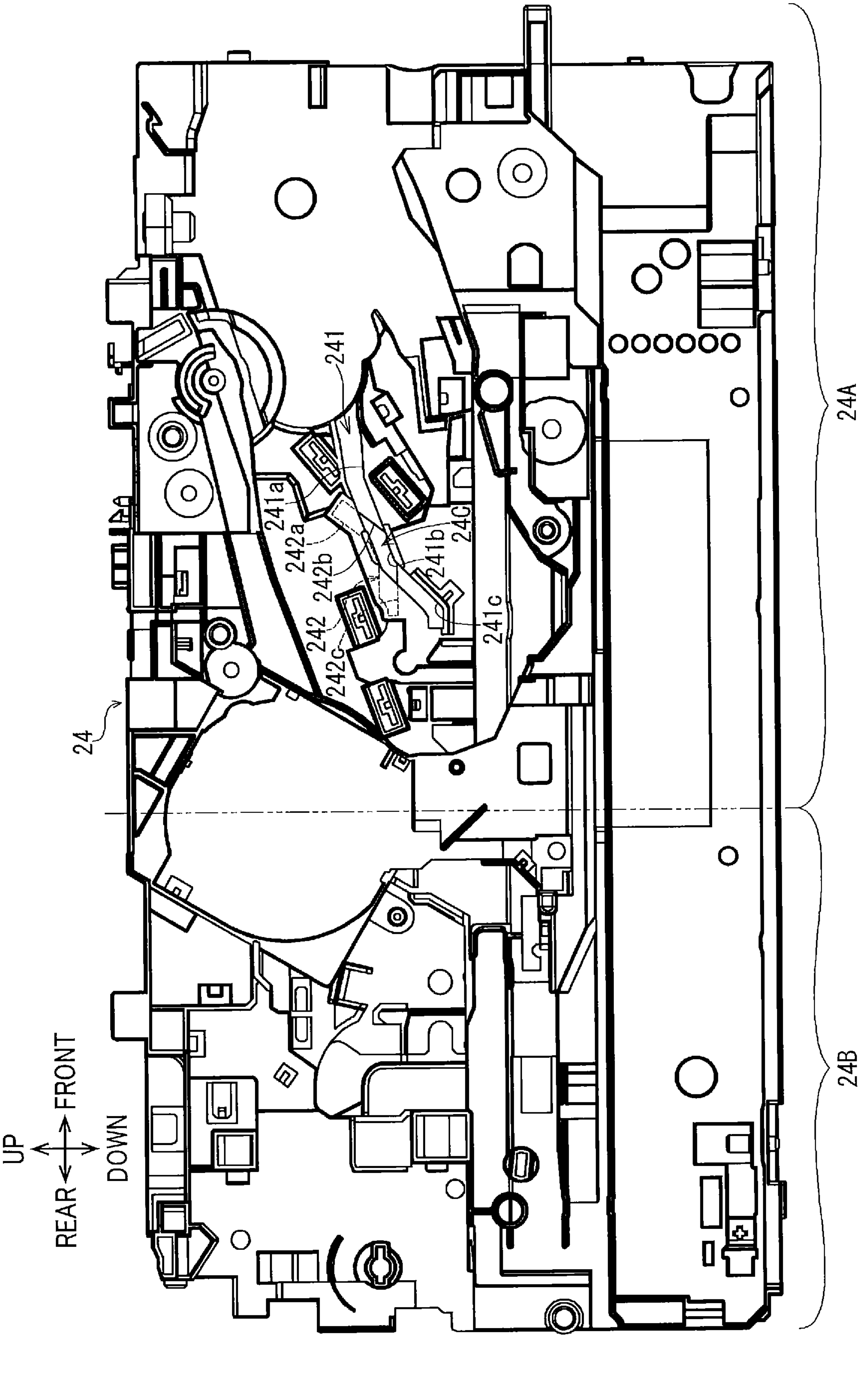
FIG. 10 is a left side view of a first main frame of the image-forming apparatus.
Figure 11:
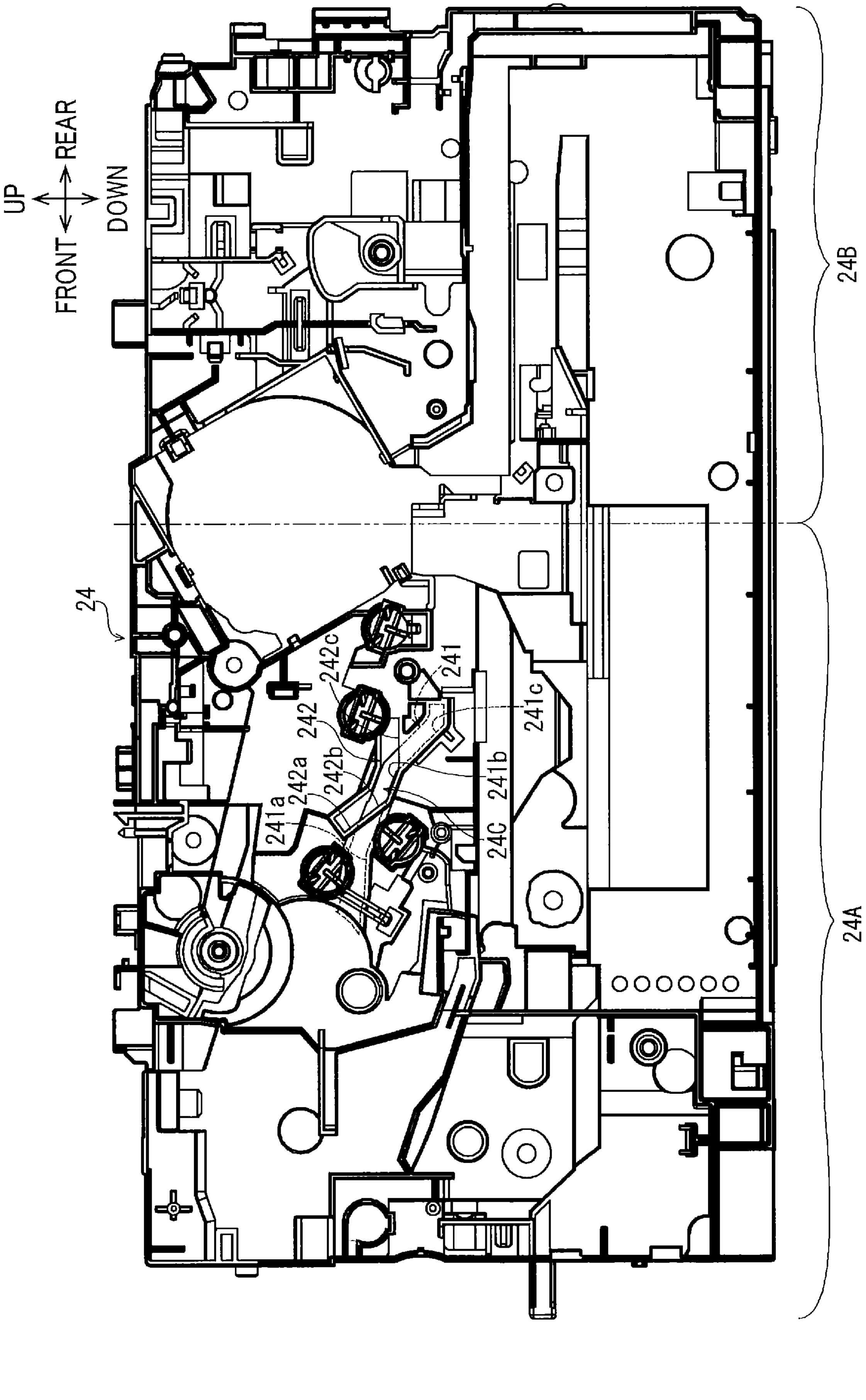
FIG. 11 is a right side view of the first main frame.

As illustrated in FIGS. 10 and 11, the first main frame 24 includes a front frame 24A constituting a frontward portion of the first main frame 24, and a rear frame 24B positioned rearward of the front frame 24A an constituting a rearward portion of the first main frame 24. The front frame 24A and the rear frame 24B are integral with each other in the front-rear direction.

The front frame 24A of the first main frame 24 has a cartridge rail 241 and an abutment piece rail 242. The cartridge rail 241 has a groove-like shape that is open leftward. The cartridge rail 241 slopes diagonally downward and rearward, while extending generally in the front-rear direction.

The cartridge rail 241 is configured to receive the drum shaft 54*a* of the photosensitive drum 54 therein. The cartridge rail 241 functions to guide the drum shaft 54*a* during the attachment and detachment of the process cartridge 50 to and from the housing 2. The drum shaft 54*a* is inserted in the cartridge rail 241 from its left side while the drum shaft 54*a* is guided along the cartridge rail 241. Incidentally, the process cartridge 50 is attachable to the housing 2 toward the rear in the front-rear direction, and the process cartridge 50 is detachable from the housing 2 toward the front in the front-rear direction.

In this way, the cartridge rail 241 of the front frame 24A is configured to guide the movement of the drum shaft 54*a* during the attachment and detachment of the process cartridge 50 to and from the housing 2.

The abutment piece rail 242 has a groove-like shape that is open rightward. The abutment piece rail 242 slopes diagonally downward and rearward, while extending generally in the front-rear direction.

The cartridge rail 241 includes a front portion 241*a* constituting a front portion of the cartridge rail 241, a rear portion 241*c* constituting a rear portion of the cartridge rail 241, and an intermediate portion 241*b* positioned between the front portion 241*a* and the rear portion 241*c*. The abutment piece rail 242 includes a front portion 242*a* constituting a front portion of the abutment piece rail 242, a rear portion 242*c* constituting a rear portion of the abutment piece rail 242, and an intermediate portion 242*b* positioned between the front portion 242*a* and the rear portion 242*c*.

The intermediate portion 241*b* of the cartridge rail 241 and the intermediate portion 242*b* of the abutment piece rail 242 are overlapped with each other so as to be in communication with each other. Hence, the intermediate portion 241*b* and the intermediate portion 242*b* provide in combination a through-hole 24C extending throughout a thickness of the front frame 24A in the left-right direction.

That is, the intermediate portion 241*b* (which is a part of the cartridge rail 241) and the intermediate portion 242*b* (which is a part of the abutment piece rail 242) are overlapped with each other, so that the overlapping portion between the cartridge rail 241 and the abutment piece rail 242 forms the through-hole 24C. This overlapping arrangement between the parts of the cartridge rail 241 and the abutment piece rail 242 can realize parts sharing between the part forming the cartridge rail 241 and the part forming the abutment piece rail 242.

The drum shaft 54*a* enters the through-hole 24C during the attachment and detachment of the process cartridge 50 to and from the housing 2.

The front portion 242*a* of the abutment piece rail 242 is positioned higher than the front portion 241*a* of the cartridge rail 241. The rear portion 242*c* of the abutment piece rail 242 is positioned higher than the rear portion 241*c* of the cartridge rail 241.

<Connection Link 8>

Figure 12A:
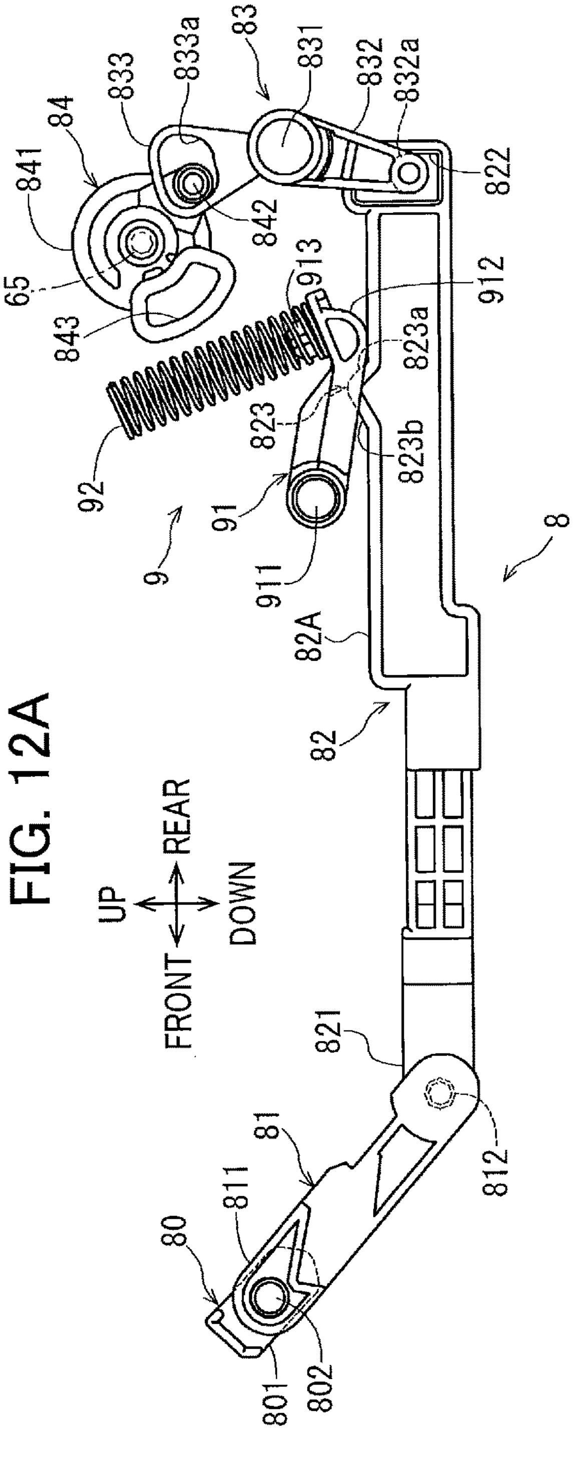
FIG. 12A is a right side view of a connection link, and particularly illustrating a state where a first protrusion of an abutment piece of the connection link is positioned at an intermediate portion of an abutment piece rail of the first main frame and a second protrusion of the abutment piece is positioned at a front portion of the abutment piece rail.
Figure 12B:
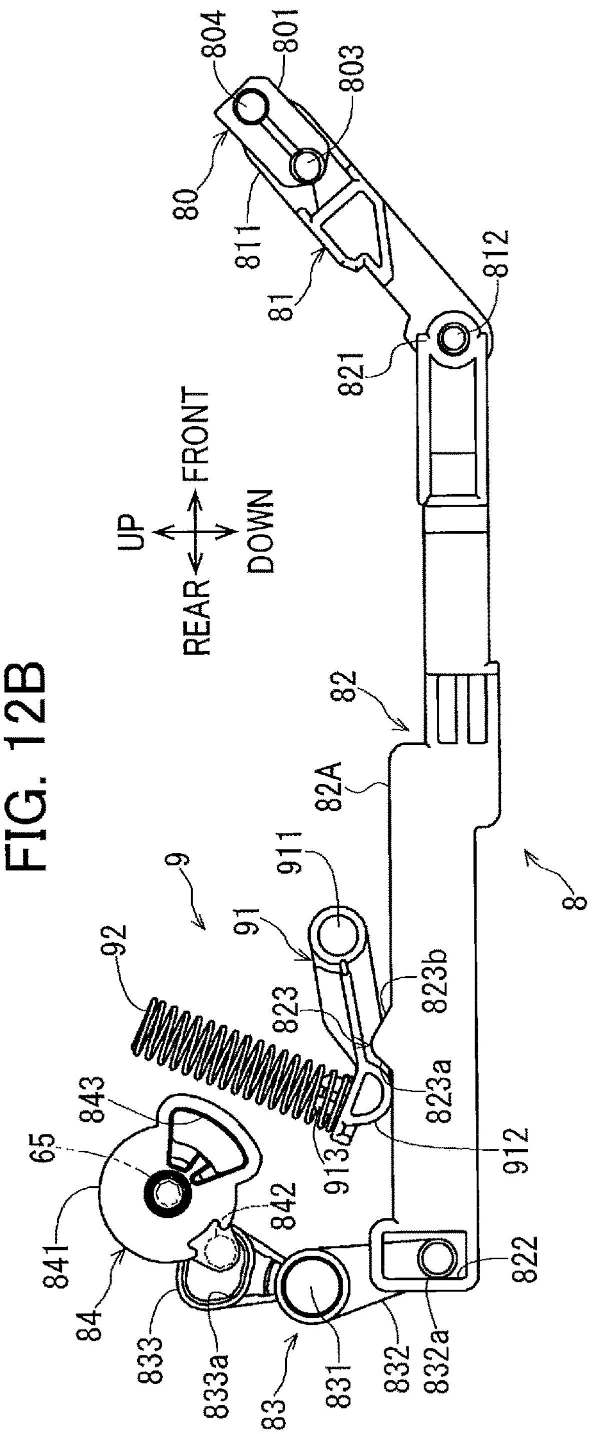
FIG. 12B is a left side view of the connection link in the state of FIG. 12A.
Figure 13:
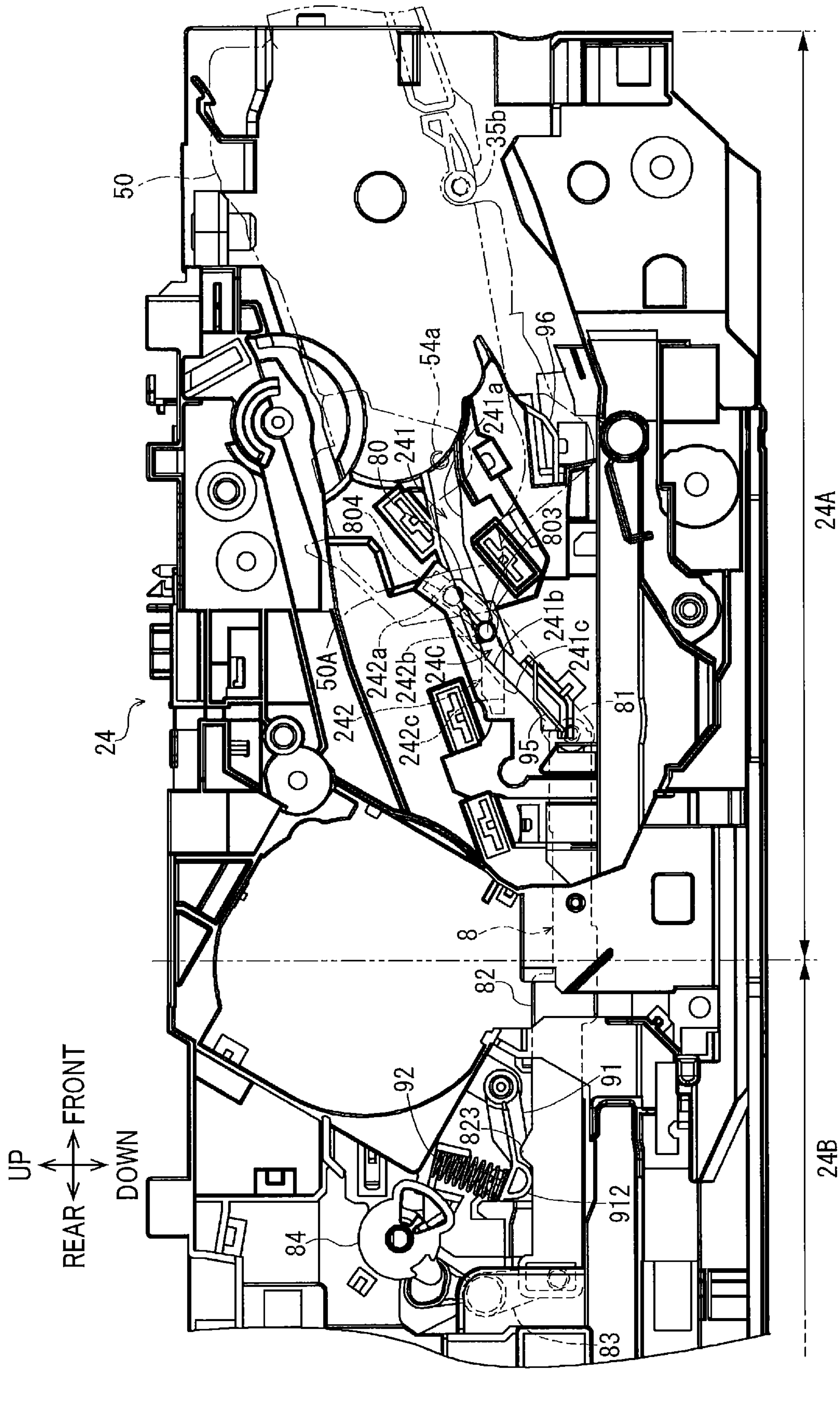
FIG. 13 is a side view of the first main frame, and particularly illustrating a state where the process cartridge is at an attachment start position, the first protrusion of the abutment piece is at the intermediate portion of the abutment piece rail, and the second protrusion of the abutment piece is at the front portion of the abutment piece rail.

As illustrated in FIGS. 6, 12 and 13, the housing 2 includes a connection link 8 connected to the shutter 64. The connection link 8 is configured to move the shutter 64 from the closed position to the open position in conjunction with the attachment of the process cartridge 50 to the housing 2, and move the shutter 64 from the open position to the closed position in conjunction with the detachment of the process cartridge 50 from the housing 2. That is, the connection link 8 is configured to open and close the shutter 64 in association with the attachment and detachment of the process cartridge 50 to and from the housing 2. The connection link 8 is positioned opposite the process cartridge 50 attached to the housing 2 with respect to the front frame 24A of the first main frame 24 in the left-right direction.

The connection link 8 includes an abutment piece 80, a first pivot link 81, a linear motion link 82, a second pivot link 83, a third pivot link 84, a shutter link 85, and a coil spring 86.

The abutment piece 80 is configured to move by the abutment with the drum shaft 54*a* of the photosensitive drum 54. The abutment piece 80 is slidably fitted with the abutment piece rail 242. The abutment piece rail 242 is configured to guide the movement of the abutment piece 80 that is movable in response to the abutment with the drum shaft 54*a*.

Figure 14A:
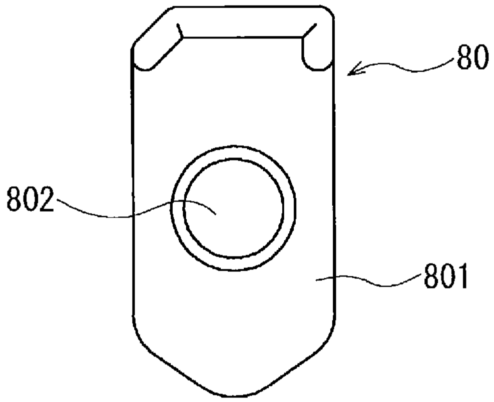
FIG. 14A, FIG. 14B and FIG. 14C are views illustrating the abutment piece.
Figure 14B:
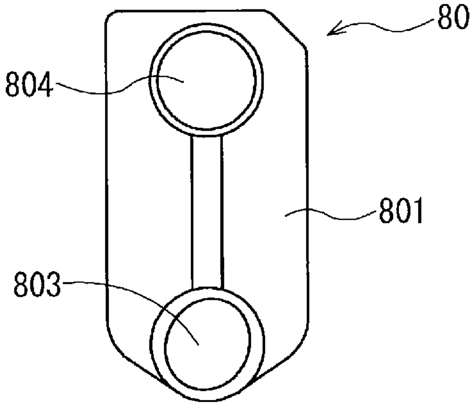
Figure 14C:
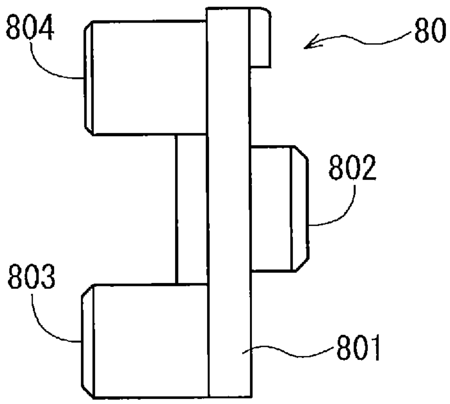

As illustrated in FIG. 14, the abutment piece 80 includes a base part 801, a connection part 802, a first protrusion 803, and a second protrusion 804. The base part 801 is a plate-like member having a right surface and a left surface facing rightward and leftward, respectively. The connection part 802 is a boss protruding rightward from the right surface of the base part 801.

The first protrusion 803 and the second protrusion 804 are pins protruding leftward from the left surface of the connection part 802. The first protrusion 803 and the second protrusion 804 are inserted in the abutment piece rail 242 from its right side and are guided by the abutment piece rail 242.

In a state where the first protrusion 803 and the second protrusion 804 are entered in the abutment piece rail 242, the second protrusion 804 is positioned upstream of the first protrusion 803 in an attachment direction of the process cartridge 50 to the housing 2. Here, the attachment direction is a direction in which the process cartridge 50 inserted in the housing 2 is moved to an attached position thereof relative to the housing 2 during the attachment of the process cartridge 50 to the housing 2.

The abutment piece 80 is positioned opposite the process cartridge 50 attached to the housing 2 with respect to the front frame 24A of the first main frame 24 in the left-right direction. In the state where the first protrusion 803 and the second protrusion 804 are entered in the abutment piece rail 242, the first protrusion 803 and the second protrusion 804 do not protrude further toward the process cartridge 50 (further toward the left) from the front frame 24A in the left-right direction.

The first protrusion 803 is configured to abut on the drum shaft 54*a* during the attachment of the process cartridge 50 to the housing 2, and the second protrusion 804 is configured to abut on the drum shaft 54*a* during the detachment of the process cartridge 50 from the housing 2. That is, the first protrusion 803 is configured to abut on the drum shaft 54*a* of the process cartridge 50 that is being attached to the housing 2, and the second protrusion 804 is configured to abut on the drum shaft 54*a* that is being detached from the housing 2.

In this case, the first protrusion 803 abuts on the drum shaft 54*a* of the process cartridge 50 that is being attached to the housing 2 through the intermediate portion 242*b* (through-hole 24C) of the abutment piece rail 242 when the first protrusion 803 is positioned at the intermediate portion 242*b*. Further, the second protrusion 804 abuts on the drum shaft 54*a* of the process cartridge 50 that is being detached from the housing 2 through the intermediate portion 242*b* (through-hole 24C) when the second protrusion 804 is positioned at the intermediate portion 242*b*.

The drum shaft 54*a* may abut on the first protrusion 803 and the second protrusion 804 respectively through the through-hole 24C at a position within the through-hole 24C, or rightward of the through-hole 24C.

Incidentally, in the present embodiment, the abutment piece 80 is configured to be moved by the abutment with the drum shaft 54*a*. As an alternative, the abutment piece 80 may be configured to be moved by the abutment with a guide protrusion of the process cartridge 50 (rather than with the drum shaft 54*a*), the guide protrusion being a protrusion provided separately from the drum shaft 54*a* and protruding toward the first main frame 24.

The first pivot link 81 is a generally linear-shaped member connected to the abutment piece 80. The first pivot link 81 is positioned rightward of the front frame 24A of the first main frame 24. The first pivot link 81 has a front end portion provided with a fitting portion 811, and a rear end portion provided with a boss 812 protruding leftward. The connection part 802 of the abutment piece 80 is fitted with the fitting portion 811 at the front end portion of the first pivot link 81. The first pivot link 81 is in such an inclined posture that the fitting portion 811 is positioned above and frontward of the boss 812. The first pivot link 81 is connected to the abutment piece 80 by the fitting engagement of the fitting portion 811 with the connection part 802, and the first pivot link 81 is pivotally movable about an axis of the boss 812 in accordance with the movement of the abutment piece 80.

The linear motion link 82 is a generally linear-shaped member extending in the front-rear direction. The linear motion link 82 is connected to the first pivot link 81. The linear motion link 82 is positioned rightward of the front frame 24A of the first main frame 24. The linear motion link 82 has a front end portion provided with a fitting portion 821 with which the boss 812 of the first pivot link 81 is fitted. The linear motion link 82 has a rear end portion formed with a connection hole 822. The linear motion link 82 is connected to the first pivot link 81 by the fitting engagement between the boss 812 and the fitting portion 821, and is linearly movable in accordance with the pivotal movement of the first pivot link 81.

The second pivot link 83 is connected to the linear motion link 82, and is supported by the first main frame 24. The second pivot link 83 includes: a base support portion 831 rotatably supported by the first main frame 24; a first arm 832 extending generally downward from the base support portion 831; and a second arm 833 extending generally upward from the base support portion 831. The first arm 832 has a tip end portion provided with an engagement pin 832*a* protruding leftward. The second arm 833 has a tip end portion formed with a connection hole 833*a*.

The engagement pin 832*a* of the first arm 832 is inserted in the connection hole 822 of the linear motion link 82 from its right side, and is configured to engage with the connection hole 822 in accordance with the movement of the linear motion link 82 in the front-rear direction. The second pivot link 83 is configured to be connected to the linear motion link 82 by the engagement between the engagement pin 832*a* and the connection hole 822, and is pivotally movable about an axis of the base support portion 831 in accordance with the movement of the linear motion link 82.

The third pivot link 84 is connected to the second pivot link 83, and is pivotally movably supported by a support shaft 65 of the fixing device 6. The support shaft 65 protrudes rightward from a right end portion of the fixing frame 63 (see FIGS. 6A and 6B). Specifically, the third pivot link 84 includes a base portion 841 pivotally movably supported by the support shaft 65 of the fixing device 6, and an engagement pin 842 protruding rightward from the base portion 841. Further, the base portion 841 has a connection hole 843 at a position different from the position of the engagement pin 842 in a circumferential direction of the base portion 841. The connection hole 843 has an arcuate shape centered on a pivoting axis of the base portion 841, so that the connection hole 843 has a radially inner arcuate side and a radially outer arcuate side opposing each other in a radial direction of the base portion 841.

The engagement pin 842 of the third pivot link 84 is inserted in the connection hole 833*a* of the second pivot link 83 from its left side. The engagement pin 842 is configured to be engaged with the connection hole 833*a* by the pivotal movement of the second pivot link 83. The third pivot link 84 is configured to be connected to the second pivot link 83 by the engagement between the engagement pin 842 and the connection hole 833*a*, and is pivotally movable about an axis of the support shaft 65 by the pivotal movement of the second pivot link 83.

As illustrated in FIGS. 5A through 6B, the shutter link 85 is connected to the third pivot link 84, and is pivotally movably supported by the support shaft 65 of the fixing device 6. The shutter link 85 is movable in response to the movement of the third pivot link 84 to move the shutter 64 of the fixing device 6 between the closed position and the open position. The shutter link 85 is positioned at the right end of the fixing device 6. The shutter link 85 includes a base portion 851, an arm portion 852, an engagement portion 853, and an engagement pin 854.

The base portion 851 is pivotally movably supported by the support shaft 65 of the fixing device 6. The arm portion 852 extends generally frontward from the base portion 851. The arm portion 852 has a front end at which the engagement portion 853 is positioned. The engagement portion 853 is formed with an engagement hole 853*a* which has an oblong shape elongated generally in the front-rear direction. An opening/closing pin 641 of the shutter 64 is engaged with the engagement hole 853*a*. The opening/closing pin 641 protrudes rightward from a right end portion of the shutter 64 (also see FIGS. 5A and 5B).

Figure 5A:
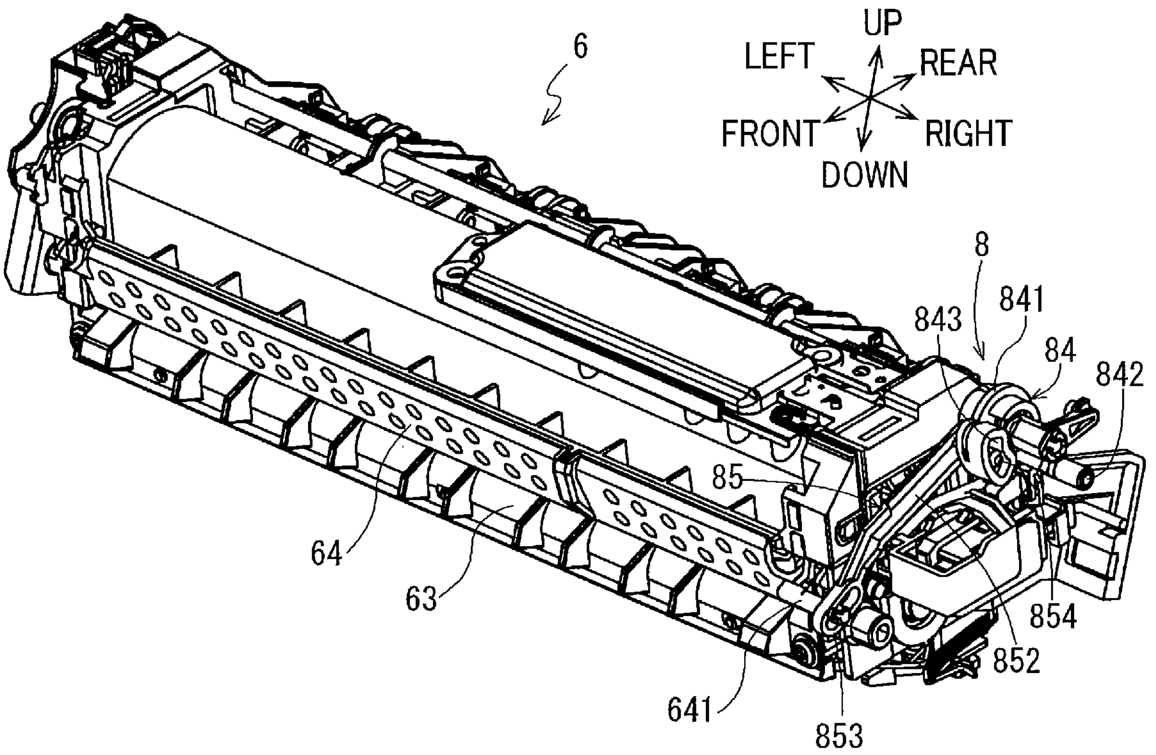
FIG. 5A is a perspective view of the fixing device in a state where a shutter thereof is at its closed position.
Figure 5B:
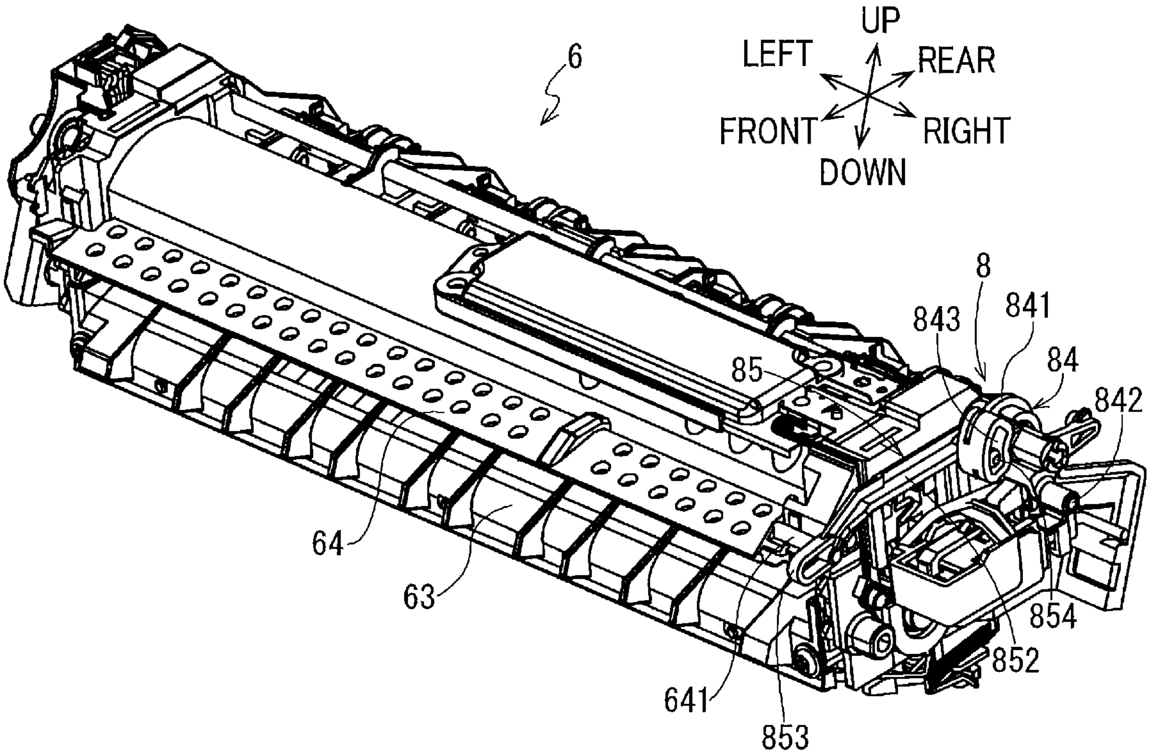
FIG. 5B is a perspective view of the fixing device in a state where the shutter is at its open position.
Figure 6A:
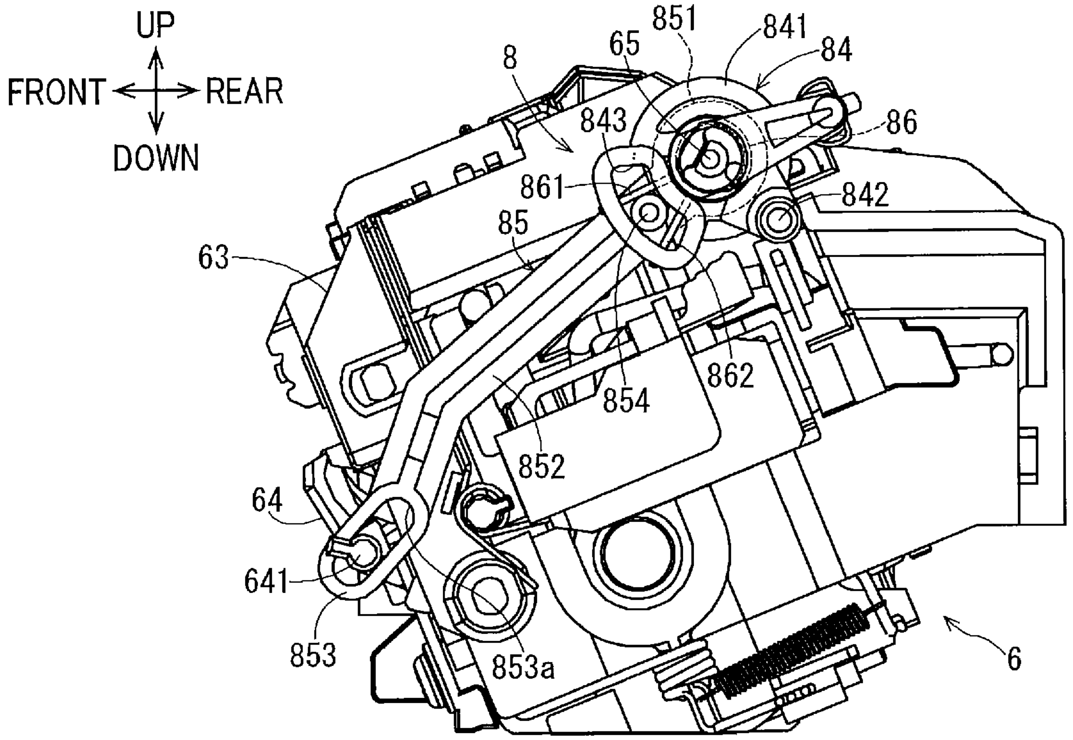
FIG. 6A is a side view of the fixing device in the state where the shutter is at the closed position.
Figure 6B:
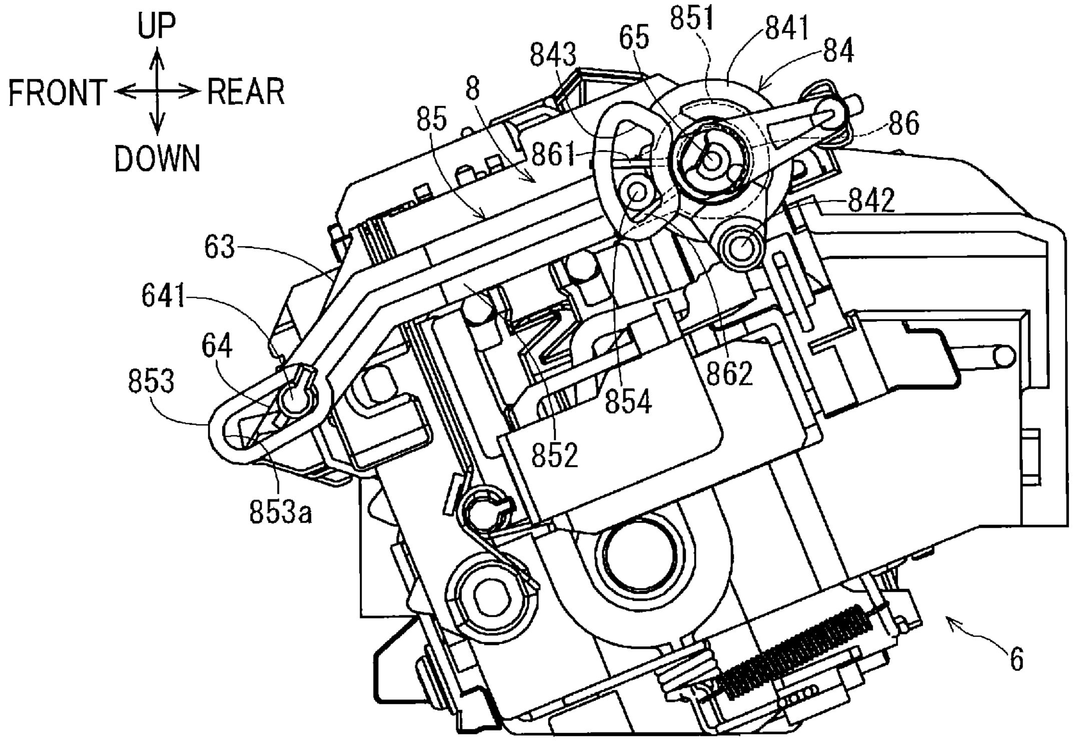
FIG. 6B is a side view of the fixing device in the state where the shutter is at the open position.
Figure 7:
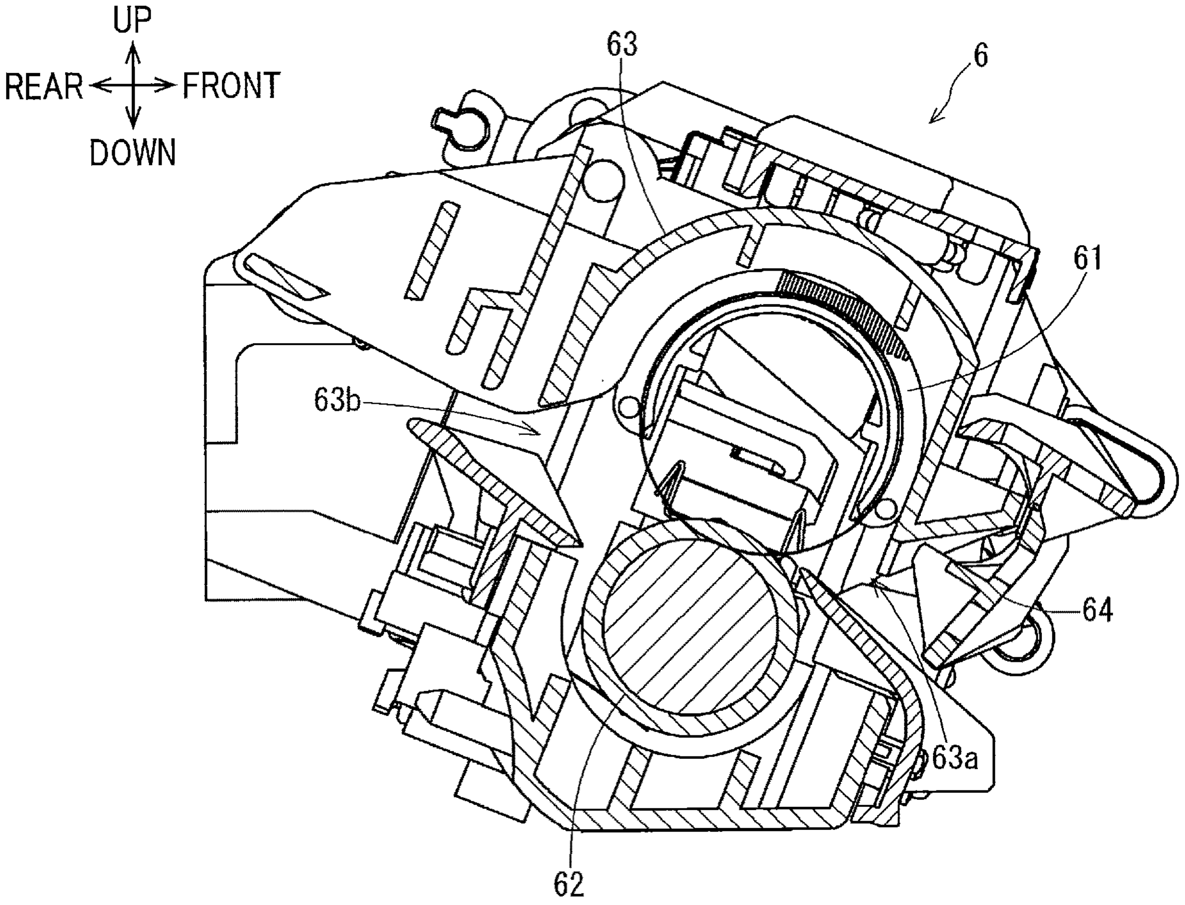
FIG. 7 is a cross-sectional side view of the fixing device.

The shutter link 85 is pivotally movable about a pivot axis of the base portion 851 such that the engagement portion 853 is movable in the up-down direction. As the shutter link 85 pivots to move the engagement portion 853 downward, the shutter 64 is moved to the closed position as illustrated in FIGS. 5A and 6A. As the shutter link 85 pivots to move the engagement portion 853 upward, the shutter 64 is moved to the open position as illustrated in FIGS. 5B and 6B.

The engagement pin 854 protrudes rightward from one end portion of the arm portion 852 adjacent to the base portion 851 (i.e., rear end portion). The engagement pin 854 is entered in the connection hole 843 of the third pivot link 84 from its left side.

The coil spring 86 is supported by the base portion 841 of the third pivot link 84. The coil spring 86 is a torsion spring having a first arm 861 and a second arm 862. The first arm 861 extends radially outward from the inner arcuate side to the outer arcuate side of the connection hole 843, and is entered in the connection hole 843. The second arm 862 is at a position different from the position of the first arm 861 in the circumferential direction of the base portion 841 and extends radially outward from the inner arcuate side to the outer arcuate side of the connection hole 843. The second arm 862 is entered in the connection hole 843.

The first arm 861 is positioned above the engagement pin 854 in the connection hole 843, whereas the second arm 862 is positioned below the engagement pin 854 in the connection hole 843. The coil spring 86 is pivotally movable in accordance with the pivotal movement of the third pivot link 84. Either the first arm 861 or the second arm 862 engages the engagement pin 854 in accordance with the pivotal movement of the third pivot link 84. The shutter link 85 is connected to the third pivot link 84 by the engagement of the engagement pin 854 with either one of the first arm 861 and the second arm 862. With this structure, the shutter link 85 is caused to move between the closed position and the open position in accordance with the pivotal movement of the third pivot link 84.

In the image-forming apparatus 1, the abutment piece 80 of the connection link 8 is brought into contact with the drum shaft 54*a* of the process cartridge 50 during the attachment/detachment of the process cartridge 50 relative to the housing 2, so that the abutment piece 80 is caused to move along the abutment piece rail 242. In this way, a driving force is transmitted from the drum shaft 54*a* to the shutter 64 through the connection link 8 to move the shutter 64 between the closed position and the open position.

In the present embodiment, the connection link 8 includes the abutment piece 80, the first pivot link 81, the linear motion link 82, the second pivot link 83, the third pivot link 84, the shutter link 85, and the coil spring 86. As an alternative, the connection link 8 may be constituted by a single link connected to the shutter 64 and capable of abutting on the process cartridge 50 for opening and closing the shutter 64. The connection link 8 may move differently from the pivotal movements/sliding movements as in the described embodiment, provided that the connection link 8 can function to open and close the shutter 64 in interlocking relation to the attachment and detachment of the process cartridge 50 to and from the housing 2.

<Lock 9>

As illustrated in FIG. 12, the housing 2 further includes a lock 9 configured to restrict the movement of the connection link 8 that enables the shutter 64 to move between the open position and the closed position. Specifically, the lock 9 is configured to press the linear motion link 82 from above to restrict the linear motion link 82 from moving in the front-rear direction. The lock 9 includes an arm 91 and a locking spring 92. The arm 91 is in abutment with an upper surface 82A of the linear motion link 82. The locking spring 92 urges a tip end portion of the arm 91 toward the upper surface 82A of the linear motion link 82.

The arm 91 includes a base end portion 911, an abutment portion 912, and a seat portion 913. The base end portion 911 is rotatably supported by the first main frame 24. The abutment portion 912 constitutes the tip end portion (free end portion) of the arm 91 and is in abutment with the upper surface 82A of the linear motion link 82. The seat portion 913 is fitted with the locking spring 92. The arm 91 extends in the front-rear direction such that the base end portion 911 is at a front portion of the arm 91, and the abutment portion 912 is at a rear portion of the arm 91. The seat portion 913 is positioned above the abutment portion 912. The abutment portion 912 is pivotally movable in the up-down direction about an axis of the base end portion 911.

The locking spring 92 has an upper end portion supported by the first main frame 24, and a lower end portion fitted with the seat portion 913 of the arm 91. The locking spring 92 urges the abutment portion 912 toward the upper surface 82A of the linear motion link 82, i.e., urges the abutment portion 912 downward, so that the abutment portion 912 receives pressure from the upper surface 82A.

The linear motion link 82 includes a link protrusion 823 protruding upward (i.e., toward the lock 9) from the upper surface 82A of the linear motion link 82 at a position in between the fitting portion 821 and the connection hole 822. The link protrusion 823 has a mountain-like shape having a first sloped surface 823*a* and a second sloped surface 823*b*. The first sloped surface 823*a* is inclined diagonally downward toward the rear side of the link protrusion 823. The second sloped surface 823*b* is positioned frontward of the first sloped surface 823*a* so as to be continuous therewith. The second sloped surface 823*b* is inclined diagonally downward toward the front side of the link protrusion 823.

In accordance with the movement of the linear motion link 82 in the front-rear direction, the abutment portion 912 of the arm 91 is movable over the link protrusion 823 against an urging force of the locking spring 92 to move between a front-side position and a rear side position relative to the link protrusion 823. The abutment portion 912 is positioned further rearward than the first sloped surface 823*a* of the link protrusion 823 at the rear-side position, and the abutment portion 912 is positioned further frontward than the second sloped surface 823*b* of the link protrusion 823 at the front-side position.

In a case where the abutment portion 912 of the arm 91 is at the rear-side position (rearward) relative to the link protrusion 823, the lock 9 can restrict the linear motion link 82 from moving further rearward due to the engagement of the abutment portion 912 with the first sloped surface 823*a*. In a case where the abutment portion 912 of the arm 91 is at the front-side position (frontward) relative to the link protrusion 823, the lock 9 can restrict the linear motion link 82 from moving further frontward due to the engagement of the abutment portion 912 with the second sloped surface 823*b*.

That is, the arm 91 abuts on the upper surface 82A of the linear motion link 82 and presses the linear motion link 82 downward at a position rearward of the link protrusion 823 to restrict the rearward movement of the linear motion link 82, thereby serving to keep the connection link 8 stationary. Further, the arm 91 abuts on the upper surface 82A of the linear motion link 82 and presses the linear motion link 82 downward at a position frontward of the link protrusion 823 to restrain the frontward movement of the linear motion link 82, thereby serving to keep the connection link 8 stationary. As such, the lock 9 can restrain the movement of the linear motion link 82 in the front-rear direction through a simple structure by the application of downward pressure to the linear motion link 82 from the arm 91.

The connection link 8 and the lock 9 are not limited to the above-described structure. For example, the lock 9 may be omitted and the connection link 8 alone may be configured to maintain the open position and the closed position of the shutter 64 without provision of the lock 9.

<Operations of the Connection Link 8>

Next, how the connection link 8 operates will be described.

Operations at the time of Attachment of the Process Cartridge 5

Firstly, operations of the connection link 8 at the time of attachment of the process cartridge 50 to the housing 2 will be described.

Referring to FIGS. 12A through 13, in a state where the process cartridge 50 is detached from the housing 2 and is at an attachment starting position where a leading end 50A of the process cartridge 50 in an inserting direction thereof is inserted in the housing 2 (the state illustrated in FIG. 13), the drum shaft 54*a* is in separation from the abutment piece 80 and the abutment piece 80 is positioned to extend over the front portion 242*a* and the intermediate portion 242*b* of the abutment piece rail 242. Specifically, the abutment piece 80 is fitted with the abutment piece rail 242 such that the first protrusion 803 is positioned in the intermediate portion 242*b* (the through-hole 24C) of the abutment piece rail 242 and the second protrusion 804 is positioned in the front portion 242*a* of the abutment piece rail 242. Here, the inserting direction of the process cartridge 50 is coincident with the attachment direction of the process cartridge 50.

In the state where the abutment piece 80 is at the position illustrated in FIG. 13, the shutter 64 has been moved to the closed position as illustrated in FIG. 6A by the connection link 8. With this structure, even if the user inadvertently inserts his hand into housing 2 through the opening 2A in the state where the process cartridge 50 is detached from the housing 2, the shutter 64 can block the user's hand from touching the heating unit 61 of the fixing device 6.

Further, in the state where the abutment piece 80 is at the position illustrated in FIG. 13, the abutment portion 912 of the arm 91 of the lock 9 is positioned rearward of the link protrusion 823 of the linear motion link 82, thereby restricting the rearward movement of the linear motion link 82. That is, the linear motion link 82 is locked in position by the lock 9 in the state where the shutter 64 has moved to the closed position by the connection link 8, so that accidental movement of the shutter 64 from the closed position to the open position can be avoided. In other words, the linear motion link 82 is restricted from moving in the front-rear direction by the abutment of the link protrusion 823 with the abutment portion 912 positioned rearward of the link protrusion 823. With this structure, the shutter 64 can be securely maintained at the closed position.

Further, the connection link 8 is positioned opposite the process cartridge 50 attached to the housing 2 with respect to the front frame 24A of the first main frame 24, and the first protrusion 803 and the second protrusion 804 of the abutment piece 80 are so positioned not to protrude further toward the process cartridge 50 relative to the front frame 24A of the first main frame 24. This structure can prevent the user's hand from touching the abutment piece 80 in the detached state of the process cartridge 50 from the housing 2, thereby restraining the connection link 8 from accidentally moving to the open position from the closed position.

Figures 15A, 15B:
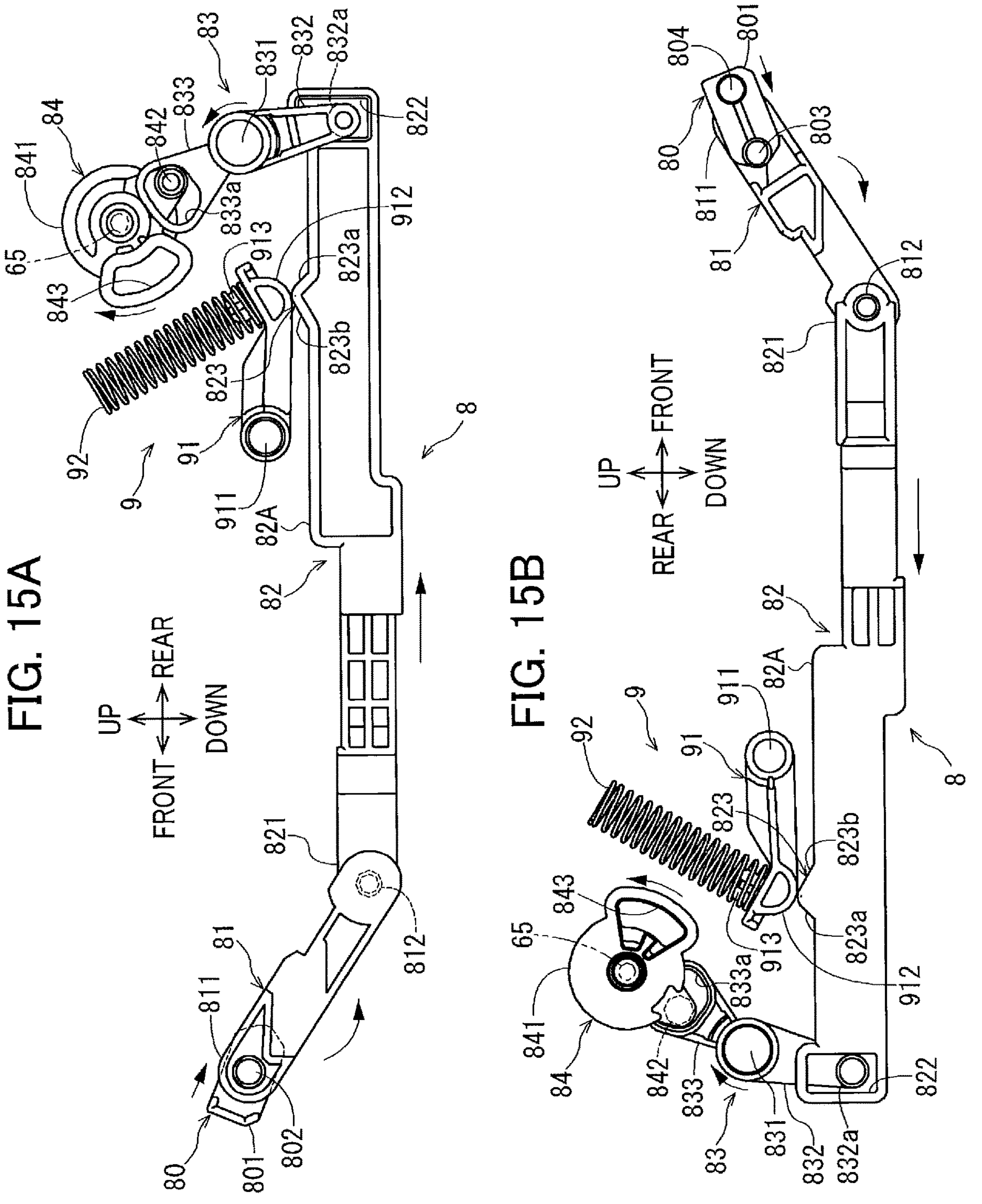
FIG. 15A is a right side view of the connection link, and particularly illustrating a state where a drum shaft of a photosensitive drum is in abutment with the abutment piece, and the first and second protrusions of the abutment piece are both at the intermediate portion of the abutment piece rail.
FIG. 15B is a left side view of the connection link in the state of FIG. 15A.
Figure 16:
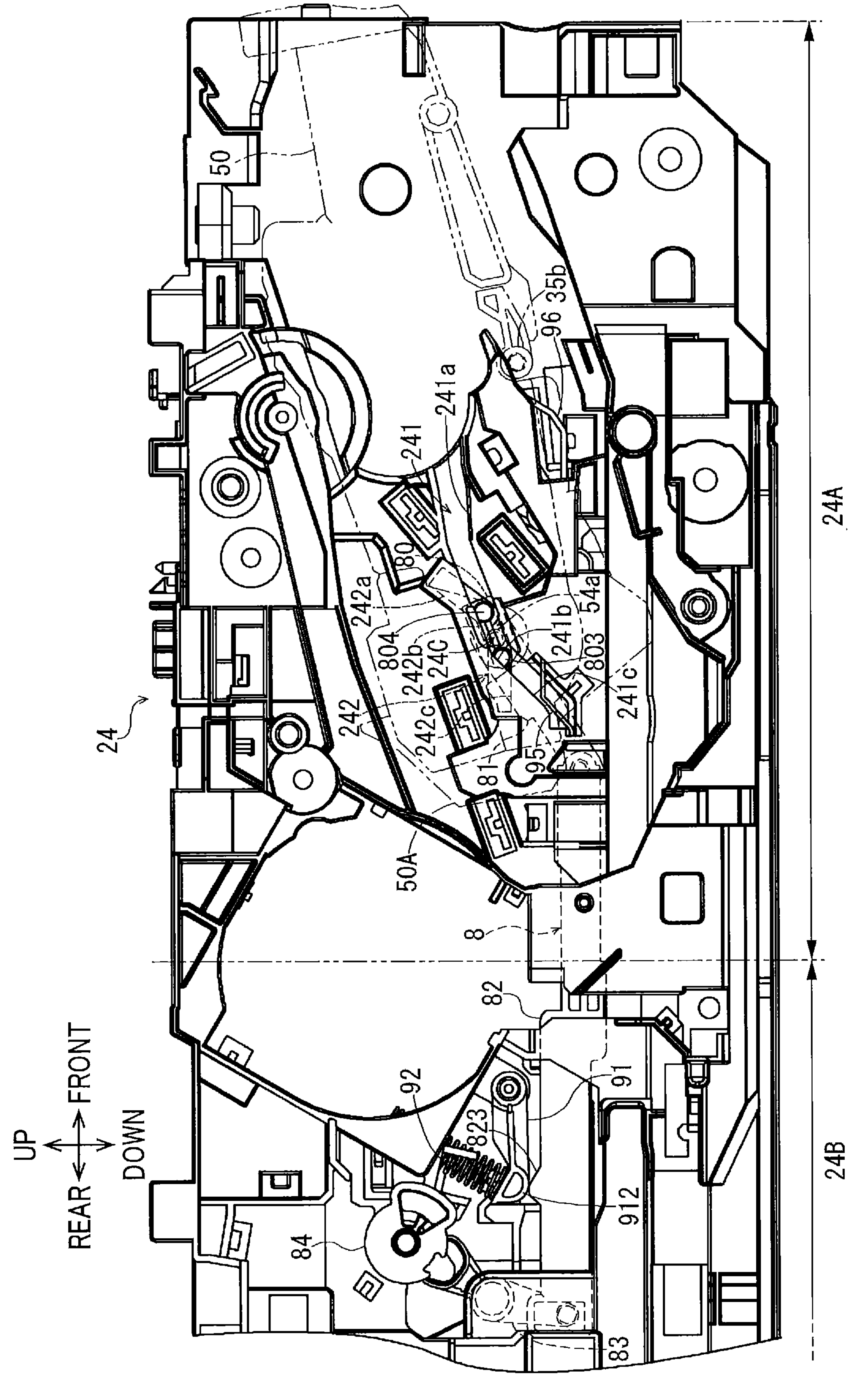
FIG. 16 is a side view of the first main frame, and particularly illustrating the state where the drum shaft is in abutment with the abutment piece, and the first and second protrusions of the abutment piece are both at the intermediate portion of the abutment piece rail.

Referring to FIGS. 15A through 16, as the process cartridge 50 at the attachment starting position is further inserted toward the attachment position, the drum shaft 54*a* enters the front portion 241*a* of the cartridge rail 241 and moves along the cartridge rail 241. When the drum shaft 54*a* moving along the cartridge rail 241 enters the intermediate portion 241*b* (the through-hole 24C), the drum shaft 54*a* comes into abutment with the first protrusion 803 of the abutment piece 80.

Upon abutment with the drum shaft 54*a* moving in the intermediate portion 241*b* (the through-hole 24C) of the cartridge rail 241, the abutment piece 80 is pressed by the drum shaft 54*a* and is moved toward downstream in the attachment direction of the process cartridge 50. FIG. 16 illustrates a state where the first protrusion 803 and the second protrusion 804 of the abutment piece 80, which is being moved by the drum shaft 54*a*, are positioned in the intermediate portion 242*b* (the through-hole 24C) of the abutment piece rail 242.

In accordance with the movement of the abutment piece 80, the first pivot link 81 connected to the abutment piece 80 is pivotally moved downward to reduce an inclination angle of the first pivot link 81 with respect to the horizontal direction, and at the same time the first pivot link 81 is moved rearward. In response to the pivotal movement and rearward movement of the first pivot link 81, the linear motion link 82 connected to the first pivot link 81 is linearly moved rearward.

In response to the rearward movement of the linear motion link 82, the connection hole 822 of the linear motion link 82 is brought into engagement with the engagement pin 832*a* to pivotally move the second pivot link 83 about the axis of the base support portion 831 in a counterclockwise direction in FIG. 15A such that the engagement pin 832*a* is moved rearward. In response to the pivotal movement of the second pivot link 83, the connection hole 833*a* of the second pivot link 83 is brought into engagement with the engagement pin 842 of the third pivot link 84 to pivotally move the third pivot link 84 about the support shaft 65 in a clockwise direction in FIG. 15A such that the engagement pin 842 is moved frontward.

In accordance with the rearward movement of the linear motion link 82, the abutment portion 912 of the arm 91 of the lock 9 climbs up the first sloped surface 823*a* of the link protrusion 823 against the urging force of the locking spring 92 and reaches the top of the link protrusion 823.

In a state where the abutment portion 912 is positioned on the top of the link protrusion 823, the locking spring 92 is sufficiently compressed to provide an urging force that is greater than the urging force when the abutment portion 912 is at the rear-side position or at the front-side position relative to the link protrusion 823. The abutment portion 912 of the lock 9 applies maximum pressing force to the linear motion link 82 by the locking spring 92 when the abutment portion 912 is positioned on the top of the link protrusion 823.

Figure 17A:
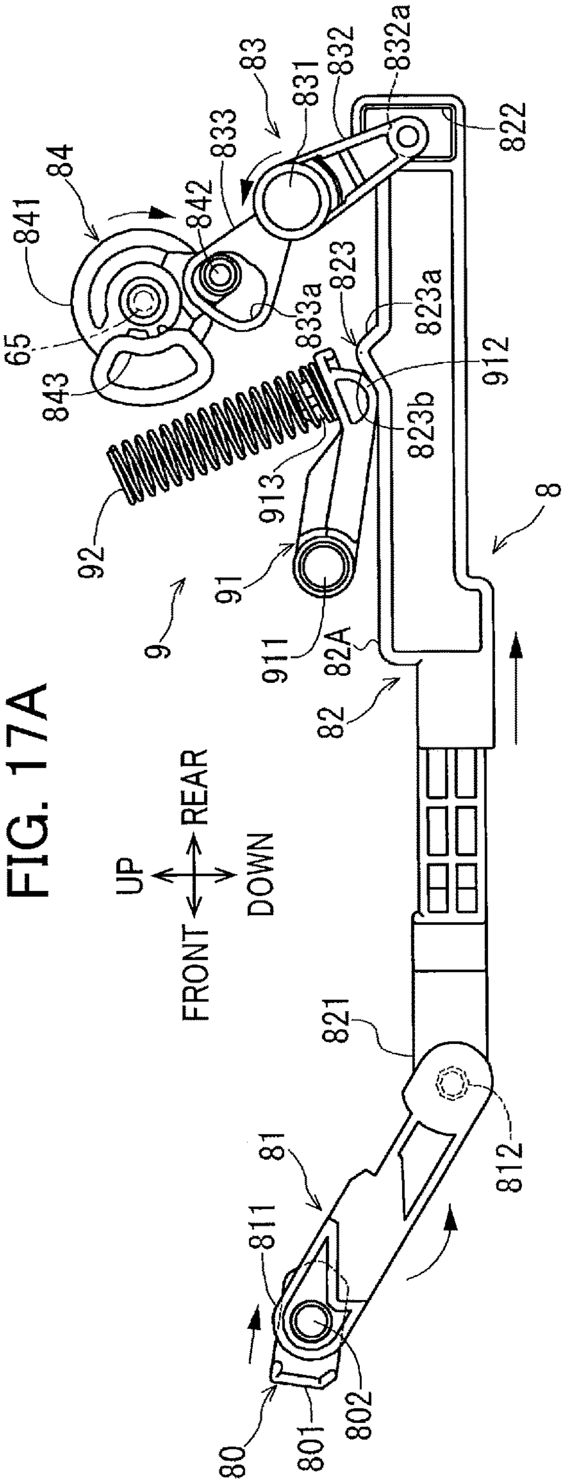
FIG. 17A is a right side view of the connection link, and particularly illustrating a state where the drum shaft is in abutment with the abutment piece, the first protrusion of the abutment piece is at a rear portion of the abutment piece rail, and the second protrusion of the abutment piece is at the intermediate portion of the abutment piece rail.
Figure 17B:
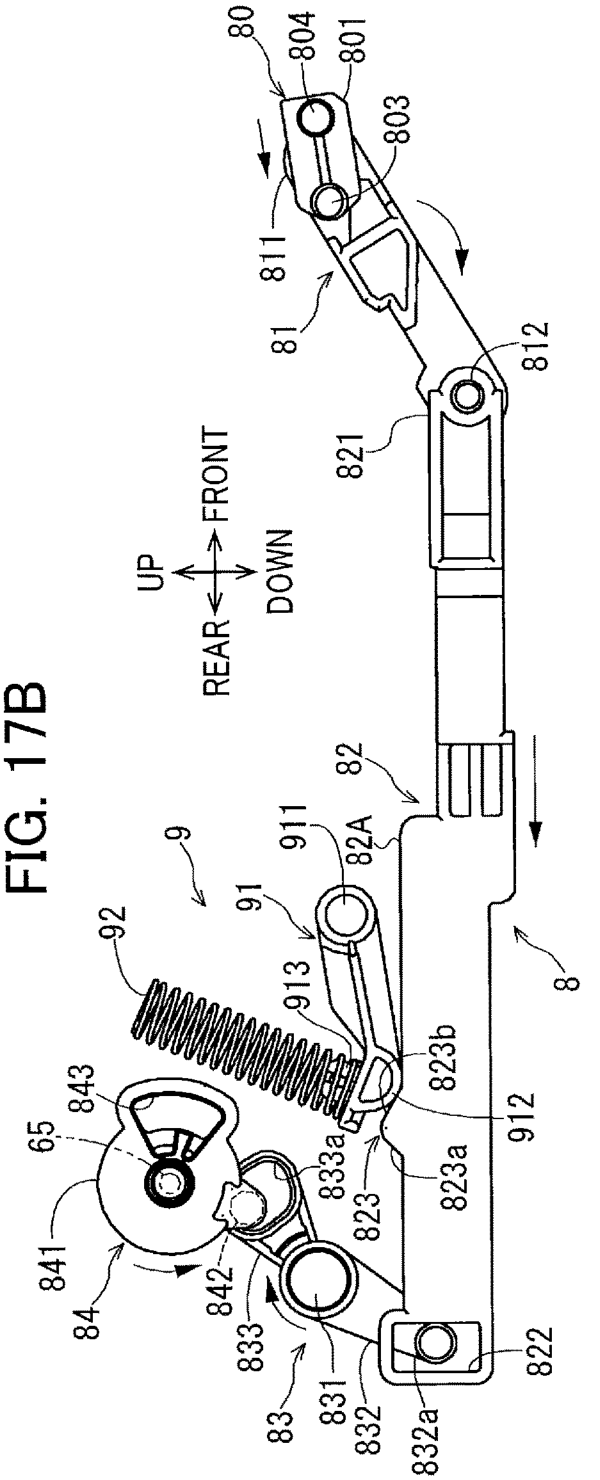
FIG. 17B is a left side view of the connection link in the state of FIG. 17A.
Figure 18:
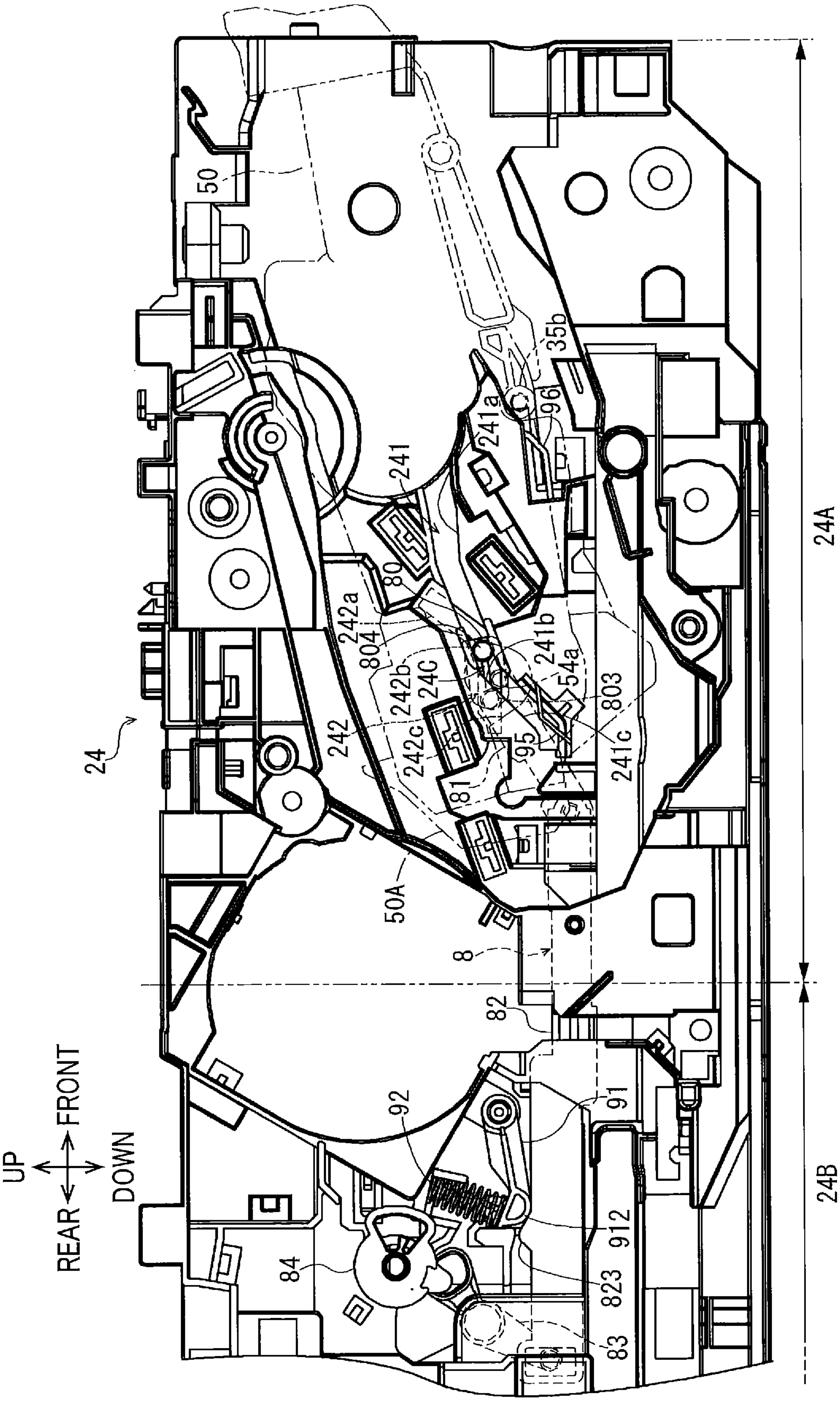
FIG. 18 is a side view of the first main frame, and particularly illustrating the state where the drum shaft is in abutment with the abutment piece, the first protrusion of the abutment piece is at the rear portion of the abutment piece rail, and the second protrusion of the abutment piece is at the intermediate portion of the abutment piece rail.

As illustrated in FIGS. 17A through 18, as the process cartridge 50 is further inserted toward the attachment position from the position illustrated in FIG. 16, the abutment piece 80 is further moved toward downstream in the attachment direction by the drum shaft 54*a* that is moving in the intermediate portion 241*b* (the through-hole 24C) of the cartridge rail 241. FIG. 18 shows a state where the first protrusion 803 of the abutment piece 80 is positioned in the rear portion 242*c* of the abutment piece rail 242, and the second protrusion 804 of the abutment piece 80 is positioned in the intermediate portion 242*b* (the through-hole 24C) of the abutment piece rail 242.

In accordance with the movement of the abutment piece 80, the first pivot link 81 is pivotally moved downward to further reduce the inclination angle of the first pivot link 81 with respect to the horizontal direction, and at the same time the first pivot link 81 is moved further rearward. In response to the pivotal movement and rearward movement of the first pivot link 81, the linear motion link 82 is further linearly moved rearward. In response to the rearward movement of the linear motion link 82, the second pivot link 83 is further pivotally moved in the counterclockwise direction in FIG. 17A such that the engagement pin 832*a* is moved rearward. In response to the pivotal movement of the second pivot link 83, the third pivot link 84 is further pivotally moved in the clockwise direction in FIG. 15A such that the engagement pin 842 is moved frontward.

As illustrated in FIG. 6B, in response to the pivotal movement of the third pivot link 84, the coil spring 86 is pivotally moved, so that the second arm 862 of the coil spring 86 is brought into engagement with the engagement pin 854 of the shutter link 85 from below. Due to the engagement of the second arm 862 with the engagement pin 854, the shutter link 85 is pivotally moved in the clockwise direction in FIG. 6B to move the engagement portion 853 upward, so that the shutter 64 is moved from the closed position to the open position.

In this case, in accordance with the rearward movement of the linear motion link 82, the abutment portion 912 of the arm 91 of the lock 9 climbs down the first sloped surface 823*a* of the link protrusion 823 of the linear motion link 82 because of the urging force of the locking spring 92, so that the abutment portion 912 arrives at the position frontward of the link protrusion 823. Since the abutment portion 912 is positioned frontward of the link protrusion 823, the engagement of the abutment portion 912 with the second sloped surface 823*b* can restrict the linear motion link 82 from moving further frontward.

In this way, the linear motion link 82 becomes stationary (immovable) by the lock 9 in the state where the shutter 64 has been moved to the open position by the connection link 8. With this structure, unexpected movement of the shutter 64 from the open position to the closed position can be restrained. That is, the lock 9 can restrict the movement of the linear motion link 82 by the engagement of the link protrusion 823 with the abutment portion 912 positioned frontward of the link protrusion 823, thereby securely maintaining the shutter 64 at the open position.

Further, in the lock 9, the abutment portion 912 can apply its maximum pressing load to the linear motion link 82 by the locking spring 92 when arrives at the top of the link protrusion 823 during a transition period from the state where the abutment portion 912 of the arm 91 is positioned rearward of the link protrusion 823 (before the connection link 8 moves the shutter 64 to the open position) to the state where the abutment portion 912 of the arm 91 is positioned frontward of the link protrusion 823 (after the connection link 8 moves the shutter 64 to the open position).

Figure 19:
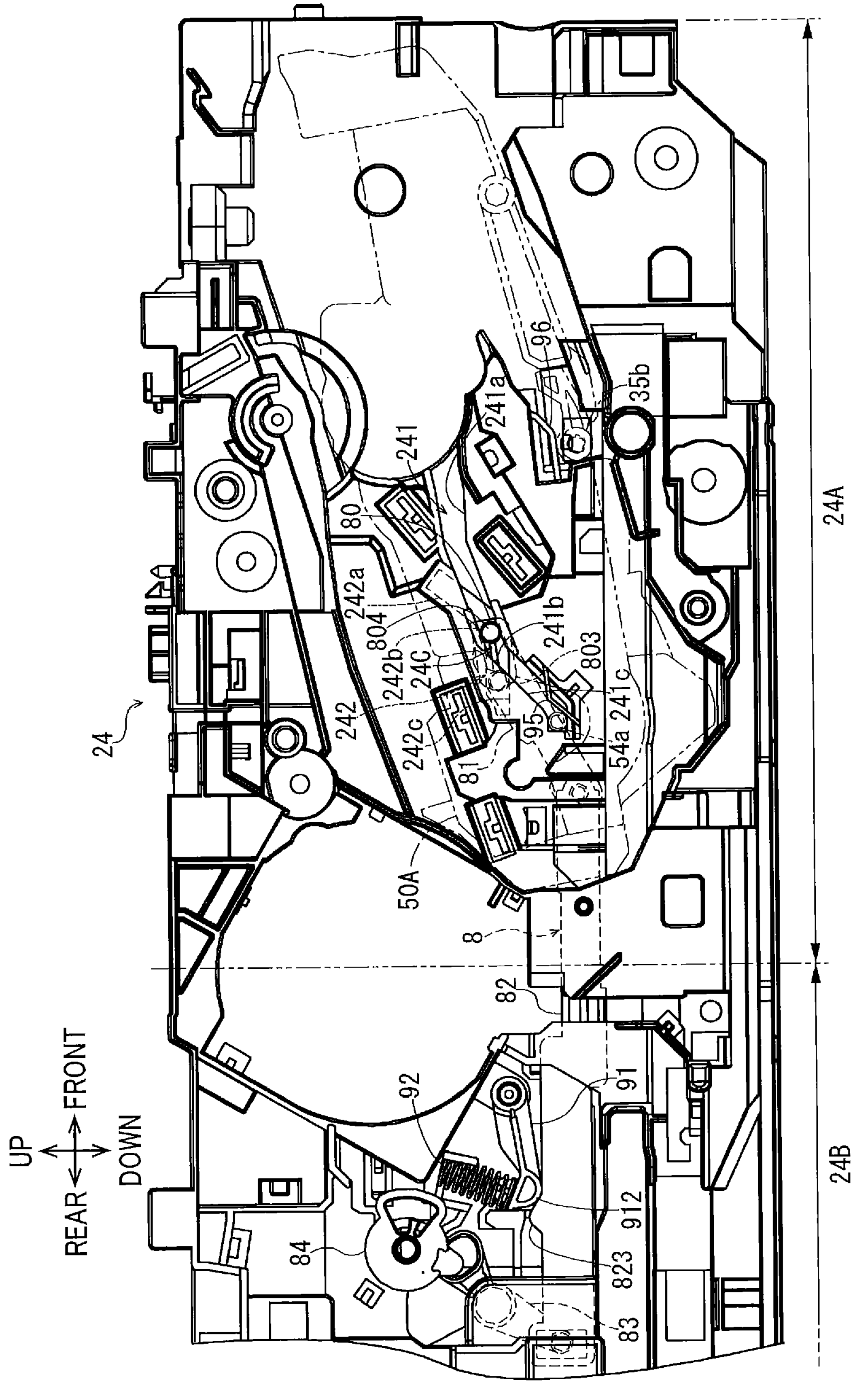
FIG. 19 is a side view of the first main frame, and particularly illustrating a state where the drum shaft is apart from the abutment piece, and the process cartridge is at an attached position thereof.

In accordance with the further insertion of the process cartridge 50 toward the attachment position from the position illustrated in FIG. 18, the drum shaft 54*a* moves from the intermediate portion 241*b* to the rear portion 241*c* of the cartridge rail 241, and then moves further in the attachment direction within the rear portion 241*c*. On the other hand, the first protrusion 803 of the abutment piece 80 remains in the rear portion 242*c* of the abutment piece rail 242, so that the drum shaft 54*a* separates away from the abutment piece 80. Thereafter, the process cartridge 50 reaches the attachment position as illustrated in FIG. 19 to complete the attachment of the process cartridge 50 to the housing 2.

In this way, the process cartridge 50 is movable from the attachment starting position where the leading end 50A of the process cartridge 50 is inserted in the housing 2 to the attachment position where the process cartridge 50 is completely attached to the housing 2. In the process of moving the process cartridge 50 from the attachment starting position to the attachment position, the shutter 64 is moved from the closed position to the open position in accordance with the movement of the abutment piece 80 which is contacted and moved by the drum shaft 54*a* of the process cartridge 50; and further, the process cartridge 50 and the abutment piece 80 are separated from each other when the process cartridge 50 arrives at the attachment position after the shutter 64 has been moved to the open position.

Here, for comparison, assume a case where the process cartridge 50 at the attachment position is still in abutment with the abutment piece 80 of the connection link 8 connected to the shutter 64. In this example, unnecessary force may be imparted on the attached process cartridge 50 from the abutment piece 80 when the shutter 64 is applied with a force for opening and closing the same. In contrast, according to the present embodiment, since the abutment piece 80 is in separation from the process cartridge 50 at the attachment position, it is unlikely that unnecessary force may be imparted from the abutment piece 80 on the process cartridge 50 attached to the housing 2. Hence, the connection link 8 according to the embodiment is less likely to have adverse effects in printing accuracy.

Still further, in the image-forming apparatus 1, in the process to move the process cartridge 50 from the attachment starting position to the attachment position, the process cartridge 50 abuts on the abutment piece 80 to move the shutter 64 to the open position from the closed position, and the lock 9 functions to fix the connection link 8 in position. Further, the process cartridge 50 can be separated from the abutment piece 80 at a position downstream, in the inserting direction, of the position of the process cartridge 50 at which the lock 9 fixes the position of the connection link 8.

In this way, the process cartridge 50 is separated away from the abutment piece 80 when the process cartridge 50 arrives at the position further downstream than the position of the process cartridge 50 at which the connection link 8 is made stationary by the lock 9 after the shutter 64 is moved to the open position. This configuration can suppress application of unnecessary force from the abutment piece 80 to the process cartridge 50, thereby rendering the connection link 8 less likely to affect printing accuracy.

Further, in the image-forming apparatus 1, the connection link 8 includes the linear motion link 82, and the movement of the abutment piece 80 guided by the abutment piece rail 242 can be translated into the linear movement of the linear motion link 82. Accordingly, efficient driving power transmission from the abutment piece 80 to the shutter 64 can be attained, despite the fact that the process cartridge 50 is configured to be inserted into the housing 2 from its front side which is far remote from the rear side at which the fixing device 6 is positioned in the housing 2.

Further, the driving power is transmitted to the shutter 64 through the linear motion link 82 that is linearly movable and then through the second pivot link 83 and the third pivot link 84 both of which are pivotally movable. With this configuration, a space in the front-rear direction required for the power transmission to the shutter 64 can be made small. Accordingly, downsizing of the housing 2 can be realized.

Further, in the image-forming apparatus 1, the photosensitive drum 54 of the process cartridge 50 (which protrudes toward the first main frame 24) extends through the through-hole 24C and abuts on the abutment piece 80 of the connection link 8 during the attachment of the process cartridge 50 to the housing 2. With this structure, there is no need to additionally provide a guide protrusion configured to be received in the through-hole 24C to move the abutment piece 80 in the process cartridge 50, thereby simplifying the structure of the process cartridge 50.

Operations at the time of Detachment of Process Cartridge 50

Next, how the connection link 8 operates at the time of detachment of the process cartridge 50 from the housing 2 will be described.

At the time of detachment of the process cartridge 50 from the housing 2, the connection link 8 is configured to operate in reverse to the operations at the time of attachment of the process cartridge 50.

For detachment of the process cartridge 50, the process cartridge 50 at the attachment position illustrated in FIG. 19 is moved frontward relative to the housing 2 to move the drum shaft 54*a* in the rear portion 241*c* of the cartridge rail 241 toward downstream in a detachment direction. Here, the detachment direction represents a direction in which the process cartridge 50 is moved toward the outside of the housing 2 for withdrawal of the process cartridge 50 from the housing 2. As illustrated in FIG. 18, when the drum shaft 54*a* moving along the cartridge rail 241 reaches the intermediate portion 241*b* (the through-hole 24C), the drum shaft 54*a* comes into contact with the second protrusion 804 of the abutment piece 80.

As illustrated in FIG. 16, the abutment piece 80 in abutment with the drum shaft 54*a* is pushed by the drum shaft 54*a* to be moved toward further downstream in the detachment direction of the process cartridge 50. Accordingly, the first protrusion 803 of the abutment piece 80 is moved from the rear portion 242*c* to the intermediate portion 242*b* (the through-hole 24C) of the abutment piece rail 242.

In accordance with the movement of the abutment piece 80, the first pivot link 81 is pivotally moved upward to increase the inclination angle of the first pivot link 81 with respect to the horizontal direction, and at the same time the first pivot link 81 is moved frontward. In response to the pivotal movement and frontward movement of the first pivot link 81, the linear motion link 82 is linearly moved frontward. In accordance with the movement of the linear motion link 82, the connection hole 822 of the linear motion link 82 is brought into engagement with the engagement pin 832*a* of the second pivot link 83, so that the second pivot link 83 is pivotally moved in the clockwise direction in FIG. 15A to move the engagement pin 832*a* frontward. In accordance with the pivotal movement of the second pivot link 83, the connection hole 833*a* of the second pivot link 83 is brought into engagement with the engagement pin 842 of the third pivot link 84, so that the third pivot link 84 is pivotally moved in the counterclockwise direction in FIG. 15A to move the engagement pin 842 rearward.

As the process cartridge 50 is moved further in the detachment direction, the abutment piece 80 is moved further downstream in the detachment direction by the drum shaft 54*a* which is moving in the intermediate portion 241*b* (the through-hole 24C) of the cartridge rail 241. As illustrated in FIG. 13, when the second protrusion 804 of the abutment piece 80 arrives at the front portion 242*a* of the abutment piece rail 242, the abutment piece 80 pivotally moves, via the connection link 8, the shutter link 85 in the counterclockwise direction in FIG. 6A to move the engagement portion 853 downward.

Specifically, in accordance with the movement of the abutment piece 80, the third pivot link 84 is further pivotally moved to move the engagement pin 842 rearward. In accordance with the pivotal movement of the third pivot link 84, the coil spring 86 is pivotally moved, so that the first arm 861 of the coil spring 86 comes into engagement with the engagement pin 854 of the shutter link 85 from above as illustrated in FIG. 6A Due to this engagement between the first arm 861 and the engagement pin 854, the shutter link 85 is pivotally moved such that the engagement portion 853 is moved downward. In this way, the shutter 64 is moved from the open position to the closed position.

In the image-forming apparatus 1, the drum shaft 54*a* abuts on the first protrusion 803 of the abutment piece 80, thereby causing the connection link 8 to operate such that the shutter 64 can from the closed position to the open position during the attachment of the process cartridge 50 to the housing 2; and the drum shaft 54*a* abuts on the second protrusion 804 of the abutment piece 80, thereby causing the connection link 8 to operate such that the shutter 64 can move from the open position to the closed position during the detachment of the process cartridge 50 from the housing 2. With this construction, the connection link 8 can be operated in association with both the attachment and detachment of the process cartridge 50 to and from the housing 2, through a simple structure.

<Urging Spring 95>

Figure 20A:
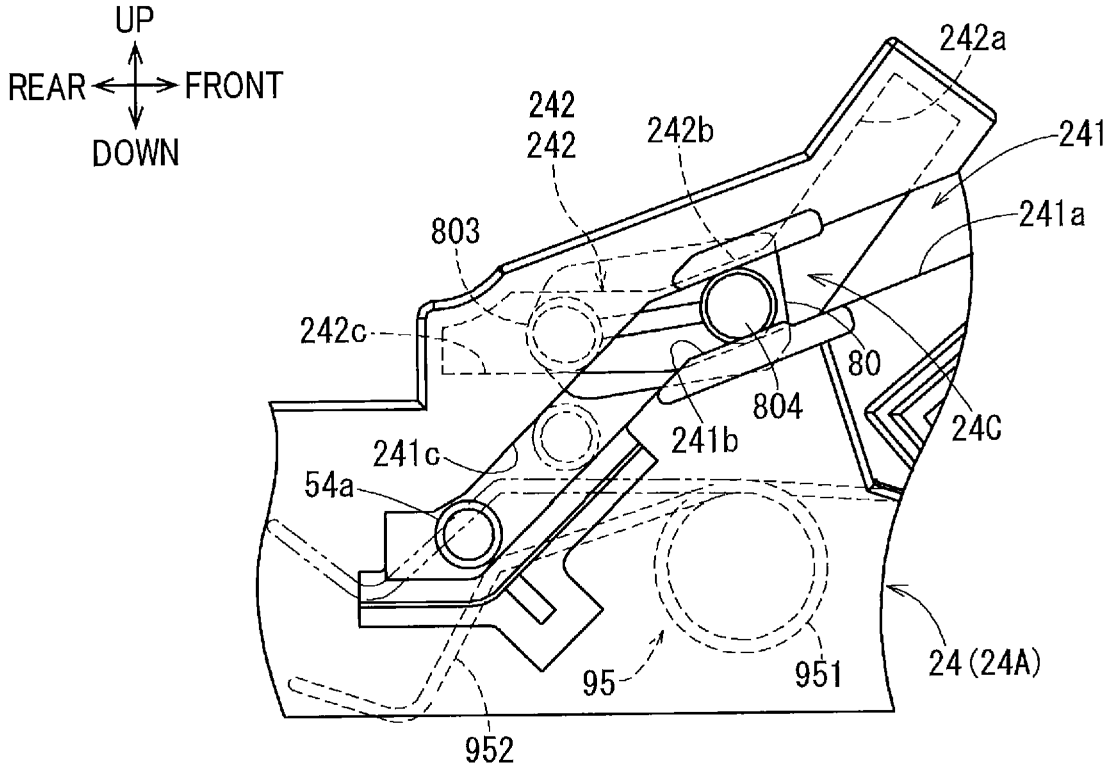
FIG. 20A is a side view illustrating an urging spring configured to abut on the drum shaft to urge the process cartridge to the attached position, and particularly illustrating a first position and a second position of the urging spring.
Figure 20B:
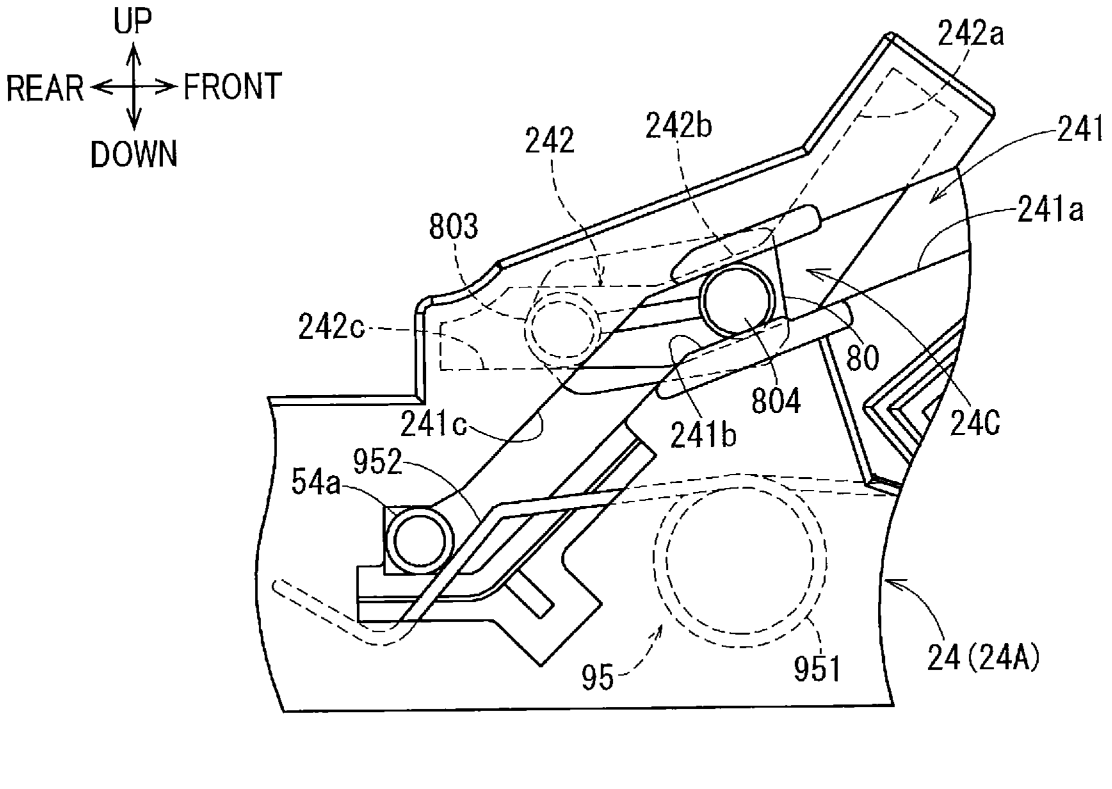
FIG. 20B is a side view illustrating the urging spring at a third position.

As illustrated in FIGS. 20A and 20B, an urging spring 95 is provided at the housing 2. The urging spring 95 is configured to abut on the drum shaft 54*a* to urge the process cartridge 50 into the attachment position. The urging spring 95 is supported by the first main frame 24. The urging spring 95 includes a base portion 951 supported by the first main frame 24, and an arm portion 952 extending from the base portion 951.

The arm portion 952 has a part that is entered in the rear portion 241*c* of the cartridge rail 241. The arm portion 952 is movable among a first position (indicated by a two-dotted chain line in FIG. 20A), a second position (indicated by a broken line in FIG. 20A), and a third position (indicated by a solid line in FIG. 20B). At the first position, the arm portion 952 does not make contact with the drum shaft 54*a*. At the second position, the arm portion 952 is retracted from the rear portion 241*c* by the abutment of the drum shaft 54*a* on the arm portion 952 before the process cartridge 50 reaches the attachment position. At the third position, the arm portion 952 is in abutment with the drum shaft 54*a* of the process cartridge 50 which is at the attachment position.

As illustrated in FIG. 20A, the arm portion 952 of the urging spring 95 is at the first position when the drum shaft 54*a* moving in the rear portion 241*c* of the cartridge rail 241 in the attachment direction does not abut on the arm portion 952. When the drum shaft 54*a* moving in the attachment direction abuts on the arm portion 952 within the rear portion 241*c*, the arm portion 952 is pressed by the drum shaft 54*a* and is moved downward.

The arm portion 952 having moved to the position lower than the first position provides an urging force for urging the drum shaft 54*a* upward. The urging force of the arm portion 952 that is pressed downward by the drum shaft 54*a* becomes greater as the arm portion 952 is displaced downward further from the first position. The urging force becomes maximum when the arm portion 952 reaches the second position where the arm portion 952 is retracted from the rear portion 241*c*.

The drum shaft 54*a* moves further in the attachment direction to reach the attachment position after the arm portion 952 is moved to the second position. When the drum shaft 54*a* arrives at the attachment position, the arm portion 952 is moved upward from the second position to the third position. At the third position, the arm portion 952 urges the drum shaft 54*a* with the urging force smaller than the urging force at the second position. The process cartridge 50 is urged toward the attachment position through the drum shaft 54*a* by the urging force of the arm portion 952 at the third position.

In this way, the arm portion 952 of the urging spring 95 is configured to abut on the drum shaft 54*a* while the process cartridge 50 moves toward the attachment position from a position upstream of the attachment position in the inserting direction, such that the arm portion 952 is caused to move to the second position providing the maximum urging force to the process cartridge 50.

When the arm portion 952 moves to the second position, the process cartridge 50 is at such a location that the drum shaft 54*a* is positioned in the rear portion 241*c* of the cartridge rail 241. Further, when the urging force applied from the locking spring 92 to the linear motion link 82 becomes maximum, the process cartridge 50 is at such a location that the drum shaft 54*a* is positioned in the intermediate portion 241*b* (the through-hole 24C) of the cartridge rail 241.

That is, the position of the process cartridge 50 when the pressing load of the locking spring 92 becomes maximum is upstream, in the inserting direction, relative to the position of the process cartridge 50 when the urging force of the urging spring 95 becomes maximum. Therefore, the timing at which the urging force of the urging spring 95 becomes maximum is deviated (different) from the timing at which the urging force of the locking spring 92 becomes maximum during the attachment and detachment of the process cartridge 50 to and from the housing 2. This configuration can restrain an increase in load required for moving the process cartridge 50 in the attachment direction and the detachment direction.

<Roller Spring 96>

Figure 21:
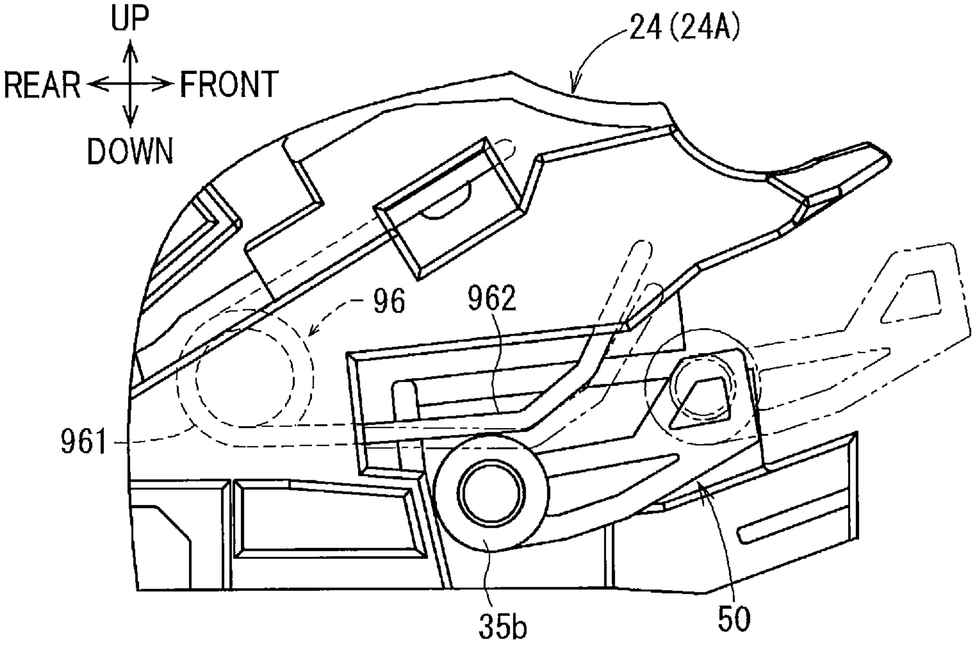
FIG. 21 is a side view illustrating a roller spring configured to urge a pinch roller of the process cartridge in a state where the process cartridge is at the attached position.

As illustrated in FIG. 21, a roller spring 96 is provided in the housing 2 for urging the pinch roller 35*b* when the process cartridge 50 is at the attachment position. The roller spring 96 is supported by the first main frame 24. The roller spring 96 includes a base portion 961 supported by the first main frame 24, and an arm portion 962 extending from the base portion 961.

The arm portion 962 is movable between a fourth position (indicated by a two-dotted chain line in FIG. 21) and a fifth position (indicated by a solid line in FIG. 21). At the fourth position, the pinch roller 35*b* does not abut on the arm portion 962. At the fifth position, the arm portion 962 is contacted by the pinch roller 35*b* of the process cartridge 50 at the attachment position.

When the pinch roller 35*b* does not abut on the arm portion 962 (in a state where the pinch roller 35*b* is at the position illustrated by the two-dotted chain line in FIG. 21), the arm portion 962 of the roller spring 96 is at the fourth position. As the process cartridge 50 is inserted further into the housing 2 from this state where the pinch roller 35*b* is separated from the arm portion 962, the pinch roller 35*b* comes into abutment with the arm portion 962 to move the arm portion 962 upward. The process cartridge 50 then reaches the attachment position while the abutment between the pinch roller 35*b* and the arm portion 962 is maintained.

In a state where the process cartridge 50 is at the attachment position, the arm portion 962 is pressed upward by the pinch roller 35*b* (see the solid line in FIG. 21) so that the arm portion 962 is moved to the fifth position higher than the fourth position.

The arm portion 962 having moved upward from the fourth position provides an urging force for urging the pinch roller 35*b* downward. The urging force of the arm portion 962 becomes greater as the arm portion 962 is displaced further upward from the fourth position. The amount of upward displacement of the arm portion 962 increases until the process cartridge 50 reaches the attachment position after the pinch roller 35*b* starts contacting with the arm portion 962. The amount of the upward displacement of the arm portion 962 becomes maximum when the process cartridge 50 reaches the attachment position. That is, the urging force of the arm portion 962 becomes maximum when the process cartridge 50 is at the attachment position.

In this way, the arm portion 962 of the roller spring 96 abuts on the pinch roller 35*b* during the process where the process cartridge 50 moves to the attachment position from the position upstream of the attachment position in the inserting direction, and the arm portion 962 is moved to the fifth position at which the arm portion 962 imparts its maximum urging force on the pinch roller 35*b*.

The process cartridge 50 is at the attachment position when the arm portion 962 is at the fifth position. Further, when the locking spring 92 imparts its maximum urging force on the linear motion link 82, the process cartridge 50 is at a such location that the drum shaft 54*a* is positioned in the intermediate portion 241*b* (the through-hole 24C) of the cartridge rail 241.

In other words, the position of the process cartridge 50 where the urging force of the locking spring 92 becomes maximum is upstream, in the inserting direction, relative to the position of the process cartridge 50 where the urging force of the roller spring 96 becomes maximum. That is, the timing at which the urging force of the roller spring 96 becomes maximum is deviated (different) from the timing at which the urging force of the locking spring 92 becomes maximum during the attachment and detachment of the process cartridge 50 to and from the housing 2. This configuration can suppress an increase in load required for moving the process cartridge 50 in the attachment direction and the detachment direction.

Incidentally, in the first embodiment, the urging spring 95 and the roller spring 96 are acting on the process cartridge 50 (through the drum shaft 54*a* and the pinch roller 35*b*) in the state where the process cartridge 50 is at the attachment position. However, the urging spring 95 and the roller spring 96 may be omitted, or alternative components other than the urging spring 95 and roller spring 96 may be provided to act on the process cartridge 50 at the attachment position.

2. SECOND EMBODIMENT

Next, an image-forming apparatus 1000 according to a second embodiment of the present disclosure will be described with reference to FIGS. 22 through 40.

The image-forming apparatus 1000 of the second embodiment is different from the image-forming apparatus 1 of the first embodiment in the structure to realize opening and closing of the shutter 64 (1064) in association with the attachment/detachment of the process cartridge 50 relative to the housing 2 (1002). Hereinafter, for simplifying description, those parts and components the same as those of the first embodiment will be designated by the same reference numerals as those in the first embodiment and descriptions therefor will be omitted.

<Fixing Device 1006>

Figure 22:
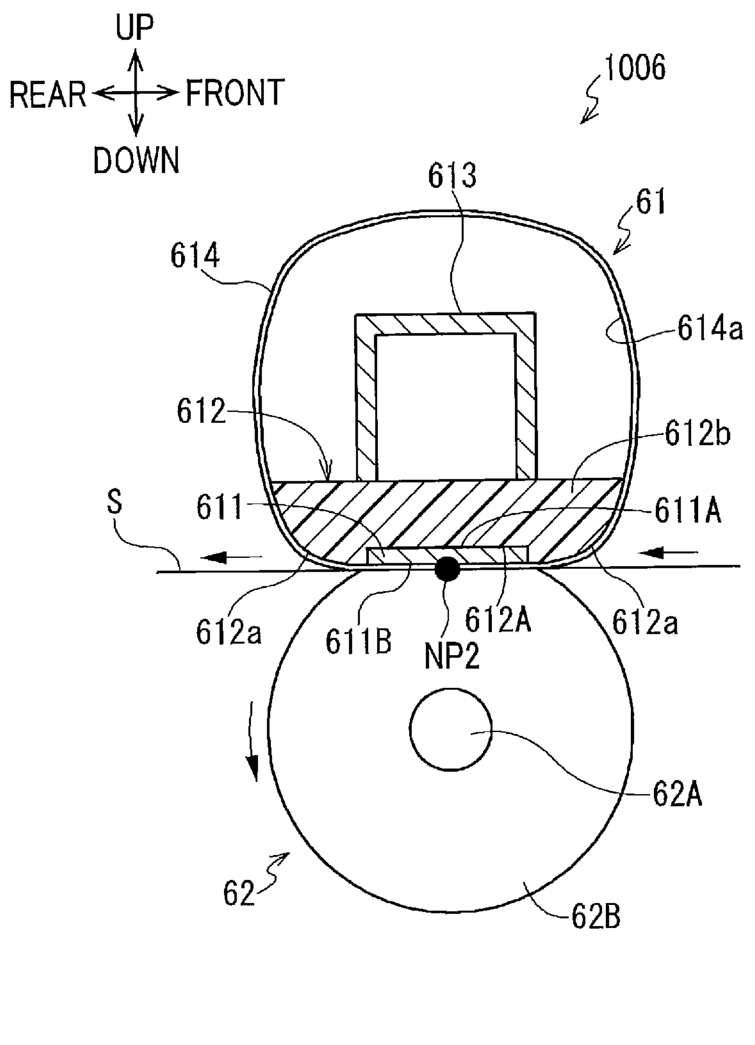
FIG. 22 is a cross-sectional side view illustrating a fixing device in an image-forming apparatus according to a second embodiment.
Figure 23A:
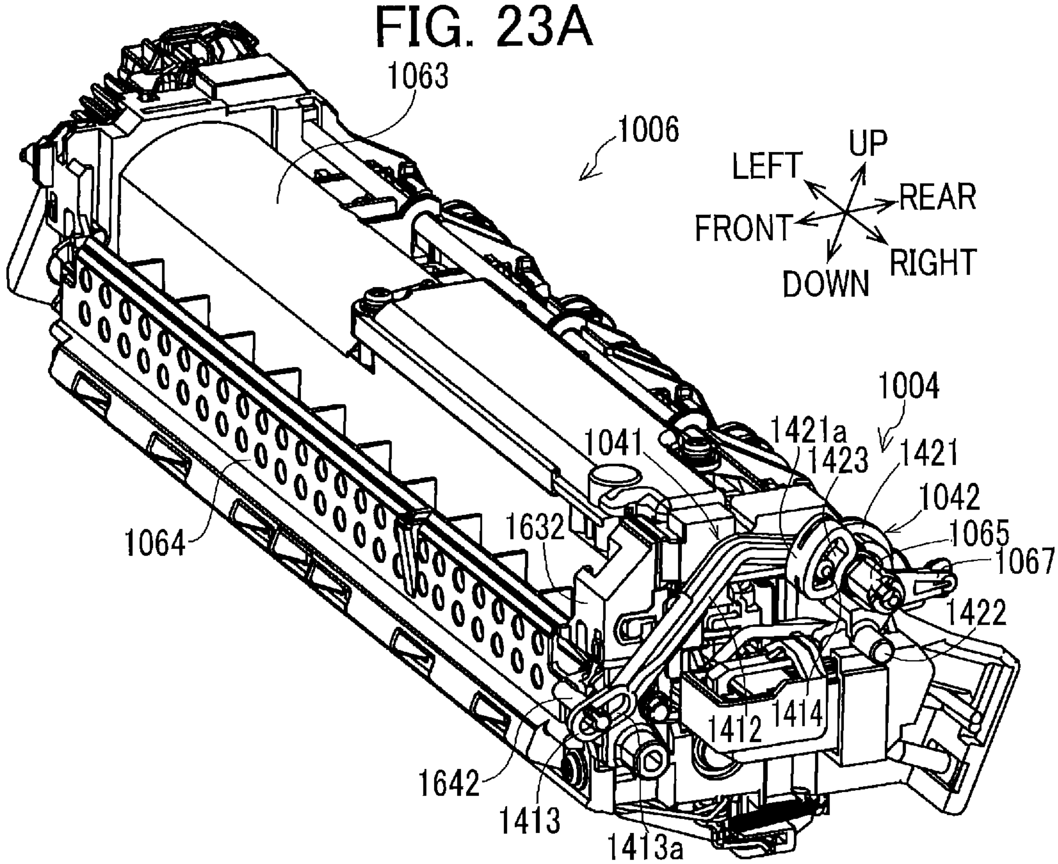
FIG. 23A is a perspective view of the fixing device in a state where a shutter thereof is at its closed position.
Figure 23B:
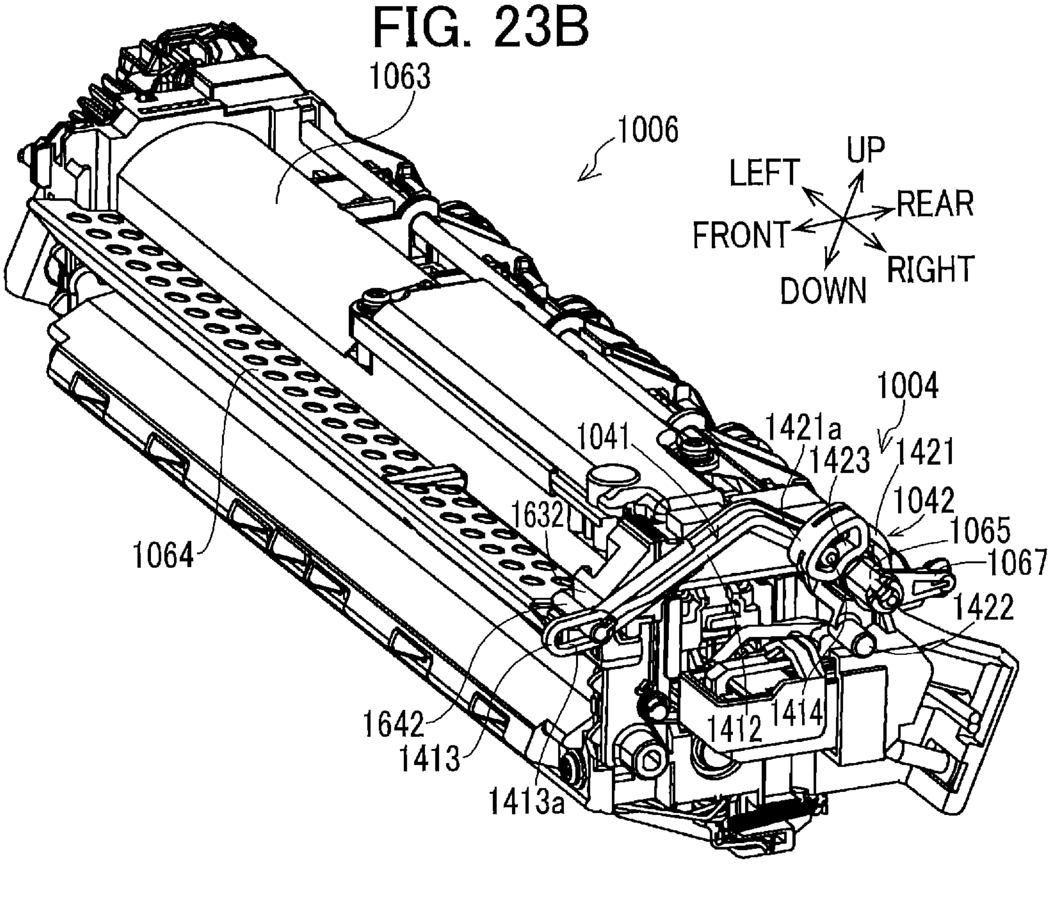
FIG. 23B is a perspective view of the fixing device in a state where the shutter is at its open position.

The image-forming apparatus 1000 includes a fixing device 1006 illustrated in FIG. 22. The fixing device 1006 includes a fixing frame 1063, a shutter 1064 supported by the fixing frame 1063, and a nipping pressure changing mechanism 1066 (illustrated in FIG. 32), in addition to the heating unit 61 and the pressure roller 62. The fixing frame 1063 supports the heating unit 61 and pressure roller 62, as in the first embodiment. Further, in the fixing device 1006, the heating unit 61 is urged toward the pressure roller 62 by the nipping pressure changing mechanism 1066.

As illustrated in FIG. 22, in the fixing device 1006, the pressure roller 62 and the heating unit 61 (heater 611) define a nipping point NP2 therebetween at which the sheet S is nipped between the pressure roller 62 and the heater 611 through the belt 614. That is, in the fixing device 1006, the pressure roller 62 is configured to apply heat and pressure to the sheet S in cooperation with the heating unit 61 (heater 611) at the nipping point NP2.

The shutter 1064 is positioned upstream of the first opening 63*a* of the fixing frame 1063 positioned upstream thereof in the sheet conveying direction (refer to FIG. 1), as in the first embodiment.

Referring to FIGS. 23A and 24-27, the shutter 1064 includes a shutter body, a pair of pivot shafts 1641 extending from the shutter body in the left-right direction, and a connection shaft 1642 extending from the shutter body in a direction parallel to the pivot shafts 1641. Each pivot shaft 1641 is rotatably supported by the fixing frame 1063. The shutter 1064 is pivotally movable about axes of the respective pivot shafts 1641 between a closed position where the shutter 1064 closes the first opening 63*a* and an open position where the shutter 1064 opens the first opening 63*a*. The pivot shafts 1641 are provided respectively at right and left end portions of the shutter body. The connection shaft 1642 protrudes rightward from the right end portion of the shutter body.

Referring to FIGS. 24 through 26B, the fixing frame 1063 has a first abutment surface 1631 and a second abutment surface 1632. The shutter 1064 is configured to abut on the first abutment surface 1631 when the shutter 1064 is at the closed position, whereas the shutter 1064 is configured to abut on the second abutment surface 1632 when the shutter 1064 is at the open position.

The first abutment surface 1631 is positioned at an upstream end of the fixing frame 1063 in the sheet conveying direction (at a front end of the fixing frame 1063). The first abutment surface 1631 faces upstream in the sheet conveying direction. When the shutter 1064 is at the closed position, a stopper 1643 (see FIGS. 24 and 27B) of the shutter 1064 is configured to abut on the first abutment surface 1631. The abutment of the stopper 1643 on the first abutment surface 1631 can restrict the shutter 1064 from moving (pivoting) further counterclockwise in FIG. 24 beyond the closed position.

The second abutment surface 1632 also faces upstream in the sheet conveying direction and is positioned at the upstream end of the fixing frame 1063 in the sheet conveying direction. The connection shaft 1642 of the shutter 1064 is configured to abut on the second abutment surface 1632 when the shutter 1064 is at the open position. The abutment of the connection shaft 1642 on the second abutment surface 1632 can restrict the shutter 1064 from moving (pivoting) further clockwise in FIG. 24 beyond the open position.

Incidentally, as in the first embodiment, the heating unit 61 includes the heater 611 and the belt 614 in the fixing device 1006. Alternatively, the heating unit may be a heat roller incorporating a heater therein. Further, instead of the pressure roller 62, a pressure belt urged toward the heat roller by an urging member may be used as a pressure member configured to apply pressure to the heat roller.

<Opening/Closing Link 1004>

As illustrated in FIGS. 23A, 23B, 25A through 26B, and 28, the image-forming apparatus 1000 includes an opening/closing link 1004 connected to the shutter 1064 for moving the shutter 1064 between the open position and the closed position. The opening/closing link 1004 includes a shutter link 1041, a link cam 1042, and a coil spring 1043.

The shutter link 1041 is connected to the shutter 1064 and is configured to move the shutter 1064 between the open position and the closed position. The fixing device 1006 includes a rotation shaft 1065 rotatably supported by the fixing frame 1063 and extending in the left-right direction from a right end portion of the fixing frame 1063. The shutter link 1041 is supported by the rotation shaft 1065 such that the shutter link 1041 is pivotally movable about the rotation shaft 1065. An operation lever 1067 is fixed to a right end portion of the rotation shaft 1065 so that the operation lever 1067 can pivot along with the rotation of the rotation shaft 1065. Operations to the operation lever 1067 can rotate the rotation shaft 1065 about an axis thereof.

The shutter link 1041 is positioned on the right end portion of the fixing device 1006. The shutter link 1041 includes a base portion 1411, an arm portion 1412, an engagement portion 1413, and a boss 1414.

The base portion 1411 is positioned at a rear end of the arm portion 1412. The base portion 1411 has a hollow cylindrical shape having a through-hole extending in the left-right direction. The rotation shaft 1065 penetrates through the through-hole such that the base portion 1411 is rotatable about the rotation shaft 1065. The arm portion 1412 has a rod-like shape extending frontward from the base portion 1411. Specifically, the arm portion 1412 has a generally L-shape extending frontward from the base portion 1411 and then bending downward. The engagement portion 1413 is positioned at a front end of the arm portion 1412. The engagement portion 1413 has an elongated slot 1413*a* elongated in the front-rear direction. The connection shaft 1642 of the shutter 1064 is inserted in the elongated slot 1413*a*. The connection shaft 1642 received in the elongated slot 1413*a* is engageable with the engagement portion 1413 to establish connection between the connection shaft 1642 and the shutter link 1041.

The shutter link 1041 is pivotally movable about an axis of the base portion 1411 (the axis of the rotation shaft 1065) such that the engagement portion 1413 is movable upward and downward in the up-down direction. When the shutter link 1041 pivots downward to move the engagement portion 1413 downward, the shutter 1064 is moved to the closed position (illustrated in FIGS. 23A and 25A). When the shutter link 1041 pivots upward to move the engagement portion 1413 upward, the shutter 1064 is moved to the open position (illustrated in FIGS. 23B and 25B). The boss 1414 protrudes rightward from the arm portion 1412 at a position close to the base portion 1411.

Figure 25A:
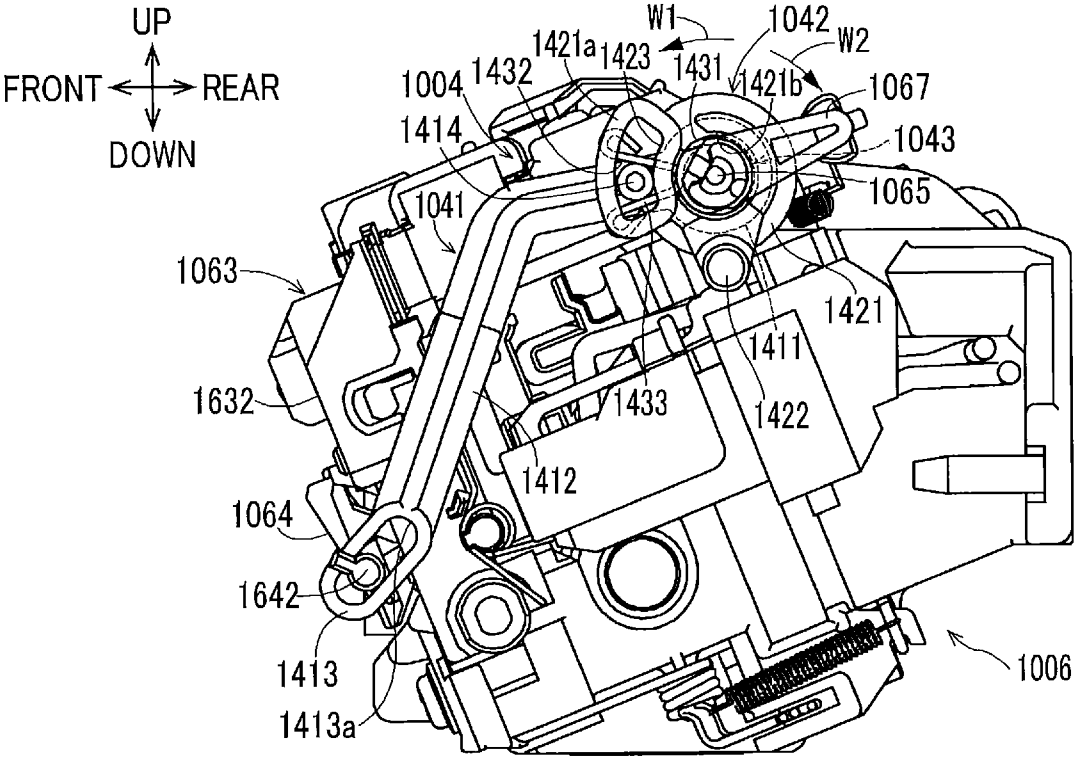
FIG. 25A is a side view of the fixing device in the state where the shutter is at the closed position.
Figure 25B:
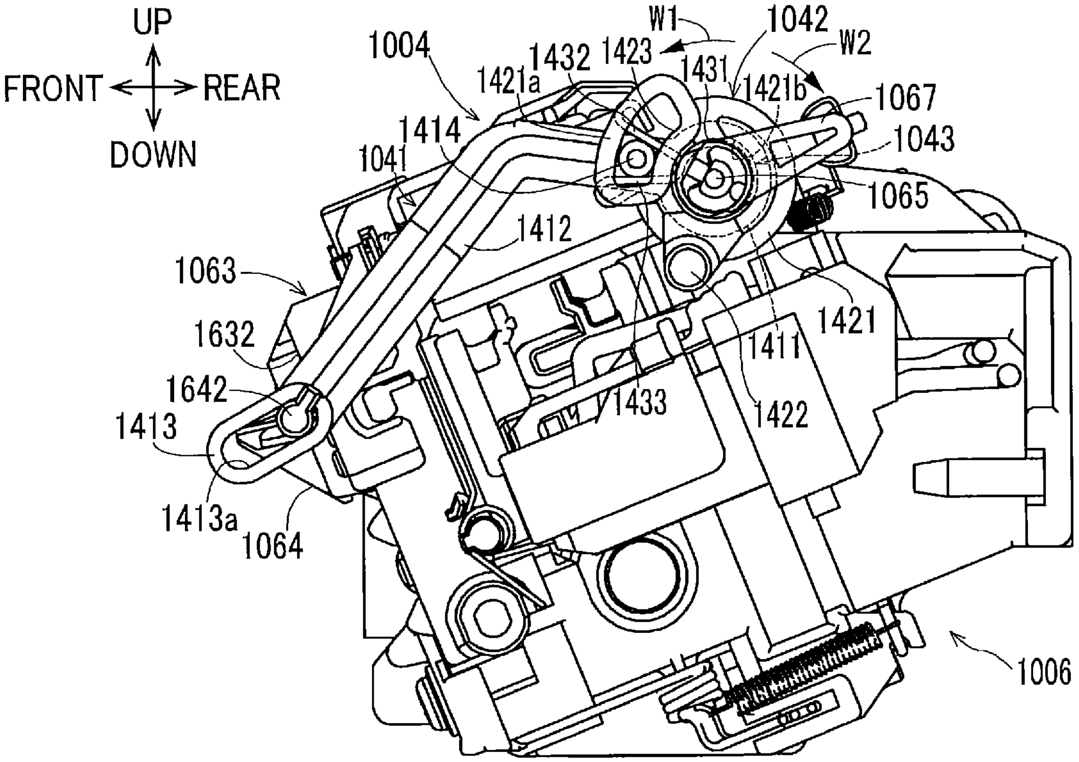
FIG. 25B is a side view of the fixing device in the state where the shutter is at the open position.
Figure 26A:
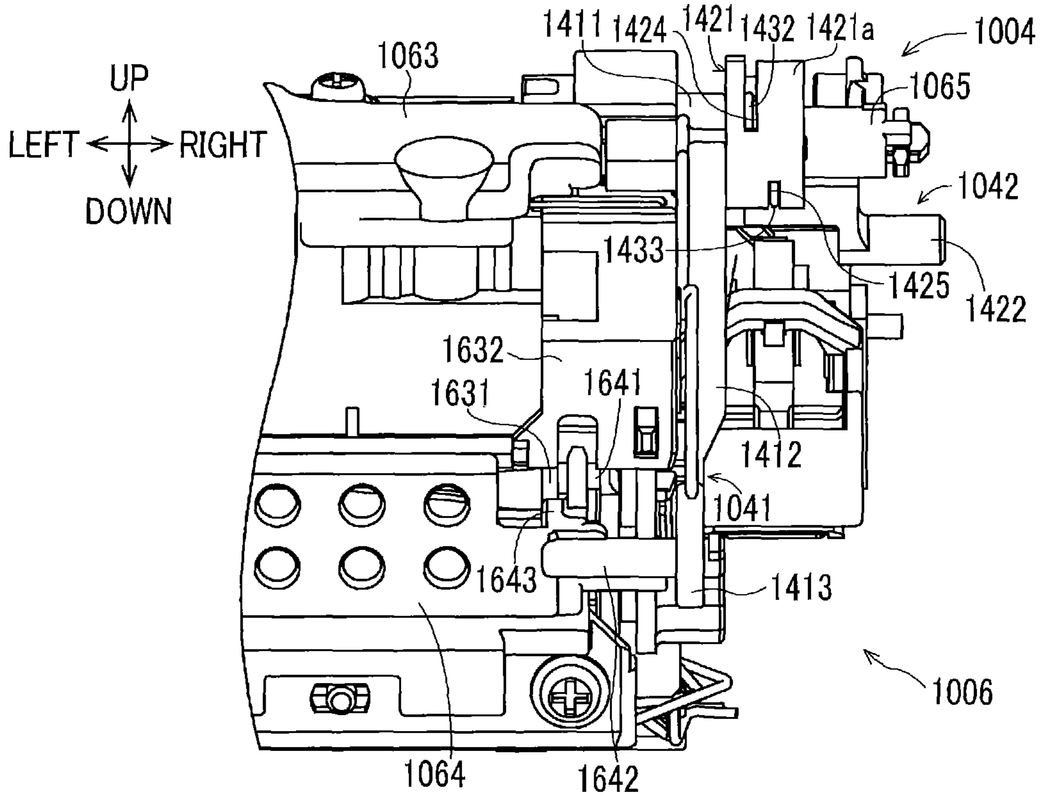
FIG. 26A is a plan view of the fixing device in the state where the shutter is at the closed position.
Figure 26B:
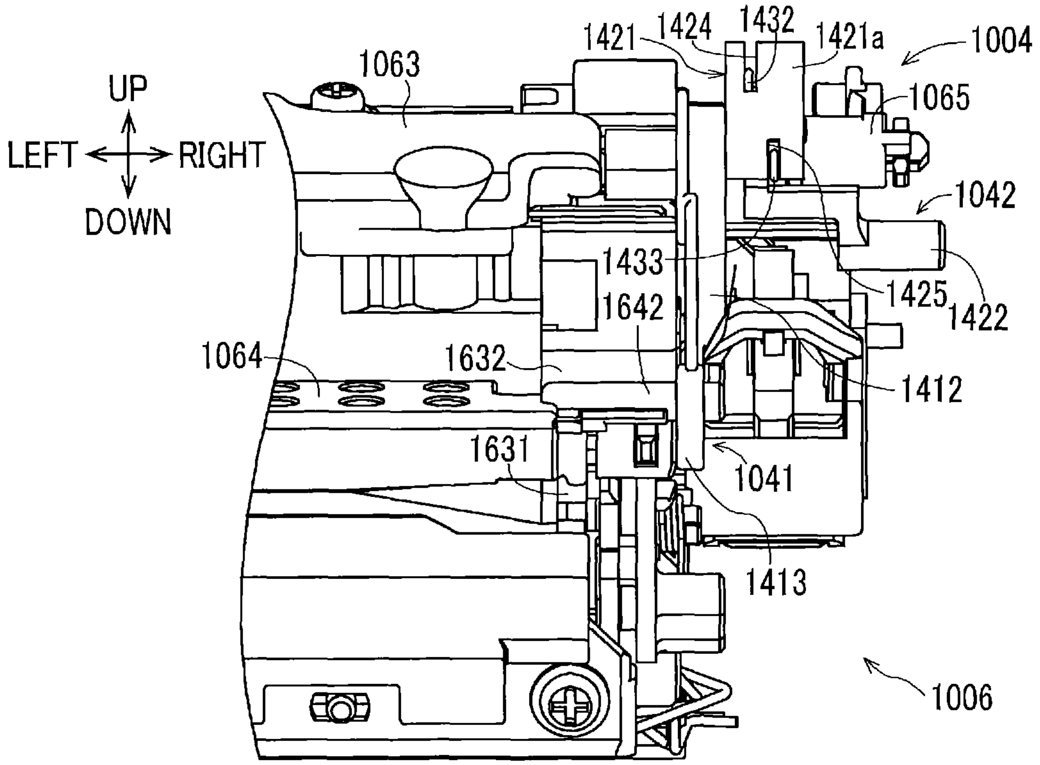
FIG. 26B is a plan view of the fixing device in the state where the shutter is at the open position.
Figure 27A:
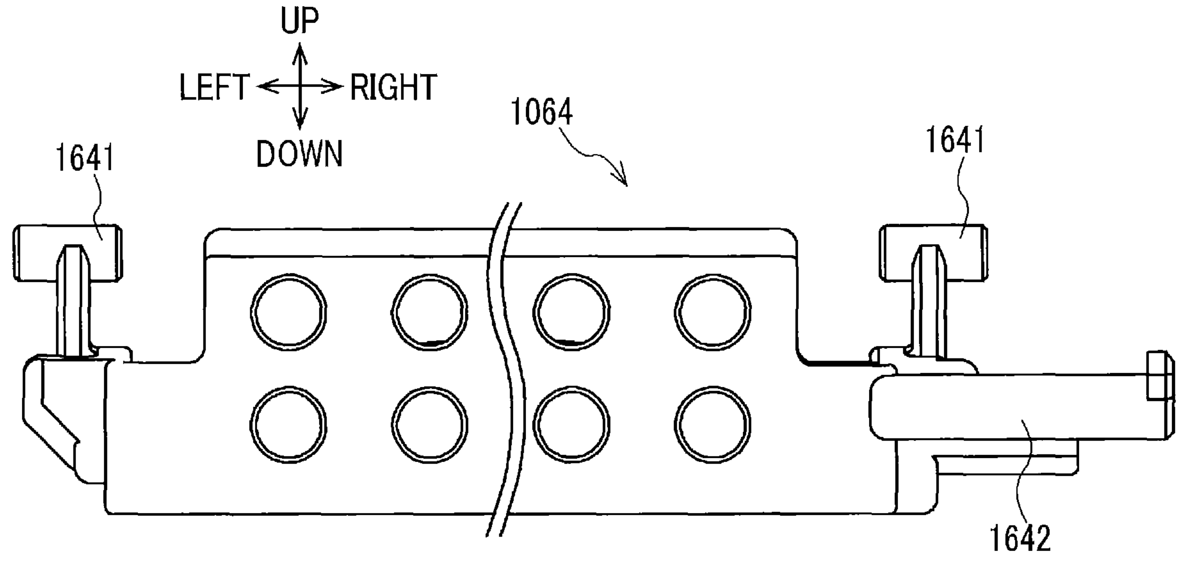
FIG. 27A is a plan view of the shutter.
Figure 27B:
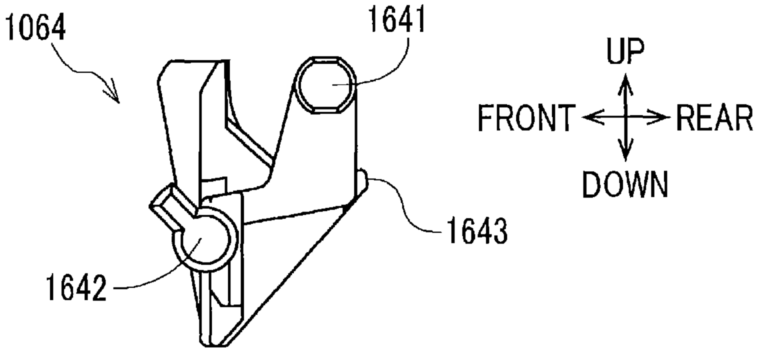
FIG. 27B is a side view of the shutter.

The link cam 1042 is connectable to the shutter link 1041 such that the link cam 1042 is movable in a first direction W1 and a second direction W2 opposite to the first direction W1, as depicted in FIGS. 25A and 25B. The link cam 1042 is pivotably movably supported by the rotation shaft 1065 of the fixing device 1006. That is, the link cam 1042 is coaxial with the rotation shaft 1065. The link cam 1042 is pivotally movable about the rotation shaft 1065 in the first direction W1 and in the second direction W2. In the present embodiment, the first direction W1 corresponds to a counterclockwise direction in FIGS. 25A and 25B, and the second direction W2 corresponds to a clockwise direction in FIGS. 25A and 25B. The shutter link 1041 and the link cam 1042 are both supported by the rotation shaft 1065 such that the shutter link 1041 and link cam 1042 are pivotally movable about the same axis (the axis of the rotation shaft 1065) relative to the fixing frame 1063.

The link cam 1042 includes a link cam body 1421 pivotally movably supported by the rotation shaft 1065, and a protrusion 1422 protruding rightward from the link cam body 1421. The link cam body 1421 includes an operation cam 1421*a*. The operation cam 1421*a* is at a different position in phase from the protrusion 1422 in a circumferential direction of the link cam body 1421. The operation cam 1421*a* of the link cam body 1421 has a through-hole 1423 penetrating through the operation cam 1421*a* in the left-right direction which is coincident with the axial direction of the rotation shaft 1065. The boss 1414 of the shutter link 1041 is positioned inside the through-hole 1423 of the link cam 1042.

Figure 28:
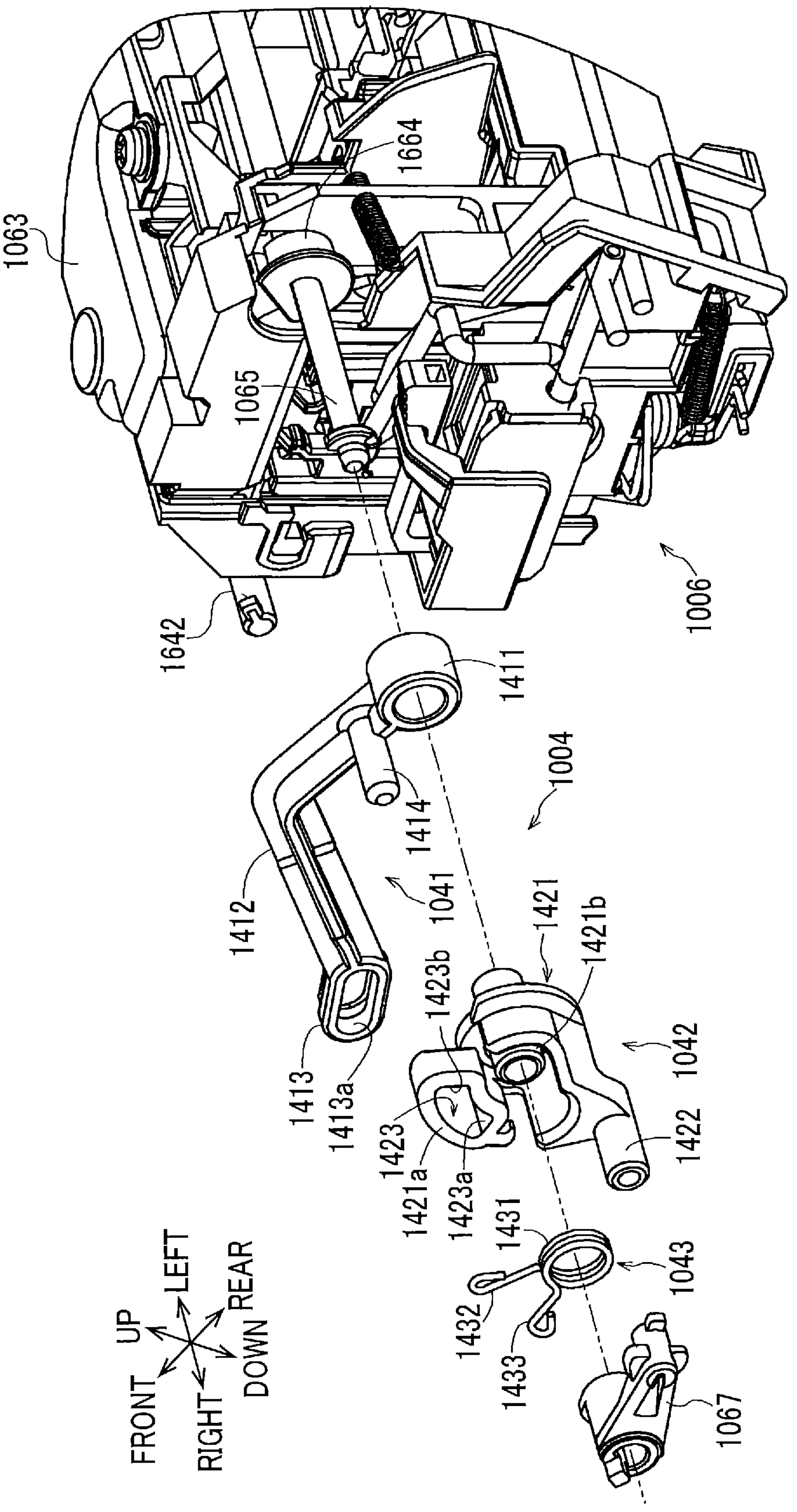
FIG. 28 is an exploded perspective view of an opening/closing link in the image-forming apparatus according to the second embodiment.
Figure 29:
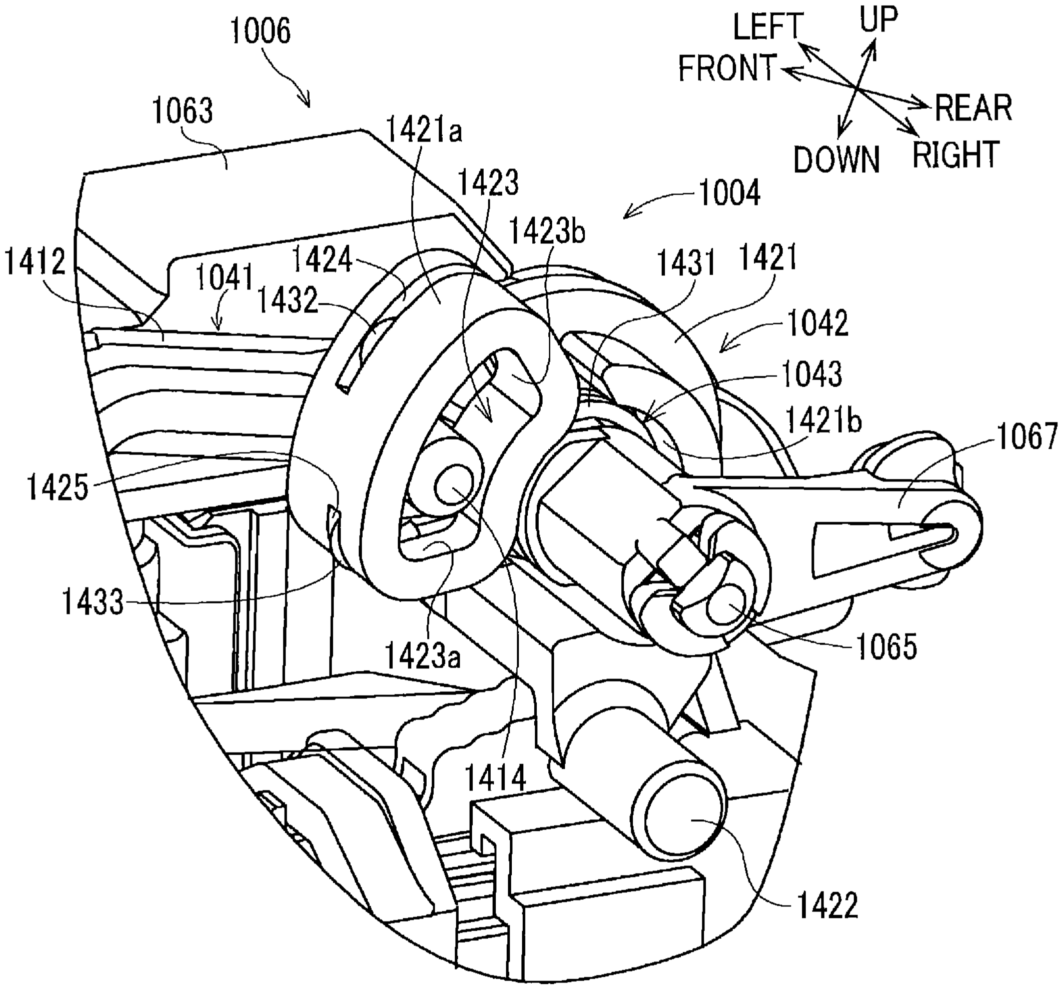
FIG. 29 is a perspective view illustrating the opening/closing link.

The through-hole 1423 has an elongated arcuate shape centered on the axis of the rotation shaft 1065. The through-hole 1423 is defined by: two opposing end faces radially opposing each other (will be referred to as "radially inner side" and "radially outer side"); and a first end face 1423*a* and a second end face 1423*b* opposing each other in the circumferential direction (or a longitudinal direction) of the through-hole 1423, as illustrated in FIGS. 28 and 29. With respect to the circumferential direction of the through-hole 1423, the first end face 1423*a* is positioned downstream of the second end face 1423*b* in the first direction W1, and the second end face 1423*b* is positioned downstream of the first end face 1423*a* in the second direction W2.

Referring to FIGS. 28 and 29, the link cam body 1421 is formed with a supporting groove 1421*b*. The operation cam 1421*a* is positioned radially outward of the supporting groove 1421*b*. Further, the protrusion 1422 protrudes rightward from the link cam body 1421 at a position radially outward of the supporting groove 1421*b*.

As illustrated in FIGS. 25A, 25B, and 28 through 31B, the coil spring 1043 is formed by bending a metal wire having resiliency. The coil spring 1043 includes a coil part 1431, a first arm part 1432, and a second arm part 1433.

The coil part 1431 is formed by helically winding the metal wire. The coil part 1431 is fitted with the supporting groove 1421*b* of the link cam body 1421. The coil part 1431 is thus supported by the link cam body 1421.

The first arm part 1432 extends radially outward from the coil part 1431. The first arm part 1432 enters the through-hole 1423 from the radially inner side toward the radially outer side of the through-hole 1423, and is positioned inside the through-hole 1423. The second arm part 1433 extends radially outward from the coil part 1431 at a position different from the position of the first arm part 1432 in the circumferential direction of the link cam body 1421. The second arm part 1433 is also entered in the through-hole 1423 in a radial direction thereof from the radially inner side toward the radially outer side and is positioned inside the through-hole 1423. The first arm part 1432 is positioned above the boss 1414 in the through-hole 1423, while the second arm part 1433 is positioned below the boss 1414 in the through-hole 1423.

The operation cam 1421*a* of the link cam body 1421 further has a first engagement groove 1424 and a second engagement groove 1425.

Figure 31A:
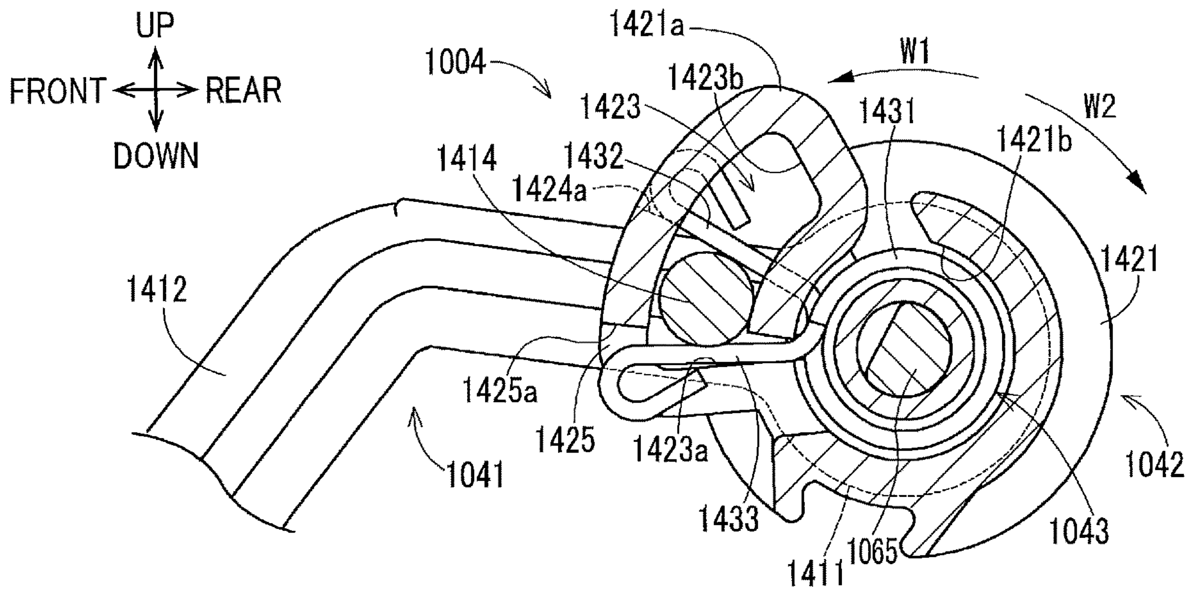
FIG. 31A is a cross-sectional side view of the opening/closing link in the state where the shutter is at the open position.
Figure 31B:
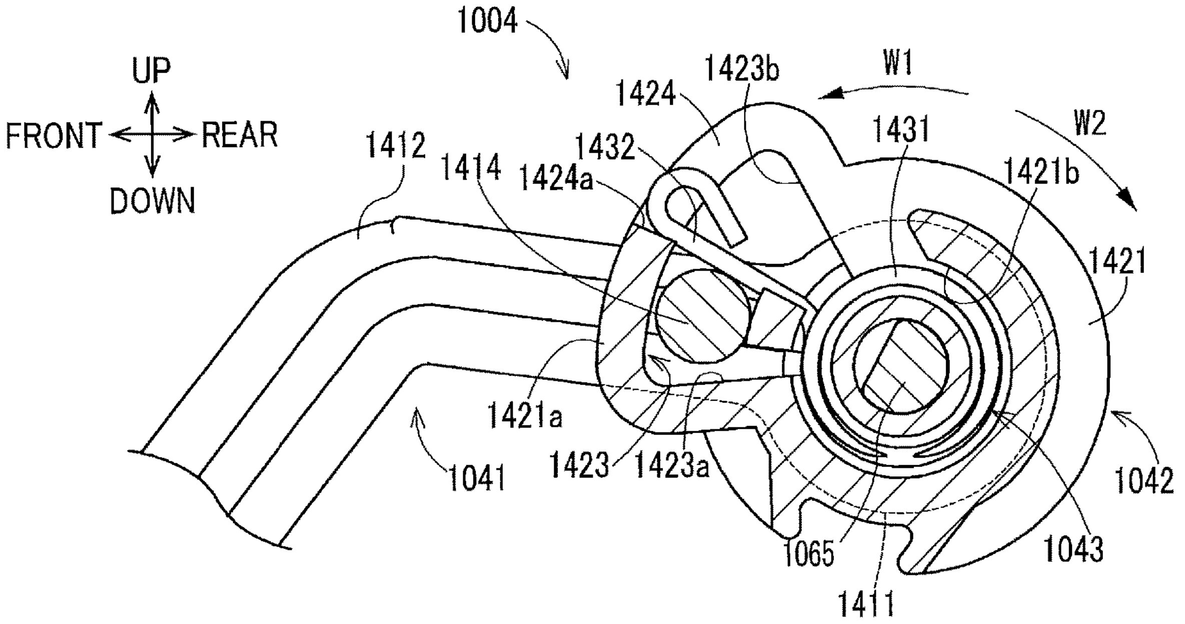
FIG. 31B is another cross-sectional side view of the opening/closing link in the state where the shutter is at the open position.

The first engagement groove 1424 is a notched groove formed in a radially outer peripheral surface of the operation cam 1421*a* to extend in the circumferential direction which corresponds to the first direction W1 and the second direction W2. Specifically, the first engagement groove 1424 has an end surface positioned most downstream in the second direction W2, and another end surface (first groove bottom 1424*a*) positioned most downstream in the first direction W1. The first arm part 1432 of the coil spring 1043 is configured to abut on the first groove bottom 1424*a*, as illustrated in FIGS. 31A and 31B. The abutment of the first arm part 1432 on the first groove bottom 1424*a* functions to restrict the first arm part 1432 from moving further downstream in the first direction W1 relative to the link cam body 1421.

On the other hand, the first arm part 1432 in abutment with the first groove bottom 1424*a* is further resiliently deformable inside the first engagement groove 1424 so that the first arm part 1432 can still move in the second direction W2. That is, the first engagement groove 1424 is configured to engage the first arm part 1432 to restrict the first arm part 1432 from moving in the first direction W1 (toward one side in the circumferential direction of the link cam body 1421).

Figure 30A:
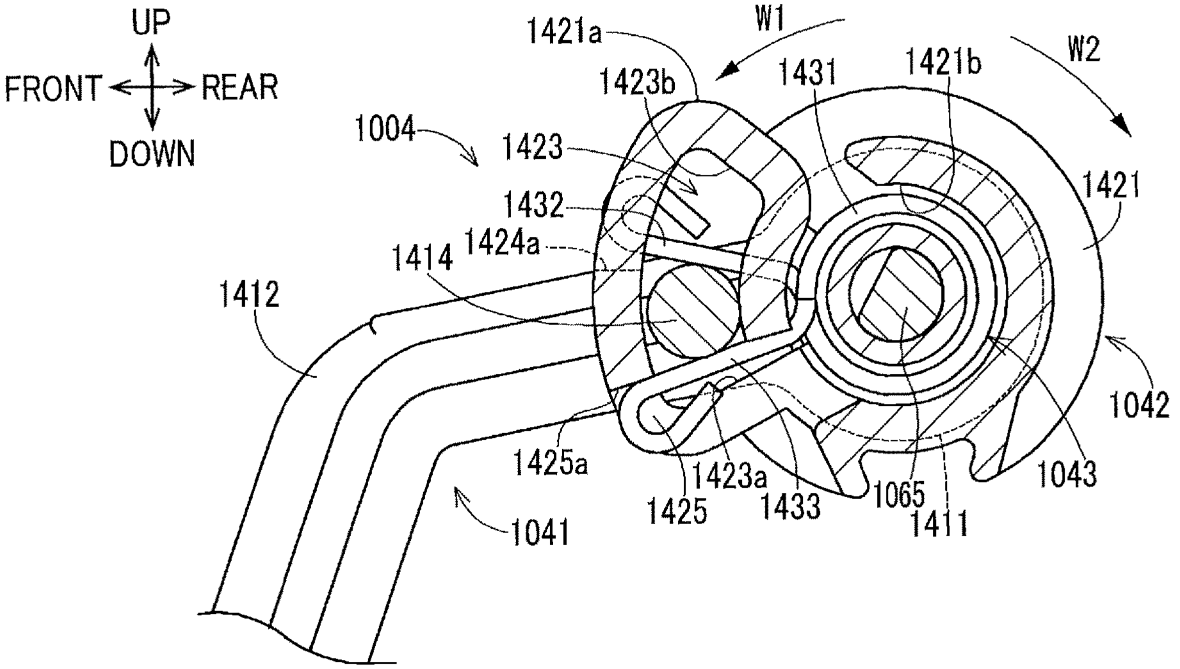
FIG. 30A is a cross-sectional side view of the opening/closing link in the state where the shutter is at the closed position.
Figure 30B:
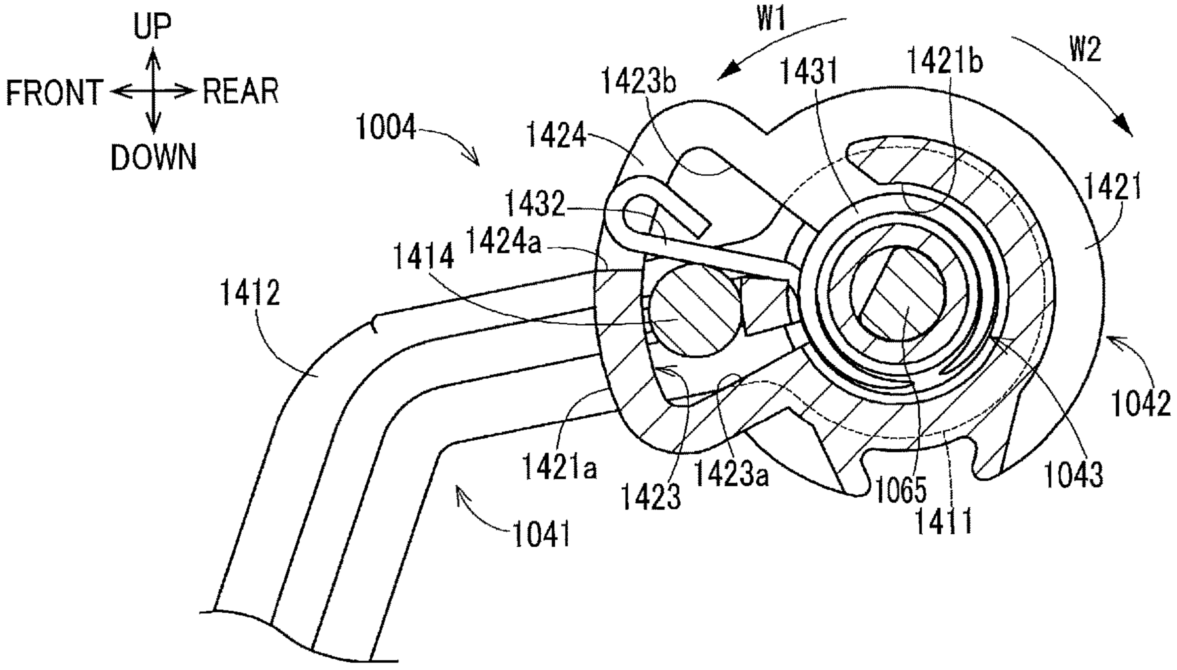
FIG. 30B is another cross-sectional side view of the opening/closing link in the state where the shutter is at the closed position.

The second engagement groove 1425 is another notched groove formed in the radially outer peripheral surface of the operation cam 1421*a* to extend in the circumferential direction. The second engagement groove 1425 is positioned downstream of the first engagement groove 1424 in the first direction W1. Specifically, the second engagement groove 1425 has an end surface positioned most downstream in the first direction W1, and another end surface (second groove bottom 1425*a*) positioned most downstream in the second direction W2. The second arm part 1433 of the coil spring 1043 is configured to abut on the second groove bottom 1425*a*, as illustrated in FIG. 30A. The abutment of the second arm part 1433 on the second groove bottom 1425*a* functions to restrict the second arm part 1433 from moving further downstream in the second direction W2 relative to the link cam body 1421.

On the other hand, the second arm part 1433 in abutment with the second groove bottom 1425*a* is further resiliently deformable inside the second engagement groove 1425 so that the second arm part 1433 can still move in the first direction W1. That is, the second engagement groove 1425 is configured to engage the second arm part 1433 to restrict the second arm part 1433 from moving in the second direction W2 (toward the other side in the circumferential direction of the link cam body 1421).

The coil spring 1043 is movable in accordance with the pivotal movement of the link cam 1042. As the link cam 1042 pivotally moves, either one of the first arm part 1432 and the second arm part 1433 is configured to urge the boss 1414. The pressure applied to the boss 1414 by the first arm part 1432 or the second arm part 1433 causes the shutter link 1041 to move in response to the pivotal movement of the link cam 1042, thereby enabling the shutter 1064 to move between the closed position and the open position.

For example, in accordance with the pivotal movement of the link cam 1042 in the first direction W1 from the state where the shutter 1064 is at the open position, the coil spring 1043 is moved along with the pivotal movement of the link cam 1042, so that the first arm part 1432 urges the boss 1414 downward. In response to the downward displacement of the boss 1414, the shutter link 1041 is pivotally moved in the first direction W1 such that the engagement portion 1413 is moved downward to move the shutter 1064 from the open position to the closed position. The first direction W1 is the direction in which the link cam 1042 moves the shutter 1064 to the closed position. The link cam 1042 is at a first position illustrated in FIG. 25A after moving in the first direction W1 to place the shutter 1064 at the closed position.

In this case, the shutter 1064 having moved to the closed position is restricted from moving further in the first direction W1 (the direction for closing the shutter 1064) because the stopper 1643 of the shutter 1064 abuts on the first abutment surface 1631 of the fixing frame 1063. On the other hand, the link cam 1042 is still movable in the first direction W1 while the shutter 1064 is maintained at the closed position due to the abutment of the shutter 1064 on the first abutment surface 1631.

That is, when the shutter 1064 is at the closed position due to its abutment with the first abutment surface 1631, the first arm part 1432 of the coil spring 1043 abuts on the boss 1414 of the shutter link 1041 from above to urge the shutter link 1041 in the first direction W1. If the link cam 1042 is applied with a force acting in the first direction W1 in this state, the first arm part 1432 resiliently deforms in a direction away from the first groove bottom 1424*a* inside the first engagement groove 1424 while the shutter 1064 is maintained at the closed position. In this way, the link cam 1042 is still allowed to move in the first direction W1 relative to the first arm part 1432.

In this way, when the link cam 1042 is pressed in the first direction W1 in the state where the shutter 1064 in abutment with the first abutment surface 1631 is at the closed position, only the link cam 1042 is caused to move in the first direction W1 whereas the shutter 1064 does not move in the first direction W1 any longer. The shutter 1064 at its closed position thus constantly maintains abutment thereof with the first abutment surface 1631, and accordingly, the shutter 1064 can be stably held at the closed position with accuracy.

In particular, in the case where the link cam 1042 is pressed in the first direction W1 while the shutter 1064 is at the closed position by the abutment between the shutter 1064 and the first abutment surface 1631, only the link cam 1042 is movable in the first direction W1 whereas the shutter 1064 is no longer movable in the first direction W1 with the shutter 1064 urged in the first direction W1 by the coil spring 1043. Hence, the shutter 1064 at the closed position is in constant abutment with the first abutment surface 1631, and accordingly, the shutter 1064 can be stably held at the closed position with accuracy.

Further, at the closed position, the shutter 1064, which is positioned at the upstream side of the fixing frame 1063 in the sheet conveying direction, is configured to abut on the first abutment surface 1631 which faces upstream in the sheet conveying direction. Hence, the positioning accuracy of the shutter 1064 at its closed position can be improved.

Further, the first arm part 1432 positioned in the through-hole 1423 is configured to urge the boss 1414 of the shutter link 1041 to drive the shutter link 1041 for moving the shutter 1064 by the link cam 1042 to the closed position through the shutter link 1041. With this structure, the shutter 1064 can be pressed against the first abutment surface 1631 by the urging force of the first arm part 1432, thereby maintaining the closed position of the shutter 1064 with high accuracy.

Further, in the opening/closing link 1004, the link cam body 1421 is allowed to move in the first direction W1 relative to the first arm part 1432 by the resilient deformation of the first arm part 1432 inside the first engagement groove 1424 while the shutter 1064 is maintained at its closed position. With this configuration, the link cam body 1421 can be smoothly moved in the first direction W1.

Further, as the link cam 1042 pivotally moves in the second direction W2 from the state where the shutter 1064 is at the closed position, the coil spring 1043 is moved in accordance with the pivotal movement of the link cam 1042 such that the second arm part 1433 urges the boss 1414 upward. In response to the upward displacement of the boss 1414, the shutter link 1041 is pivotally moved in the second direction W2 to move the engagement portion 1413 upward, so that the shutter 1064 is moved from the closed position to the open position. The second direction W2 is the direction in which the link cam 1042 moves the shutter 1064 to the open position. The link cam 1042 in the second direction W2 providing the open position of the shutter 1064 is illustrated in FIG. 25B. The link cam 1042 is at a second position illustrated in FIG. 25B after moving in the second direction W2 to place the shutter 1064 at the open position.

In this case, the shutter 1064 having moved to the open position is restricted from moving further in the second direction W2 (the direction to open the shutter 1064) due to the abutment of the connection shaft 1642 of the shutter 1064 on the second abutment surface 1632 of the fixing frame 1063. On the other hand, the link cam 1042 is still movable in the second direction W2 while the shutter 1064 is maintained at the open position due to the abutment of the shutter 1064 on the second abutment surface 1632.

That is, when the shutter 1064 is at the open position due to the abutment with the second abutment surface 1632, the second arm part 1433 of the coil spring 1043 abuts on the boss 1414 of the shutter link 1041 from below to urge the shutter link 1041 in the second direction W2. If the link cam 1042 is applied with an external force acting in the second direction W2 in this state, the second arm part 1433 can resiliently deform in the direction away from the second groove bottom 1425*a* inside the second engagement groove 1425 while the shutter 1064 is maintained at the open position, thereby allowing the link cam 1042 to move in the second direction W2 relative to the second arm part 1433.

In this way, when the link cam 1042 is pressed in the second direction W2 in the state where the shutter 1064 in abutment with the second abutment surface 1632 is at the open position, only the link cam 1042 is allowed to move in the second direction W2 whereas the shutter 1064 does not move in the second direction W2 any further. Hence, the shutter 1064 at its open position can constantly maintain its abutment with the second abutment surface 1632, and accordingly, the shutter 1064 can be stably held at the open position with accuracy.

In particular, in a case where the link cam 1042 is pressed in the second direction W2 while the shutter 1064 is at the closed position by the abutment with the second abutment surface 1632, only the link cam 1042 is movable in the second direction W2 whereas the shutter 1064 is no longer movable in the second direction W2 with the shutter 1064 urged in the second direction W2 by the coil spring 1043. Hence, the shutter 1064 at the open position is in constant abutment with the second abutment surface 1632, and accordingly, the shutter 1064 can be stably held at the open position with accuracy.

Further, the single coil spring 1043 enables the link cam 1042 to move when the shutter 1064 is at the closed position as well as at the open position.

Further, the shutter 1064, which is positioned at the upstream side of the fixing frame 1063 in the sheet conveying direction, can abut on the second abutment surface 1632 which faces upstream in the sheet conveying direction, when the shutter 1064 is at the open position. Hence, positioning accuracy of the shutter 1064 at its open position can be improved.

Further, the second arm part 1433 of the coil spring 1043 received in the through-hole 1423 urges the boss 1414 of the shutter link 1041 to drive the shutter link 1041 for moving the shutter 1064 to the open position by the link cam 1042 through the shutter link 1041. Since the shutter 1064 can be pressed against the second abutment surface 1632 by the urging force of the second arm part 1433, the open position of the shutter 64 can be maintained with high accuracy.

Further, the connection shaft 1642 extending in parallel to the pivot shafts 1641 rotatably supported by the fixing frame 1063 is configured to be operated by the shutter link 1041 for realizing the opening and closing of the shutter 1064. Accordingly, the opening/closing of the shutter 1064 can be performed with accuracy.

Further, the connection shaft 1642 of the shutter 1064 is positioned in the elongated slot 1413*a* of the engagement portion 1413, and the connection shaft 1642 is slidably movable in the elongated slot 1413*a* during the opening/closing operations of the shutter link 1041. With this configuration, the opening/closing of the shutter 1064 by the shutter link 1041 can be smoothly performed.

Figure 24:
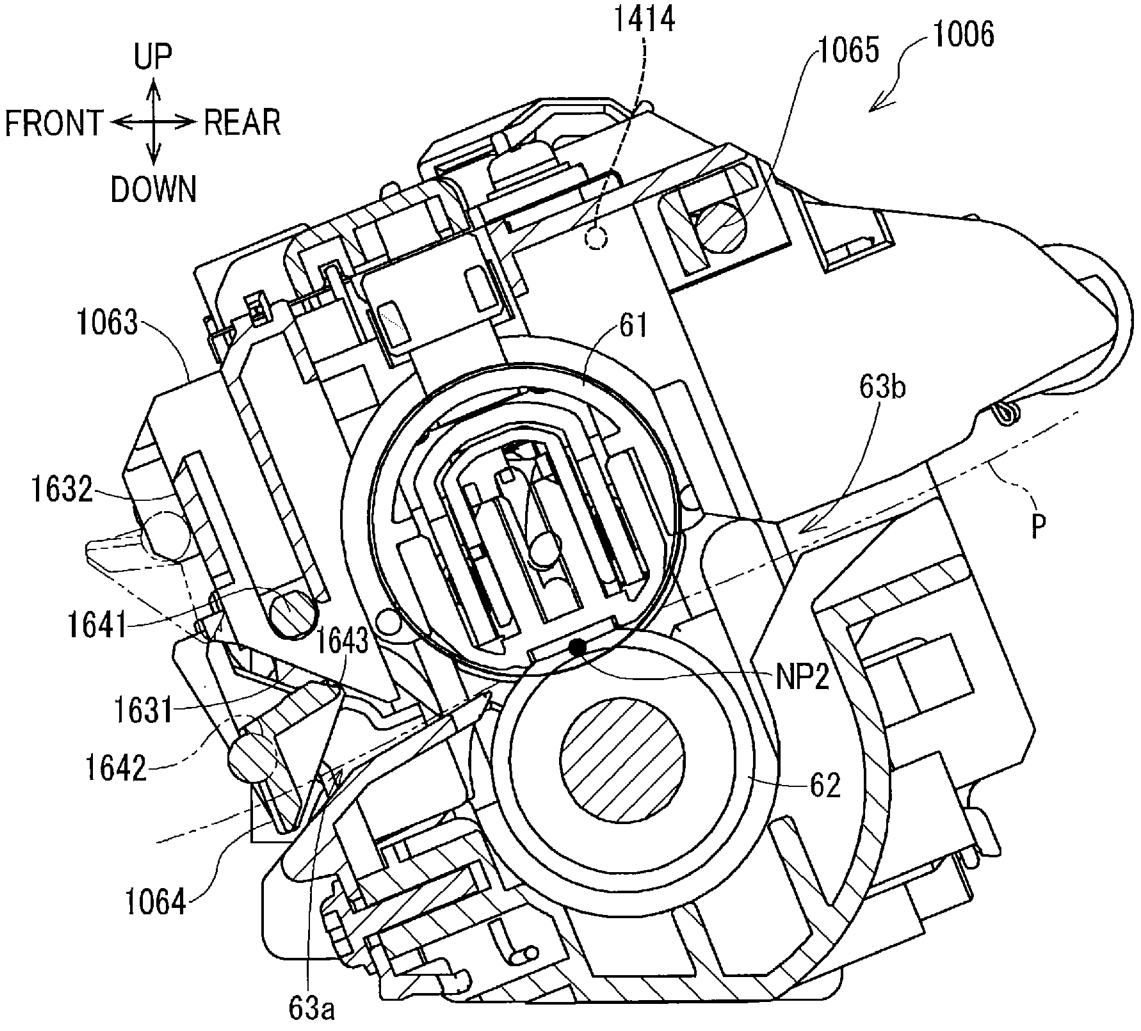
FIG. 24 is a cross-sectional side view of the fixing device.

Further, as is apparent from FIGS. 24 and 25A, the connection shaft 1642 functioning as a linkup between the shutter link 1041 and the shutter 1064 is positioned opposite the boss 1414 functioning as a linkup between the shutter link 1041 and the link cam 1042 with respect to the nipping point NP2 between the heating unit 61 and the pressure roller 62 in the sheet conveying direction. With this structure, the length of the shutter link 1041 can be made longer in the sheet conveying direction, which contributes to reduce an amount required for the link cam 1042 to move for opening and closing the shutter 1064.

Figure 32:
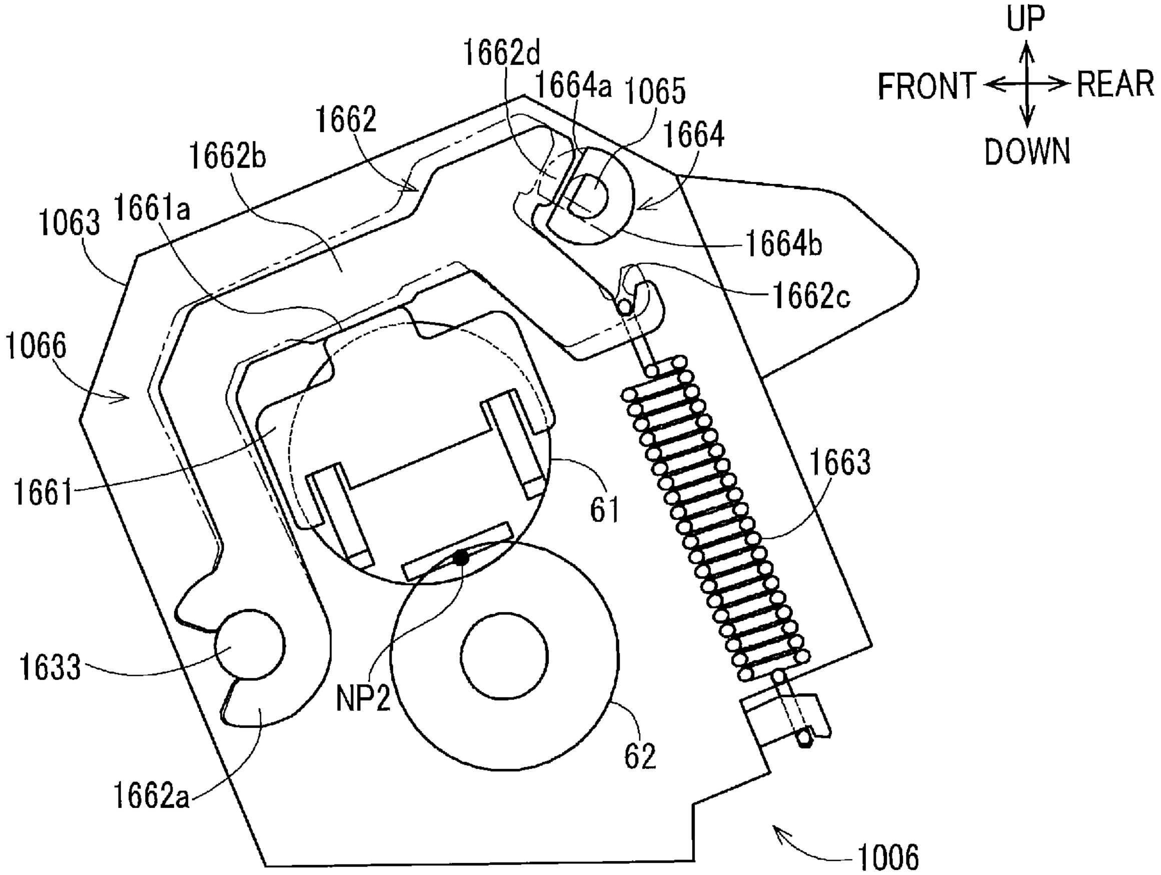
FIG. 32 is a side view illustrating a nipping pressure changing mechanism in the fixing device.

As illustrated in FIG. 32, the fixing device 1006 includes the nipping pressure changing mechanism 1066 configured to change the nipping pressure at the nipping point NP2 between the heating unit 61 and the pressure roller 62. The nipping pressure changing mechanism 1066 is positioned at the left and right end portions of the fixing device 1006. Each nipping pressure changing mechanism 1066 includes a guide 1661, an arm 1662, a spring 1663, and a cam 1664.

The guide 1661 is positioned at an upper portion of the heating unit 61 in a side view, and is in contact with the heating unit 61. The guide 1661 is vertically movably supported by the fixing frame 1063. Specifically, the guide 1661 is supported by the fixing frame 1063 such that the guide 1661 is movable in a direction to urge the heating unit 61 toward the pressure roller 62 and in a direction to urge the heating unit 61 away from the pressure roller 62.

The arm 1662 has a generally L-shape and is made from metal. The arm 1662 is configured to apply pressure to the heating unit 61 through the guide 1661. The arm 1662 includes a base portion 1662*a*, a pressure portion 1662*b*, a supporting portion 1662*c*, and an abutment portion 1662*d*. The base portion 1662*a* is pivotally movably fitted with a boss 1633 of the fixing frame 1063. The pressure portion 1662*b* is configured to press an upper surface 1661*a* of the guide 1661. The supporting portion 1662*c* supports an upper end portion of the spring 1663. The abutment portion 1662*d* is configured to abut on the cam 1664.

The arm 1662 is movable between a pressing position (indicated by a solid line in FIG. 32) and a pressure releasing position (indicated by a two-dotted chain line in FIG. 32). In the pressing position, the pressure portion 1662*b* presses the upper surface 1661*a* of the guide 1661 from above so as to increase the nipping pressure between the pressure roller 62 and the heating unit 61. In the pressure releasing position, the pressure portion 1662*b* is positioned apart from the upper surface 1661*a* of the guide 1661 so as to reduce the nipping pressure lower than the nipping pressure when the arm 1662 is at the pressing position. In the fixing device 1006, thermal fixing with respect to the sheet S is performed when the arm 1662 is at the pressing position, and a removal of a jammed sheet S is performed when the arm 1662 is at the pressure releasing position.

The spring 1663 is a tension coil spring, for example. The spring 1663 has the upper end portion connected to the supporting portion 1662*c* of the arm 1662, and a lower end portion connected to the fixing frame 1063. The spring 1663 urges the arm 1662 toward the pressing position from the pressure releasing position.

The cam 1664 is fixed to the rotation shaft 1065 so as to rotate together therewith. The cam 1664 is rotatable together with the rotation shaft 1065 to move the arm 1662 between the pressing position and the pressure releasing position. The cam 1664 has a D-shape in cross-section. The cam 1664 has a first cam surface 1664*a* which is a flat surface, and a second cam surface 1664*b* which is an arcuate surface and connected to the first cam surface 1664*a*.

The first cam surface 1664*a* is spaced away from the abutment portion 1662*d* when the first cam surface 1664*a* is positioned to face the abutment portion 1662*d*. In this state, the arm 1662 is at the pressing position by the tensile force of the spring 1663. The first cam surface 1664*a* is a surface configured to guide the arm 1662 to the pressing position. The second cam surface 1664*b* is in abutment with the abutment portion 1662*d* to lift up the arm 1662 when the second cam surface 1664*b* is positioned to face the abutment portion 1662*d*. In this state, the arm 1662 is lifted upward against the tensile force of the spring 1663 and is moved to the pressure releasing position. The second cam surface 1664*b* is a surface configured to guide the arm 1662 to the pressure releasing position.

As described above, in the fixing device 1006, the nipping pressure changing mechanism 1066 is configured to change the nipping pressure between the pressure roller 62 and the heating unit 61 in accordance with the rotation of the rotation shaft 1065 which is operated by the operation lever 1067 (see FIG. 10). The link cam 1042 is supported by rotation shaft 1065 which is coaxial therewith. With this structure, the rotation shaft 1065 coaxially supporting the link cam 1042 can also function as the rotation shaft for operating the nipping pressure changing mechanism 1066. Hence, the link cam 1042 can be installed efficiently in a reduced space. Incidentally, the nipping pressure changing mechanism 1066 need not be configured as that in the depicted embodiment, may be have other configurations as long as the nipping pressure changing mechanism 1066 can act on the heating unit 61 or the pressure roller 62 to change the nipping pressure between the heating unit 61 and the pressure roller 62.

<Printer-Body Link 1008>

Figure 33A:
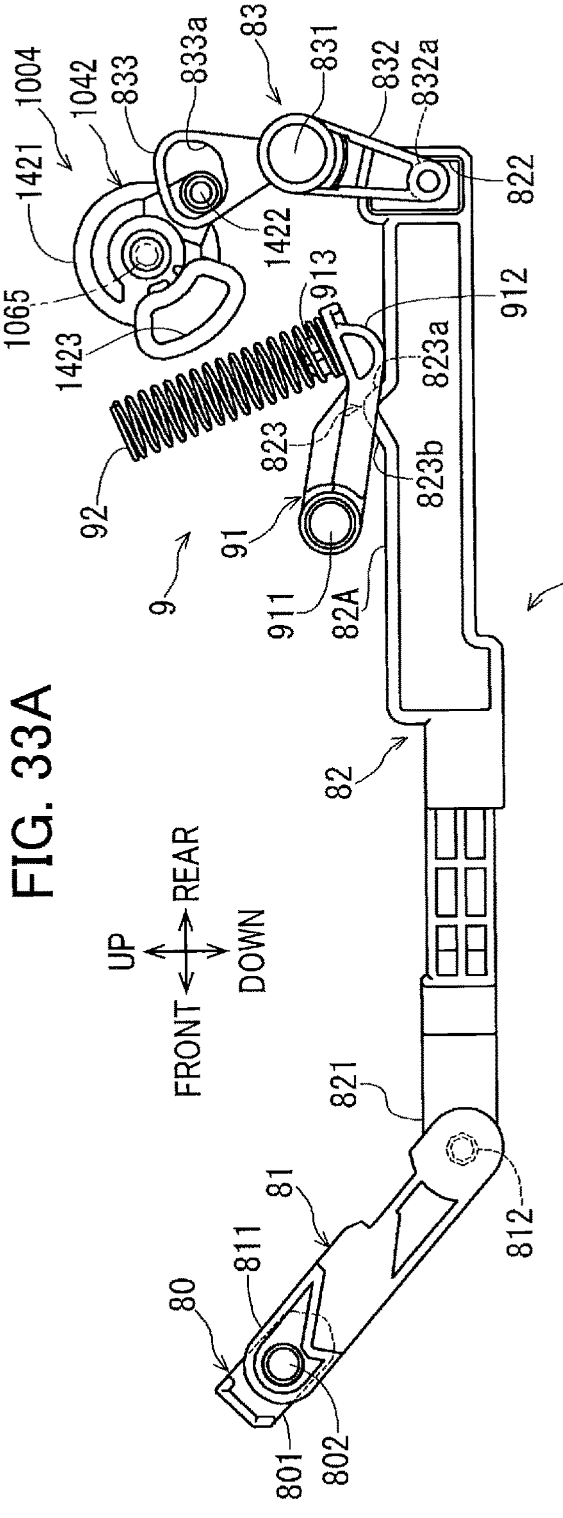
FIG. 33A is a right side view of a printer-body link including the abutment piece, and particularly illustrating a state where the first protrusion of the abutment piece is at the intermediate portion of the abutment piece rail of the first main frame and the second protrusion of the abutment piece is at the front portion of the abutment piece rail.
Figure 33B:
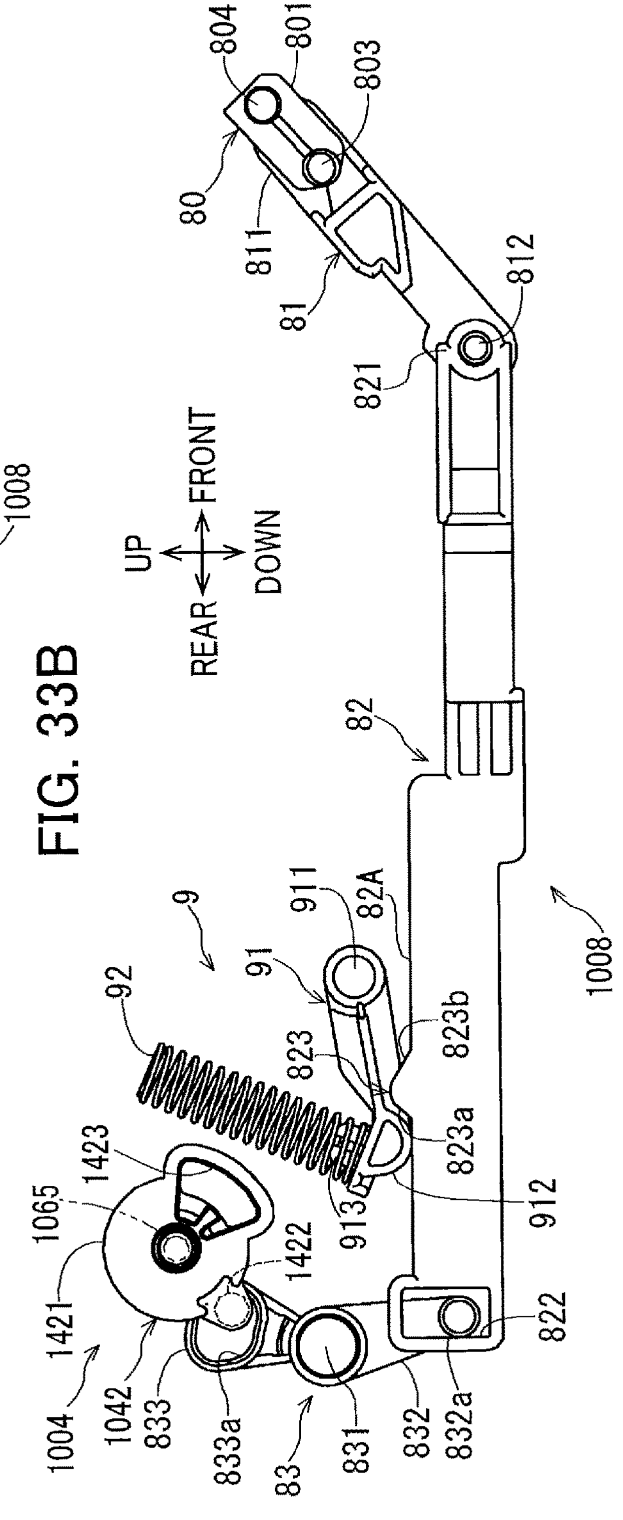
FIG. 33B is a left side view of the printer-body link in the state of FIG. 33A.
Figure 34:
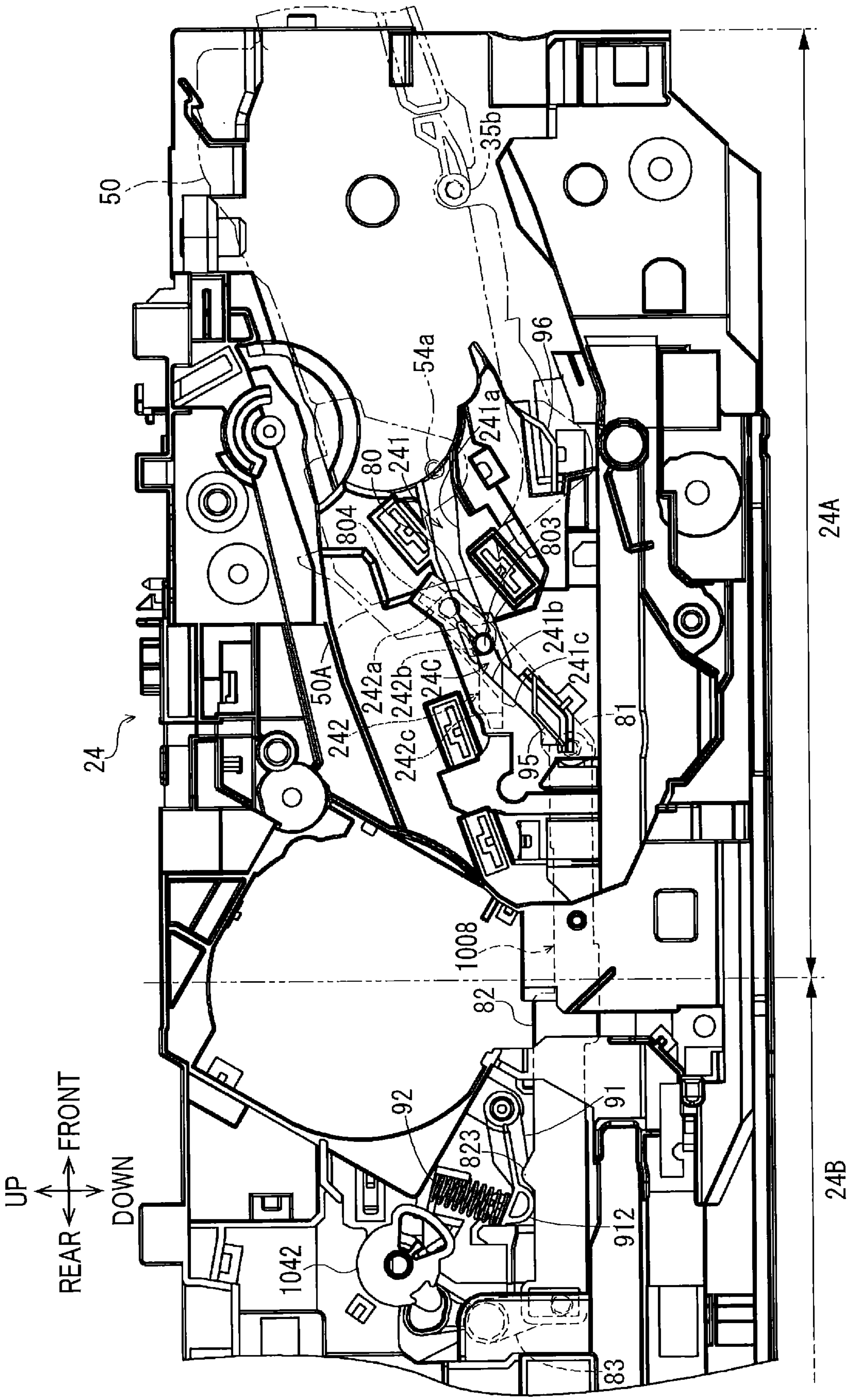
FIG. 34 is a side view of the first main frame, and particularly illustrating a state where the process cartridge is at its attachment start position, the first protrusion of the abutment piece is at the intermediate portion of the abutment piece rail, and the second protrusion of the abutment piece is at the front portion of the abutment piece rail.

As illustrated in FIGS. 33A, 33B and 34, the image-forming apparatus 1000 according to the second embodiment includes a housing 1002 that includes a printer-body link 1008 connected to the shutter 1064. The printer-body link 1008 is configured to engage the protrusion 1422 of the link cam 1042, so that the printer-body link 1008 is connectable to the opening/closing link 1004 to move the link cam 1042. Specifically, the printer-body link 1008 functions to move the shutter 1064 from the closed position to the open position in conjunction with the attachment of the process cartridge 50 to the housing 1002, and functions to move the shutter 1064 from the open position to the closed position in conjunction with the detachment of the process cartridge 50 from the housing 1002. That is, the printer-body link 1008 is configured to open and close the shutter 1064, via the opening/closing link 1004, in interlocking relation to the attachment and detachment of the process cartridge 50 to and from the housing 1002.

The printer-body link 1008 is positioned opposite the process cartridge 50 attached to the housing 1002 with respect to the front frame 24A of the first main frame 24 in the left-right direction. The printer-body link 1008 includes the abutment piece 80, the first pivot link 81, the linear motion link 82, the second pivot link 83. That is, the printer-body link 1008 is different from the connection link 8 of the first embodiment in that the printer-body link 1008 does not include the third pivot link 84, the shutter link 85 and the coil spring 86 of the first embodiment.

The protrusion 1422 of the link cam 1042 is inserted in the connection hole 833*a* of the second pivot link 83 from its left side. The protrusion 1422 is configured to engage the connection hole 833*a* by the pivotal movement of the second pivot link 83. The link cam 1042 is configured to be connected to the second pivot link 83 by the engagement between the protrusion 1422 and the connection hole 833*a*, and is pivotally movable about the axis of the rotation shaft 1065 in accordance with the pivotal movement of the second pivot link 83. The shutter link 1041 is movable in the up-down direction in response to the pivotal movement of the link cam 1042, thereby moving the shutter 1064 between the closed position and the open position.

In the image-forming apparatus 1000, the abutment piece 80 of the printer-body link 1008 is brought into contact with the drum shaft 54*a* of the process cartridge 50 during the attachment/detachment of the process cartridge 50 relative to the housing 1002, so that the abutment piece 80 is caused to move along the abutment piece rail 242. In this way, the driving force is transmitted from the drum shaft 54*a* to the shutter 1064 through the printer-body link 1008 and the opening/closing link 1004 to move the shutter 1064 between the closed position and the open position.

Incidentally, in the second embodiment, the printer-body link 1008 includes the abutment piece 80, the first pivot link 81, the linear motion link 82, and the second pivot link 83. As an alternative, the printer-body link 1008 may be constituted by a single link connected to the opening/closing link 1004 and capable of abutting on the process cartridge 50 for opening and closing the shutter 1064.

Further, the opening/closing link 1004 of the second embodiment includes the shutter link 1041, the link cam 1042 and coil spring 1043. Alternatively, the opening/closing link 1004 may be constituted by a single link connected to the printer-body link 1008 and the shutter 1064 and capable of opening and closing the shutter 1064 in association with the movement of the printer-body link 1008. Still further, the opening/closing link 1004 may be constituted by a single link connected to the shutter 1064 and capable of abutting on the process cartridge 50 for opening and closing the shutter 1064. Still alternatively, the printer-body link 1008 and the opening/closing link 1004 may move differently from the pivotal movements/sliding movements as in the described embodiment, provided that the printer-body link 1008 and the opening/closing link 1004 can function to open and close the shutter 1064 in interlocking relation to the attachment and detachment of the process cartridge 50 to and from the housing 1002.

<Lock 9>

As illustrated in FIGS. 33A and 33B, the housing 1002 also includes the lock 9 of the first embodiment. In the second embodiment, the lock 9 is configured to restrict the movement of the printer-body link 1008 that enables the shutter 1064 to move between the open position and the closed position. Specifically, the lock 9 is configured to press the linear motion link 82 from above to restrict the linear motion link 82 from moving in the front-rear direction in the same manner as the first embodiment.

More specifically, in accordance with the movement of the linear motion link 82 in the front-rear direction, the abutment portion 912 of the arm 91 is movable over the link protrusion 823 against the urging force of the locking spring 92 to move between the front-side position and the rear side position relative to the link protrusion 823. The abutment portion 912 is positioned further rearward than the first sloped surface 823*a* of the link protrusion 823 at the rear-side position, and the abutment portion 912 is positioned further frontward than the second sloped surface 823*b* of the link protrusion 823 at the front-side position.

In the case where the abutment portion 912 of the arm 91 is at the rear-side position (rearward) relative to the link protrusion 823, the lock 9 can restrict the linear motion link 82 from moving further rearward due to the engagement of the abutment portion 912 with the first sloped surface 823*a*. In the case where the abutment portion 912 of the arm 91 is at the front-side position (frontward) relative to the link protrusion 823, the lock 9 can restrict the linear motion link 82 from moving further frontward due to the engagement of the abutment portion 912 with the second sloped surface 823*b*.

That is, the arm 91 abuts on the upper surface 82A of the linear motion link 82 and presses the linear motion link 82 downward at a position rearward of the link protrusion 823 to restrict the rearward movement of the linear motion link 82, thereby serving to keep the printer-body link 1008 immovable. Further, the arm 91 abuts on the upper surface 82A of the linear motion link 82 and presses the linear motion link 82 downward at a position frontward of the link protrusion 823 to restrain the frontward movement of the linear motion link 82, thereby serving to keep the printer-body link 1008 immovable. As such, the lock 9 can restrain the movement of the linear motion link 82 in the front-rear direction through a simple structure by the application of downward pressure to the linear motion link 82 from the arm 91.

Incidentally, the printer-body link 1008 and the lock 9 are not limited to the above-described structure. For example, the lock 9 may be omitted and the printer-body link 1008 alone may be configured to maintain the open position and the closed position of the shutter 1064 without provision of the lock 9.

<Operations of the Printer-Body Link 1008 and Opening/Closing Link 1004>

Next, operations of the printer-body link 1008 and the opening/closing link 1004 will be described.

Operations at the time of Attachment of the Process Cartridge 5

Firstly, operations of the printer-body link 1008 at the time of attachment of the process cartridge 50 to the housing 1002 will be described.

Referring to FIGS. 33A through 34, in a state where the process cartridge 50 is detached from the housing 1002 and in a state where the process cartridge 50 is at an attachment starting position where the leading end 50A of the process cartridge 50 in the inserting direction is inserted in the housing 1002 (the state illustrated in FIG. 34), the drum shaft 54*a* is separated from the abutment piece 80 and the abutment piece 80 is positioned to extend over the front portion 242*a* and the intermediate portion 241*b* of the abutment piece rail 242. Specifically, the abutment piece 80 is fitted with the abutment piece rail 242 such that the first protrusion 803 is positioned in the intermediate portion 242*b* (the through-hole 24C) of the abutment piece rail 242 and the second protrusion 804 is positioned in the front portion 242*a* of the abutment piece rail 242. Here, the inserting direction of the process cartridge 50 is coincident with the attachment direction of the process cartridge 50.

In the state where the abutment piece 80 is at the position illustrated in FIG. 34, the shutter 1064 has been moved to the closed position as illustrated in FIG. 25A by the printer-body link 1008 and the opening/closing link 1004. With this structure, even if the user inadvertently inserts his hand into housing 1002 through the opening 2A in the state where the process cartridge 50 is detached from the housing 1002, the shutter 1064 can block the user's hand from touching the heating unit 61 of the fixing device 1006.

Further, in the state where the abutment piece 80 is at the position illustrated in FIG. 34, the abutment portion 912 of the arm 91 of the lock 9 is positioned rearward of the link protrusion 823 of the linear motion link 82, thereby restricting the rearward movement of the linear motion link 82. That is, the linear motion link 82 is locked in position by the lock 9 in the state where the shutter 1064 has moved to the closed position by the printer-body link 1008 and the opening/closing link 1004, so that accidental movement of the shutter 1064 from the closed position to the open position can be avoided. In other words, the linear motion link 82 is restricted from moving in the front-rear direction by the abutment of the link protrusion 823 with the abutment portion 912 positioned rearward of the link protrusion 823. With this structure, the shutter 1064 can be securely maintained at the closed position.

Figure 35A:
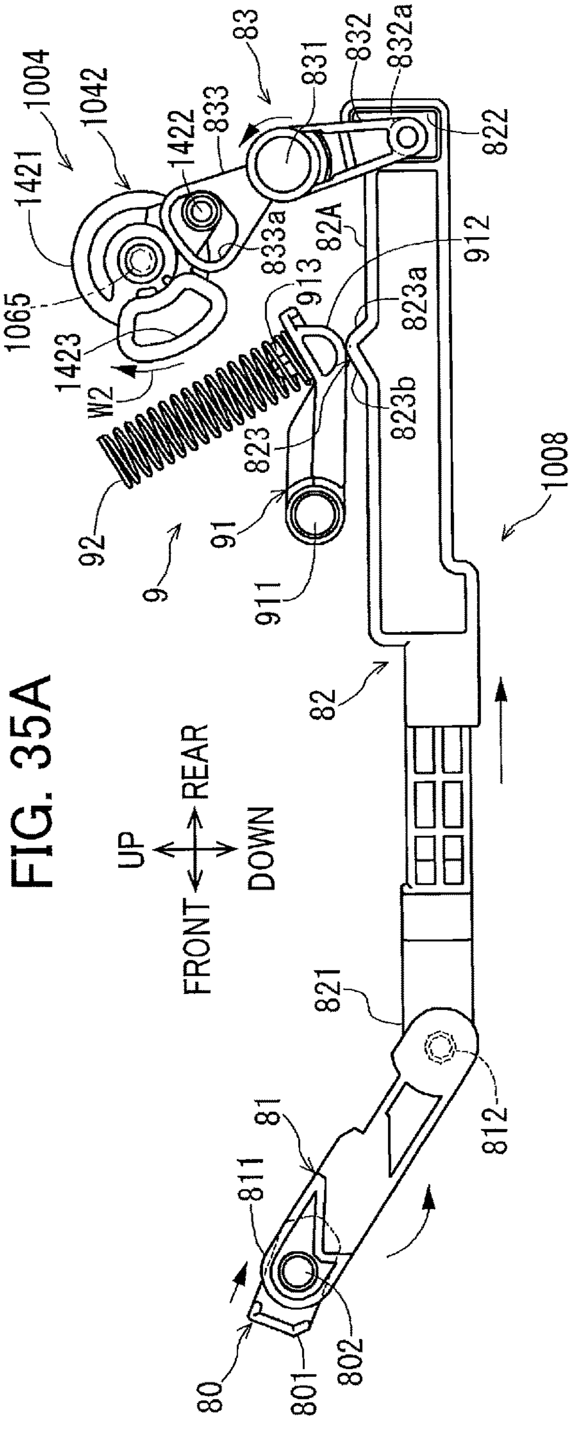
FIG. 35A is a right side view of the printer-body link, and particularly illustrating a state where the drum shaft of the photosensitive drum is in abutment with the abutment piece, and the first and second protrusions of the abutment piece are both at the intermediate portion of the abutment piece rail.
Figure 35B:
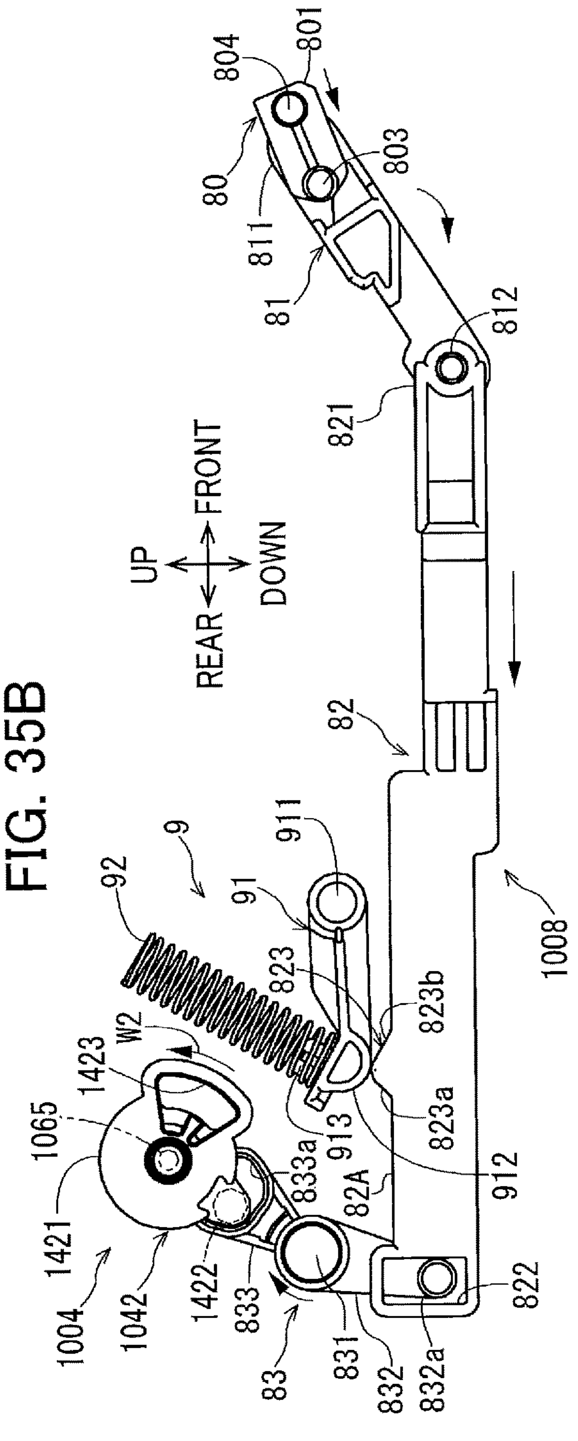
FIG. 35B is a left side view of the printer-body link in the state of FIG. 35A.
Figure 36:
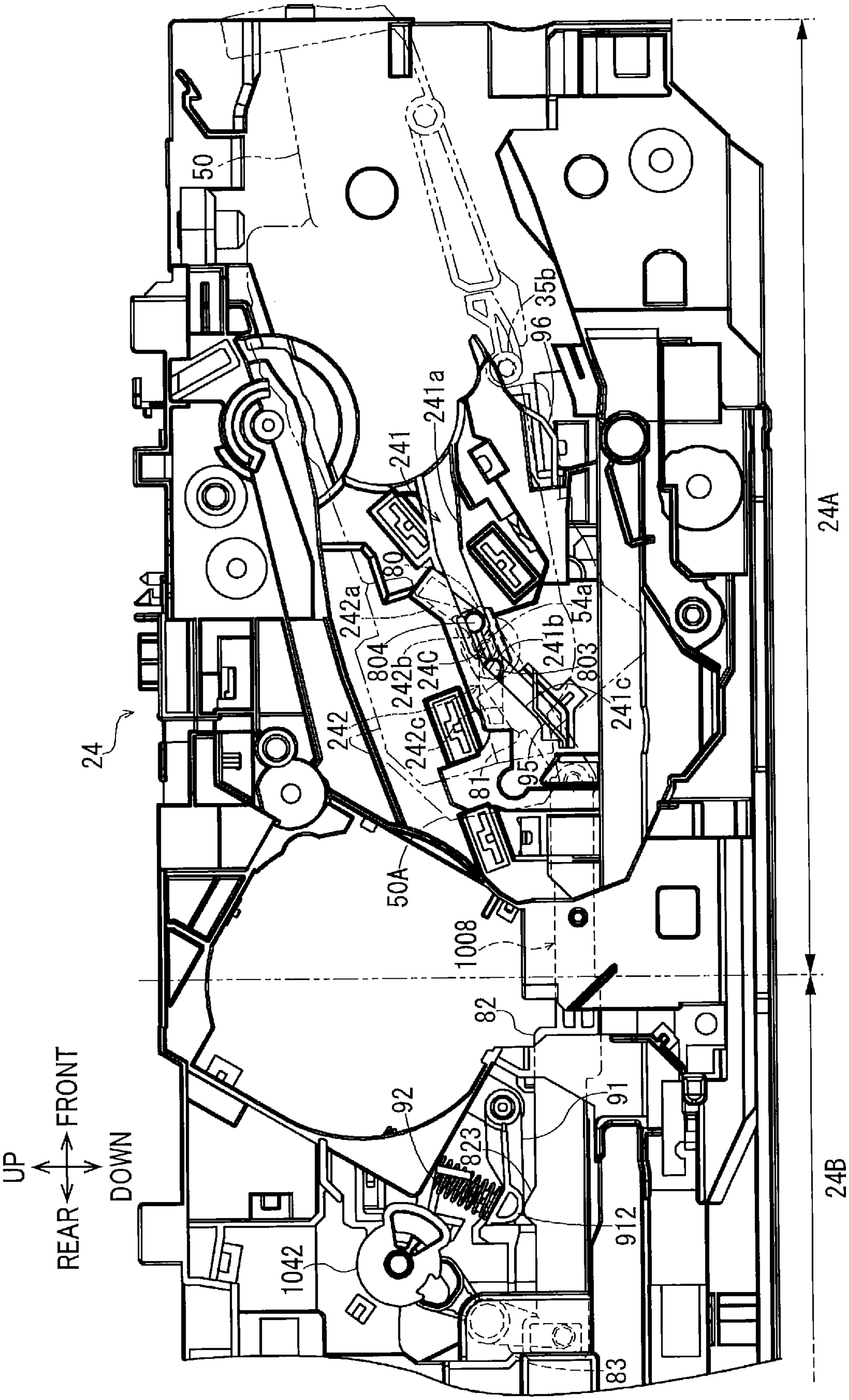
FIG. 36 is a side view of the first main frame, and particularly illustrating the state where the drum shaft is in abutment with the abutment piece, and the first and second protrusions of the abutment piece are both at the intermediate portion of the abutment piece rail.

Referring to FIGS. 35A through 36, as the process cartridge 50 at the attachment starting position is further inserted toward the attachment position, the drum shaft 54*a* enters the front portion 241*a* of the cartridge rail 241 and moves along the cartridge rail 241. When the drum shaft 54*a* moving along the cartridge rail 241 enters the intermediate portion 241*b* (the through-hole 24C), the drum shaft 54*a* comes into abutment with the first protrusion 803 of the abutment piece 80.

Upon abutment with the drum shaft 54*a* moving in the intermediate portion 241*b* (the through-hole 24C) of the cartridge rail 241, the abutment piece 80 is pressed by the drum shaft 54*a* and is moved toward downstream in the attachment direction of the process cartridge 50. FIG. 36 illustrates a state where the first protrusion 803 and the second protrusion 804 of the abutment piece 80, which is being moved by the drum shaft 54*a*, are positioned in the intermediate portion 242*b* (the through-hole 24C) of the abutment piece rail 242.

In accordance with the movement of the abutment piece 80, the first pivot link 81 connected to the abutment piece 80 is pivotally moved downward to reduce the inclination angle of the first pivot link 81 with respect to the horizontal direction, and at the same time the first pivot link 81 is moved rearward. In response to the pivotal movement and rearward movement of the first pivot link 81, the linear motion link 82 connected to the first pivot link 81 is linearly moved rearward.

In response to the rearward movement of the linear motion link 82, the connection hole 822 of the linear motion link 82 is brought into engagement with the engagement pin 832*a* to pivotally move the second pivot link 83 about the axis of the base support portion 831 in the counterclockwise direction in FIG. 35A such that the engagement pin 832*a* is moved rearward. In response to the pivotal movement of the second pivot link 83, the connection hole 833*a* of the second pivot link 83 is brought into engagement with the protrusion 1422 of the link cam 1042 to pivotally move the link cam 1042 about the rotation shaft 1065 in the second direction W2 such that the protrusion 1422 is moved frontward.

In accordance with the rearward movement of the linear motion link 82, the abutment portion 912 of the arm 91 of the lock 9 climbs up the first sloped surface 823*a* of the link protrusion 823 against the urging force of the locking spring 92 and reaches the top of the link protrusion 823.

In the state where the abutment portion 912 is positioned on the top of the link protrusion 823, the locking spring 92 is sufficiently compressed to provide the urging force that is greater than the urging force when the abutment portion 912 is at the rear-side position or at the front-side position relative to the link protrusion 823. The abutment portion 912 of the lock 9 applies maximum pressing force to the linear motion link 82 by the locking spring 92 when the abutment portion 912 is positioned on the top of the link protrusion 823.

Figure 37A:
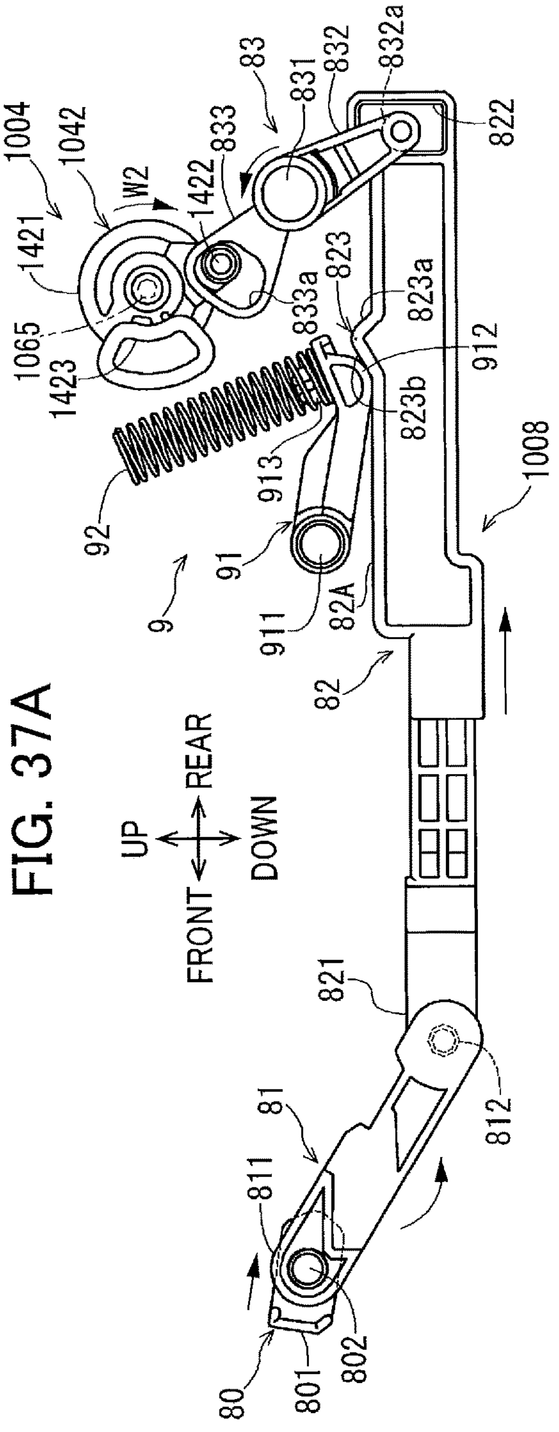
FIG. 37A is a right side view of the printer-body link, and particularly illustrating a state where the drum shaft is in abutment with the abutment piece, the first protrusion of the abutment piece is at the rear portion of the abutment piece rail, and the second protrusion of the abutment piece is at the intermediate portion of the abutment piece rail.
Figure 37B:
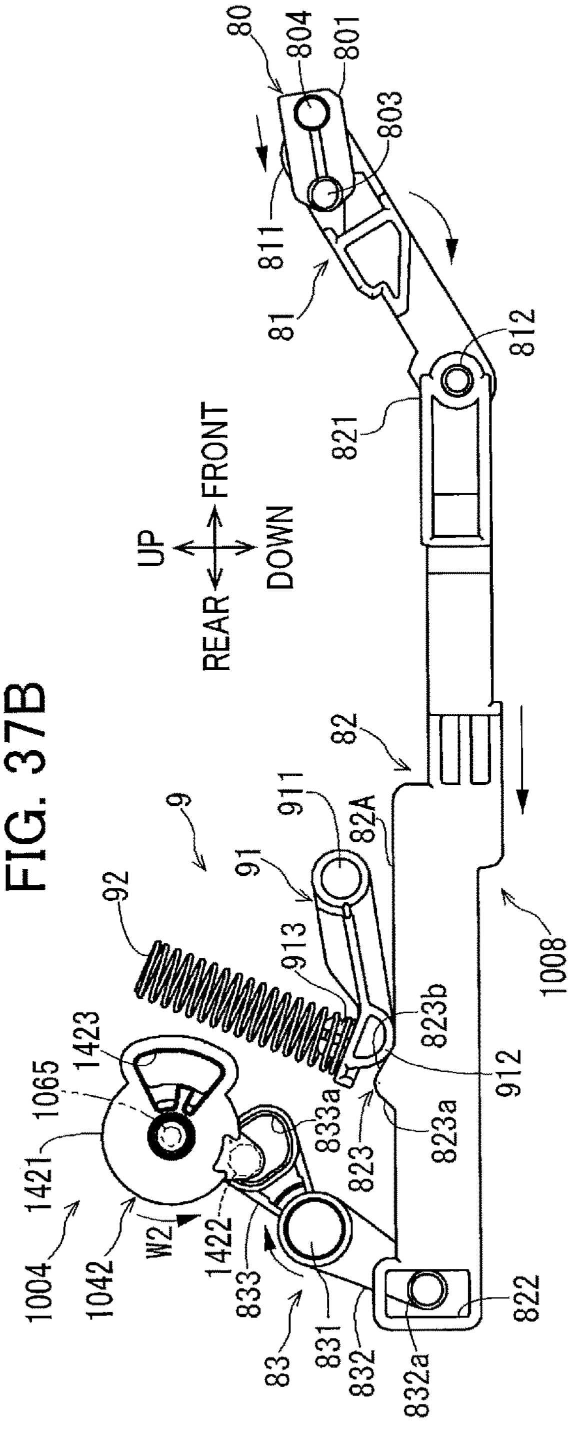
FIG. 37B is a left side view of the printer-body link in the state of FIG. 37A.
Figure 38:
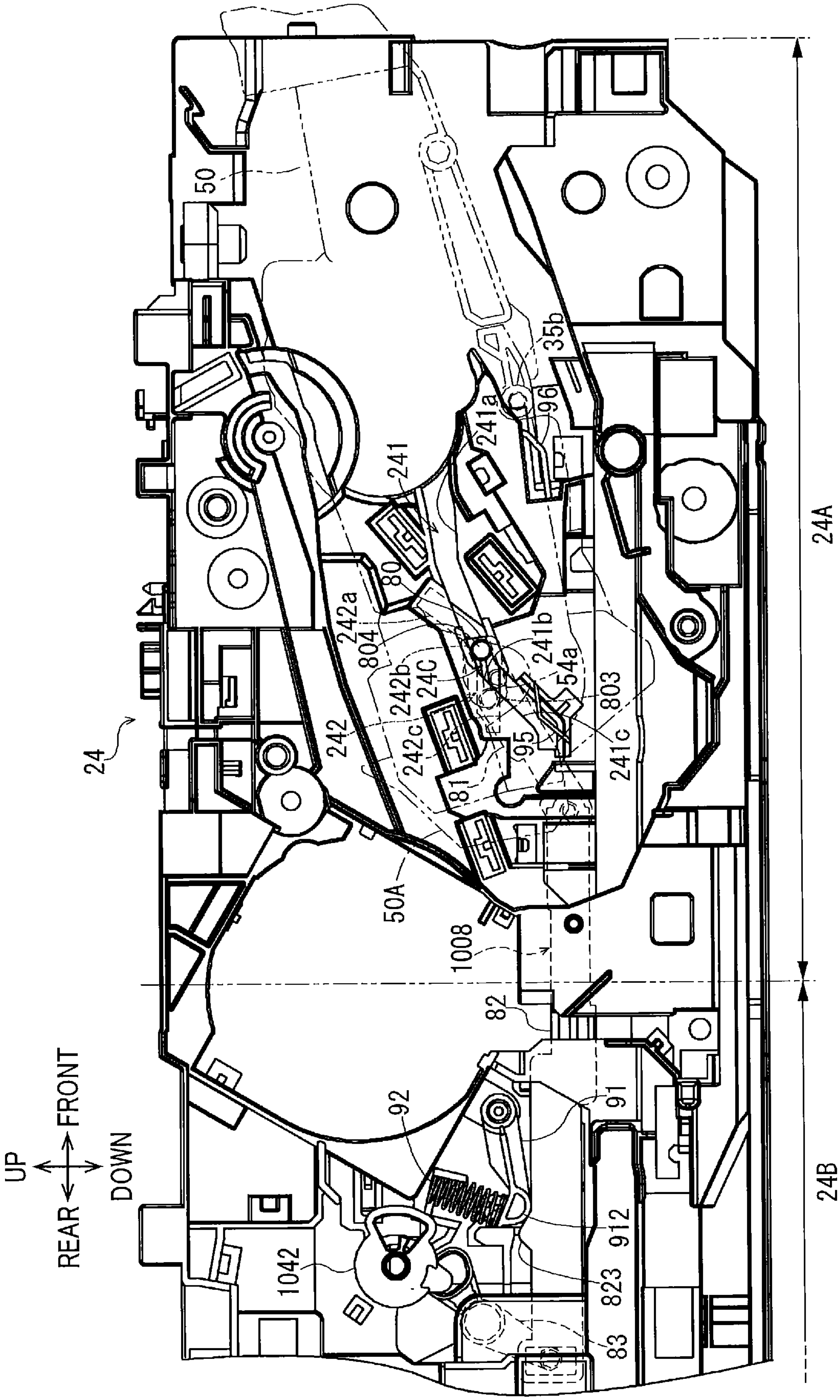
FIG. 38 is a side view of the first main frame, and particularly illustrating the state where the drum shaft is in abutment with the abutment piece, the first protrusion of the abutment piece is at the rear portion of the abutment piece rail, and the second protrusion of the abutment piece is at the intermediate portion of the abutment piece rail.

As illustrated in FIGS. 37A through 38, as the process cartridge 50 is further inserted toward the attachment position from the position illustrated in FIG. 36, the abutment piece 80 is further moved toward downstream in the attachment direction by the drum shaft 54*a* that is moving in the intermediate portion 241*b* (the through-hole 24C) of the cartridge rail 241. FIG. 38 shows a state where the first protrusion 803 of the abutment piece 80 is positioned in the rear portion 242*c* of the abutment piece rail 242, and the second protrusion 804 of the abutment piece 80 is positioned in the intermediate portion 242*b* (the through-hole 24C) of the abutment piece rail 242.

In accordance with the movement of the abutment piece 80, the first pivot link 81 is pivotally moved downward to further reduce the inclination angle of the first pivot link 81 with respect to the horizontal direction, and at the same time the first pivot link 81 is moved further rearward. In response to the pivotal movement and rearward movement of the first pivot link 81, the linear motion link 82 is further linearly moved rearward. In response to the rearward movement of the linear motion link 82, the second pivot link 83 is further pivotally moved in the counterclockwise direction in FIG. 37A such that the engagement pin 832*a* is moved rearward. In response to the pivotal movement of the second pivot link 83, the link cam 1042 is further pivotally moved in the second direction W2.

As illustrated in FIG. 25B, in response to the pivotal movement of the link cam 1042 in the second direction W2, the coil spring 1043 is moved following the pivotal movement of the link cam 1042 such that the second arm part 1433 of the coil spring 1043 urges the boss 1414 of the shutter link 1041 upward. Due to the upward pressing of the boss 1414 by the second arm part 1433, the shutter link 1041 is pivotally moved in the clockwise direction in FIG. 25B to move the engagement portion 1413 upward, so that the shutter 1064 is moved from the closed position to the open position.

In this case, in accordance with the rearward movement of the linear motion link 82, the abutment portion 912 of the arm 91 of the lock 9 climbs down the first sloped surface 823*a* of the link protrusion 823 of the linear motion link 82 because of the urging force of the locking spring 92, so that the abutment portion 912 arrives at the position frontward of the link protrusion 823. Since the abutment portion 912 is positioned frontward of the link protrusion 823, the engagement of the abutment portion 912 with the second sloped surface 823*b* can restrict the linear motion link 82 from moving further frontward.

In this way, the movement of the linear motion link 82 is locked by the lock 9 in the state where the shutter 1064 has been moved to the open position by the printer-body link 1008 and the opening/closing link 1004. With this structure, unexpected movement of the shutter 1064 from the open position to the closed position can be restrained. That is, the lock 9 can restrict the movement of the linear motion link 82 by the engagement of the link protrusion 823 with the abutment portion 912 positioned frontward of the link protrusion 823, thereby securely maintaining the shutter 1064 at the open position.

In the image-forming apparatus 1000, the printer-body link 1008 and the opening/closing link 1004 are constituted by connections of a large number of mechanical parts and components such as the first pivot link 81, the linear motion link 82, the second pivot link 83, the shutter link 1041, the link cam 1042, and the coil spring 1043. Therefore, conceivably, an error may occur as to the pivoting amount of the link cam 1042 upon insertion of the process cartridge 50 in the housing 1002. In this case, the link cam 1042 may be pivotally moved further in the second direction W2 by the printer-body link 1008 even after the shutter 1064 arrives at the open position.

In this state, however, since the second arm part 1433 of the coil spring 1043 can elastically deform in the direction away from the second groove bottom 1425*a* of the second engagement groove 1425, the link cam 1042 is allowed to pivotally move further in the second direction W2 in the present embodiment. With this structure, the link cam 1042 can pivotally move further in the second direction W2 from the second position at which the shutter 1064 arrives at the open position, while the shutter 1064 is maintained at the open position (see FIGS. 31A and 31B). Accordingly, even though the link cam 1042 is further pivotally moved in the second direction W2 by the printer-body link 1008 after the shutter 1064 arrives at the open position, the opening/closing link 1004 is less likely to get damaged.

Figure 39:
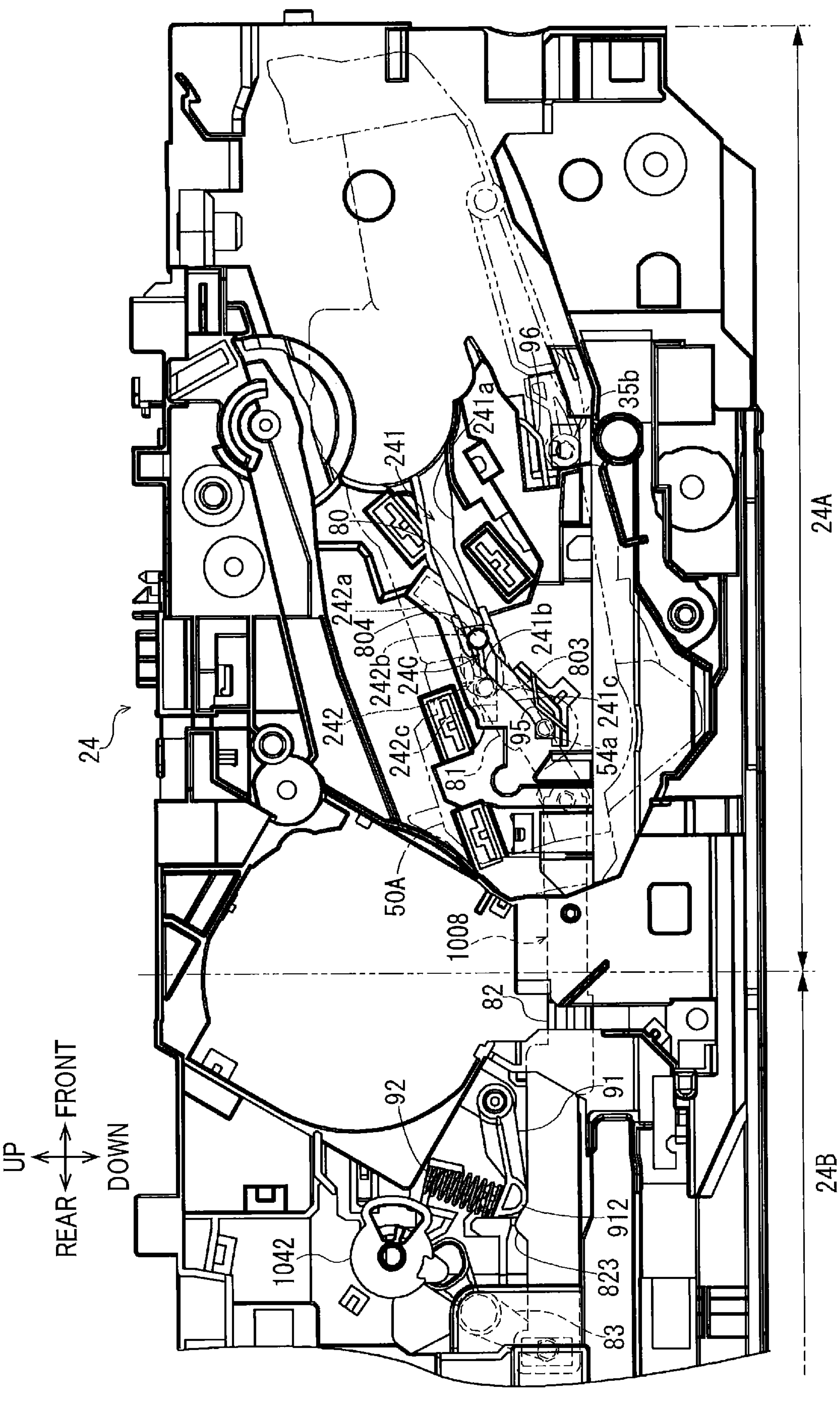
FIG. 39 is a side view of the first main frame, and particularly illustrating a state where the drum shaft is apart from the abutment piece, and the process cartridge is at its attached position.

In accordance with further insertion of the process cartridge 50 toward the attachment position from the position illustrated in FIG. 38, the drum shaft 54*a* moves from the intermediate portion 241*b* to the rear portion 241*c* of the cartridge rail 241, and then moves further in the attachment direction within the rear portion 241*c*. On the other hand, the first protrusion 803 of the abutment piece 80 remains in the rear portion 242*c* of the abutment piece rail 242, so that the drum shaft 54*a* separates away from the abutment piece 80. Thereafter, the process cartridge 50 reaches the attachment position as illustrated in FIG. 39 to complete the attachment of the process cartridge 50 to the housing 1002.

In this way, the process cartridge 50 can move from the attachment starting position where the leading end 50A of the process cartridge 50 is inserted in the housing 1002 to the attachment position where the process cartridge 50 is completely attached to the housing 1002 in the inserting direction. In the process of moving the process cartridge 50 from the attachment starting position to the attachment position, the shutter 1064 is moved from the closed position to the open position in accordance with the movement of the abutment piece 80 which is contacted and moved by the drum shaft 54*a* of the process cartridge 50; and further, the process cartridge 50 and the abutment piece 80 are separated from each other when the process cartridge 50 arrives at the attachment position after the shutter 1064 has moved to the open position.

Here, for comparison, assume a case where the process cartridge 50 at the attachment position is still in abutment with the abutment piece 80 of the printer-body link 1008 connected to the shutter 1064. In this example, unnecessary force may be imparted on the attached process cartridge 50 from the abutment piece 80 when the shutter 1064 is applied with a force for opening and closing the same. In contrast, according to the present embodiment, since the abutment piece 80 is in separation from the process cartridge 50 at the attachment position, it is unlikely that unnecessary force may be imparted from the abutment piece 80 on the process cartridge 50 attached to the housing 1002. Hence, the printer-body link 1008 according to the second embodiment is less likely to have adverse effects in printing accuracy.

Operations at the time of Detachment of the Process Cartridge 50

Next, how the printer-body link 1008 and the opening/closing link 1004 operate at the time of detachment of the process cartridge 50 from the housing 1002 will be described.

At the time of detachment of the process cartridge 50 from the housing 1002, the printer-body link 1008 and the opening/closing link 1004 are configured to operate in reverse to the operations at the time of attachment of the process cartridge 50.

Specifically, for detachment of the process cartridge 50, the process cartridge 50 at the attachment position illustrated in FIG. 39 is moved frontward relative to the housing 1002 to move the drum shaft 54*a* in the rear portion 241*c* of the cartridge rail 241 toward downstream in the detachment direction. Here, the detachment direction represents a direction in which the process cartridge 50 is moved toward the outside of the housing 1002 for withdrawal of the process cartridge 50 from the housing 1002. As illustrated in FIG. 38, when the drum shaft 54*a* moving along the cartridge rail 241 reaches the intermediate portion 241*b* (the through-hole 24C), the drum shaft 54*a* comes into contact with the second protrusion 804 of the abutment piece 80.

As illustrated in FIG. 36, the abutment piece 80 in abutment with the drum shaft 54*a* is pushed by the drum shaft 54*a* to be moved toward further downstream in the detachment direction of the process cartridge 50. Accordingly, the first protrusion 803 of the abutment piece 80 is moved from the rear portion 242*c* to the intermediate portion 242*b* (the through-hole 24C) of the abutment piece rail 242.

In accordance with the movement of the abutment piece 80, the first pivot link 81 is pivotally moved upward to increase the inclination angle of the first pivot link 81 with respect to the horizontal direction, and at the same time the first pivot link 81 is moved frontward. In response to the pivotal movement and frontward movement of the first pivot link 81, the linear motion link 82 is linearly moved forward. In accordance with the movement of the linear motion link 82, the connection hole 822 of the linear motion link 82 is brought into engagement with the engagement pin 832*a* of the second pivot link 83, so that the second pivot link 83 is pivotally moved in the clockwise direction in FIG. 35A to move the engagement pin 832*a* frontward. In accordance with the pivotal movement of the second pivot link 83, the connection hole 833*a* of the second pivot link 83 is brought into engagement with the protrusion 1422 of the link cam 1042, so that the link cam 1042 is pivotally moved in the first direction W1 to move the protrusion 1422 rearward.

As the process cartridge 50 is moved further in the detachment direction, the abutment piece 80 is moved further downstream in the detachment direction by the drum shaft 54*a* which is moving in the intermediate portion 241*b* (the through-hole 24C) of the cartridge rail 241. As illustrated in FIG. 34, when the second protrusion 804 of the abutment piece 80 arrives at the front portion 242*a* of the abutment piece rail 242, the abutment piece 80 pivotally moves the shutter link 1041, via the printer-body link 1008 and the opening/closing link 1004, to move the engagement portion 1413 downward (see FIG. 25A).

Specifically, in accordance with the movement of the abutment piece 80, the link cam 1042 is further pivotally moved in the first direction W1. In accordance with the pivotal movement of the link cam 1042 in the first direction W1, the coil spring 1043 is pivotally moved, so that the first arm part 1432 of the coil spring 1043 urges the boss 1414 of the shutter link 1041 downward. Due to this downward pressing of the boss 1414 by the first arm part 1432, the shutter link 1041 is pivotally moved such that the engagement portion 1413 is moved downward. In this way, the shutter 1064 is moved from the open position to the closed position.

In the image-forming apparatus 1000 described above, an error may occur in the pivoting amount of the link cam 1042 in accordance with the detachment of the process cartridge 50 from the housing 1002. Due to the error, the link cam 1042 may be pivotally moved further in the first direction W1 by the printer-body link 1008 even after the shutter 1064 is moved to the closed position.

In the second embodiment, however, since the first arm part 1432 of the coil spring 1043 can elastically deform in the direction away from the first groove bottom 1424*a* of the first engagement groove 1424, the link cam 1042 is allowed to pivotally move further in the first direction W1. As such, the link cam 1042 is further pivotally movable in the first direction W1 from the first position at which the shutter 1064 arrives at the closed position while the shutter 1064 is maintained at the closed position (see FIGS. 30A and 30B). With this structure, the opening/closing link 1004 is less likely to get damaged, even though the link cam 1042 is further pivotally moved in the first direction W1 by the printer-body link 1008 after the shutter 1064 reaches the closed position.

Figure 40:
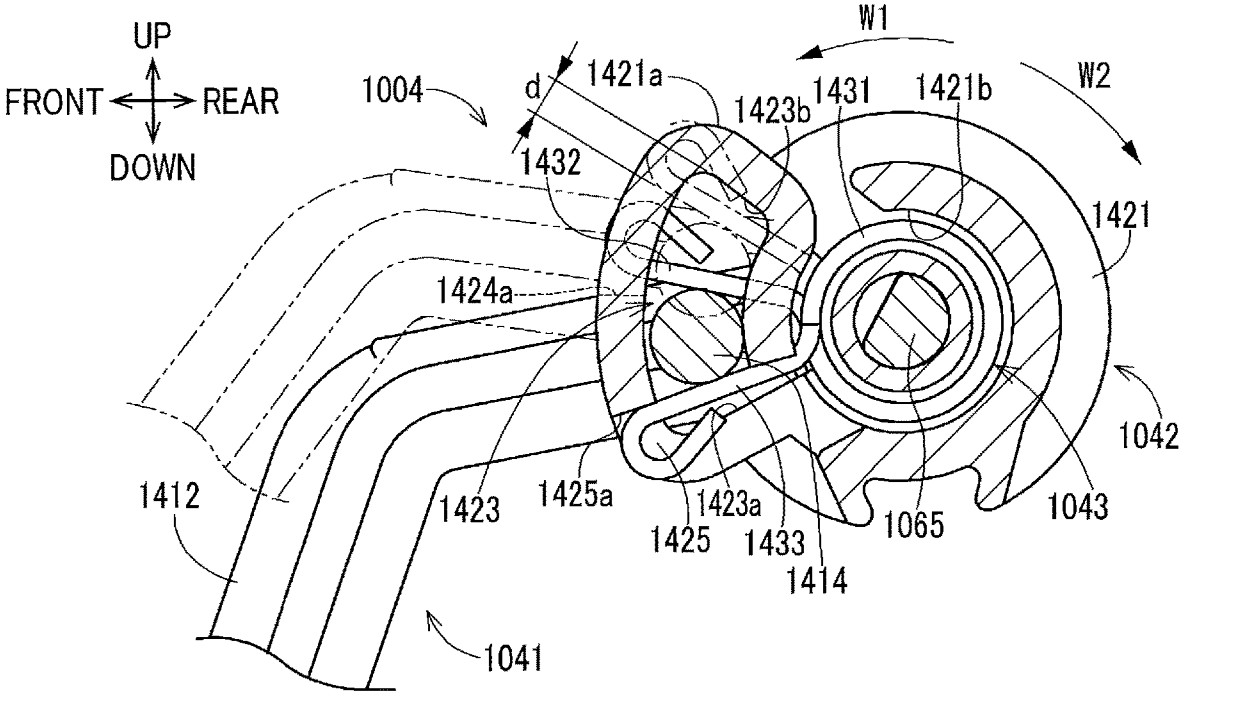
FIG. 40 is a cross-sectional side view illustrating a positional relationship between a boss of a shutter link and a second end face of a through-hole of a link cam in a state where the link cam is at its first position and the shutter has moved to the open position from the closed position.

In a state where the shutter 1064 is at the closed position and the link cam 1042 is at the first position after detachment of the process cartridge 50 from the housing 1002, conceivably, a user may inadvertently push the shutter 1064 toward the open position. In such a case, as illustrated in FIG. 40, the first arm part 1432 of the coil spring 1043 resiliently deforms in the direction away from the first groove bottom 1424*a* due to the pressing force applied from the boss 1414 of the shutter link 1041, so that the shutter 1064 can move toward the open position without causing the pivotal movement of the link cam 1042.

In this case, the boss 1414 of the shutter link 1041 is moved in the second direction W2 toward the second end face 1423*b* of the through-hole 1423. However, the boss 1414 does not abut on the second end face 1423*b*, but is spaced away from the second end face 1423*b* with a gap d provided therebetween in the circumferential direction of the link cam 1042.

That is, the second end face 1423*b* of the through-hole 1423 is positioned such that the second end face 1423*b* does not make contact with the boss 1414 of the shutter link 1041 when the shutter 1064 is urged to move from the closed position toward the open position while the link cam 1042 is at the first position. With this configuration, even if the shutter 1064 is urged to move to the open position in the state where the link cam 1042 is at the first position and the shutter 1064 is at the closed position, the boss 1414 of the shutter link 1041 does not abut on the link cam 1042, thereby restraining damage to the opening/closing link 1004.

In the image-forming apparatus 1000, during the attachment of the process cartridge 50 to the housing 1002, the drum shaft 54*a* abuts on the first protrusion 803 of the abutment piece 80, thereby causing the printer-body link 1008 to move the opening/closing link 1004 in the direction to move the shutter 1064 from the closed position to the open position. Further, during the detachment of the process cartridge 50 from the housing 1002, the drum shaft 54*a* abuts on the second protrusion 804 of the abutment piece 80, thereby causing the printer-body link 1008 to move the opening/closing link 1004 in the direction to move the shutter 1064 from the open position to the closed position.

As described above, the printer-body link 1008 is configured to operate in accordance with the attachment and detachment of the process cartridge 50 to and from the housing 1002. Specifically, the printer-body link 1008 is configured to move the shutter link 1041 in the second direction W2 in conjunction with the attachment of the process cartridge 50 to the housing 1002, and is configured to move the shutter link 1041 in the first direction W1 in conjunction with the detachment of the process cartridge 50 from the housing 1002. In this way, the printer-body link 1008 can function to open and close the shutter 1064 at optimum timings through the opening/closing link 1004.

Incidentally, in the second embodiment, the printer-body link 1008 is configured to operate in accordance with the attachment and detachment of the process cartridge 50 to and from the housing 1002. However, as a modification, the printer-body link 1008 may be configured to operate in interlocking relation to the movement of a movable member (other than the process cartridge 50) that can be operated by a user. For example, the printer-body link 1008 may be configured to operate in conjunction with user's opening/closing operations of the front cover 21. In this way, the printer-body link 1008 for moving the link cam 1042 may be configured to operate in interlocking relation to movement of a movable member of various kinds. This configuration can improve freedom in designing the mechanism for realizing opening and closing of the shutter 1064 in the image-forming apparatus 1000.

Incidentally, in the second embodiment, the shutter 1064 is configured to be opened and closed through the link cam 1042 and the shutter link 1041. However, as a modification, an elastically deformable member may be provided to connect between the printer-body link 1008 and the shutter 1064. Specifically, in accordance with the user's withdrawal of the process cartridge 50 from the housing 1002, the elastically deformable member may move together with the printer-body link 1008 in the direction to close the shutter 1064. When the printer-body link 1008 further moves even after the shutter 1064 abuts on the first abutment surface 1631 and comes to the closed position, the elastically deformable member may be deformed while the shutter 1064 remains the closed position.

Further, in the second embodiment, the link cam 1042 is allowed to move in the first direction W1 while the shutter 1064 is maintained at the closed position due to the abutment of the shutter 1064 on the first abutment surface 1631, and further, the link cam 1042 is also allowed to move in the second direction W2 while the shutter 1064 is maintained at the open position due to the abutment of the shutter 1064 on the second abutment surface 1632. Alternatively, the link cam 1042 may be restricted from moving in the second direction W2 while the shutter 1064 is maintained at the open position by the abutment of the shutter 1064 on the second abutment surface 1632, as long as the link cam 1042 is allowed to move at least in the first direction W1 while the shutter 1064 is maintained at the closed position.

Further, in the second embodiment, the link cam 1042 is supported by the rotation shaft 1065 which is also a component for operating the nipping pressure changing mechanism 1066. However, as an alternative, a rotation shaft other than the rotation shaft 1065 may be provided to operate the nipping pressure changing mechanism 1066.

Further, in the second embodiment, the printer-body link 1008 includes the abutment piece 80, the first pivot link 81, the linear motion link 82, and the second pivot link 83. Alternatively, the printer-body link 1008 may be configured as a single link member.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents.

[Remarks]

The image-forming apparatus 1, 1000 is an example of an image-forming apparatus. The housing 2, 1002 is an example of a housing. The process cartridge 50 is an example of a cartridge. The drum shaft **54*a* is an example of a guide protrusion. The fixing device 6, 1006 is an example of a fixing device. The heating unit 61 is an example of a heating member. The pressure roller 62 is an example of a pressing member. The fixing frame 63, 1063 is an example of a fixing frame. The shutter 64, 1064 is an example of a shutter. The first opening 63*a* is an example of an opening of the fixing frame. The front frame 24A is an example of a guide frame. The cartridge rail 241 is an example of a cartridge rail. The abutment piece rail 242 is an example of an abutment piece rail. The connection link 8 is an example of a connection link. The abutment piece 80 is an example of an abutment piece. The first pivot link 81 is an example of a first pivot link. The linear motion link 82 is an example of a linear motion link. The second pivot link 83 is an example of a second pivot link. The third pivot link 84 is an example of a third pivot link. The shutter link 85 is an example of a shutter link. The drum shaft 54*a* is an example of a guide protrusion. The lock 9 is an example of a lock. The arm 91 is an example of an arm, and the locking spring 92 is an example of a locking spring. The urging spring 95 is an example of an urging spring. The opening/closing link 1004 is an example of an opening/closing link. The shutter link 1041 is an example of a shutter link. The link cam 1042 is an example of a link cam. The coil spring 1043 is an example of a spring. The printer-body link 1008 is an example of a printer-body link. The link cam body 1421 is an example of a link cam body. The protrusion 1422 is an example of a protrusion. The base portion 1411 and arm portion 1412 are an example of a shutter link body. The boss 1414 is an example of a boss of the shutter link. The connection shaft 1642 is an example of a first connecting portion, and the boss 1414 is an example of a second connecting portion. The first abutment surface 1631 is an example of a first abutment surface of the fixing frame. The second abutment surface 1632** is an example of a second abutment surface of the fixing frame. The first direction W1 is an example of a first direction, and the second direction W2 is an example of a second direction.

What is claimed is:

1. An image-forming apparatus comprising:

a housing;

a cartridge attachable to and detachable from the housing, the cartridge having a guide protrusion; and a fixing device configured to fix a toner image to a sheet conveyed in a sheet conveying direction, the fixing device comprising:

a heating member;

a fixing frame covering the heating member, the fixing frame having an opening positioned upstream relative to the heating member in the sheet conveying direction; and a shutter movable between an open position where the shutter opens the opening and a closed position where the shutter closes the opening, wherein the housing comprises:

a guide frame configured to guide the guide protrusion for attachment of the cartridge to the housing, the guide frame having a through-hole; and a connection link connected to the shutter and configured to move the shutter from the closed position to the open position in conjunction with the attachment of the cartridge to the housing, and to move the shutter from the open position to the closed position in conjunction with detachment of the cartridge from the housing, the connection link being positioned opposite the cartridge attached to the housing with respect to the guide frame, the connection link being configured to abut on the guide protrusion of the cartridge through the through-hole during the attachment of the cartridge to the housing, wherein the connection link comprises:

an abutment piece configured to about on the guide protrusion of the cartridge, a first pivot link connected to the abutment piece and pivotally movable in response to movement of the abutment piece; and a linear motion link connected to the first pivot link and linearly movable in response to pivotal movement of the first pivot link.

2. The image-forming apparatus according to claim 1, wherein the housing further comprises a lock configured to restrict movement of the connection link after the connection link moves the shutter to the open position and to the closed position.

3. The image-forming apparatus according to claim 1, wherein the housing further comprises a lock configured to restrict movement of the connection link after the connection link moves the shutter to the open position and to the closed position, and wherein the lock is configured to press the linear motion link to restrict movement of the linear motion link.

4. The image-forming apparatus according to claim 3, wherein the linear motion link has a link protrusion protruding toward the lock, wherein the lock comprises:

an arm having a tip end portion; and a spring urging the tip end portion toward the linear motion link, and wherein the tip end portion of the arm is configured to contact and climb up and down the link protrusion in accordance with the movement of the linear motion link such that the tip end portion can move over a top of the link protrusion.

5. The image-forming apparatus according to claim 1, wherein the abutment piece comprises:

a first protrusion configured to abut on the guide protrusion of the cartridge during the attachment of the cartridge to the housing; and a second protrusion positioned upstream relative to the first protrusion in an attachment direction of the cartridge to the housing, the second protrusion being configured to abut on the guide protrusion of the cartridge during the detachment of the cartridge from the housing.

6. The image-forming apparatus according to claim 1, wherein the guide frame has:

a cartridge rail configured to guide the guide protrusion of the cartridge; and an abutment piece rail configured to guide the abutment piece of the connection link, a part of the cartridge rail and a part of the abutment piece rail being overlapped with each other to provide the through-hole.

7. The image-forming apparatus according to claim 1, wherein the connection link further comprises:

a second pivot link connected to the linear motion link and pivotally movable in response to the movement of the linear motion link;

a third pivot link connected to the second pivot link and pivotally movable in response to pivotal movement of the second pivot link; and a shutter link connected to the third pivot link and movable in response to pivotal movement of the third pivot link to move the shutter between the open position and the closed position.

8. The image-forming apparatus according to claim 1, wherein the cartridge comprises:

the photosensitive drum defining an axis extending in an axial direction; and a drum shaft made from metal and extending in the axial direction to define the axis, the drum shaft functioning as the guide protrusion.

9. An image-forming apparatus comprising:

a housing;

a cartridge attachable to and detachable from the housing, the cartridge being configured to be inserted in an inserting direction thereof into the housing from an attachment starting position to an attachment position for attachment to the housing, a leading end of the cartridge in the inserting direction being inserted in the housing at the attachment starting position, the cartridge being completely attached to the housing at the attachment position;

a fixing device configured to fix a toner image to a sheet conveyed in a sheet conveying direction, the fixing device comprising:

a heating member;

a fixing frame covering the heating member, the fixing frame having an opening positioned upstream relative to the heating member in the sheet conveying direction; and a shutter movable between an open position where the shutter opens the opening and a closed position where the shutter closes the opening; and a connection link connected to the shutter and configured to move the shutter from the closed position to the open position in conjunction with attachment of the cartridge to the housing, and to move the shutter from the open position to the closed position in conjunction with detachment of the cartridge from the housing, wherein the cartridge is configured to abut on and move the connection link to move the shutter from the closed position to the open position in a process where the cartridge moves from the attachment starting position toward the attachment position in the inserting direction, and wherein the cartridge is configured to be separated from the connection link when the cartridge arrives at the attachment position after the shutter moves to the open position.

10. The image-forming apparatus according to claim 9, further comprising a lock configured to fix the connection link in position, wherein the lock fixes the connection link in position after the shutter moves to the open position in response to movement of the connection link abutted by the cartridge in the process where the cartridge moves from the attachment starting position toward the attachment position in the inserting direction, and wherein the cartridge is separated from the connection link at a position downstream in the inserting direction than a position of the cartridge when the lock fixes the connection link in position.

11. The image-forming apparatus according to claim 9, further comprising a lock configured to fix the connection link in position, the lock comprising:

an arm configured to abut on the connection link to lock movement of the connection link; and a locking spring urging the arm toward the connection link, wherein the housing comprises an urging spring configured to urge the cartridge toward the attachment position, wherein the locking spring is configured to provide a maximum urging force thereof to the connection link in a process until the connection link moves the shutter to the open position, wherein the urging spring is configured to provide a maximum urging force thereof to the cartridge in a process until the cartridge moves to the attachment position in the inserting direction, and wherein the cartridge is positioned further upstream in the inserting direction when the locking spring provides the maximum urging force to the connection link than when the urging spring provides the maximum urging force to the cartridge.

12. The image-forming apparatus according to claim 9, further comprising a lock configured to fix the connection link in position, the lock comprising:

an arm configured to abut on the connection link to lock movement of the connection link; and a locking spring urging the arm toward the connection link, wherein the cartridge comprises a driven roller, wherein the housing comprises a roller spring configured to urge the driven roller when the cartridge is at the attachment position, wherein the locking spring is configured to provide a maximum urging force thereof to the connection link in a process until the connection link moves the shutter to the open position, wherein the roller spring is configured to provide a maximum urging force thereof to the driven roller in a process until the cartridge moves to the attachment position in the inserting direction, and wherein the cartridge is positioned further upstream in the inserting direction when the locking spring provides the maximum urging force to the connection link than when the roller spring provides the maximum urging force to the driven roller.

13. An image-forming apparatus comprising:

a fixing device configured to fix a toner image to a sheet conveyed in a sheet conveying direction, the fixing device comprising:

a heating member;

a pressing member configured to nip the sheet in cooperation with the heating member;

a fixing frame covering the heating member and the pressing member, the fixing frame having an opening positioned upstream of the heating member in the sheet conveying direction, the fixing frame having a first abutment surface; and a shutter movable between a closed position where the shutter closes the opening and an open position where the shutter opens the opening, the shutter being configured to abut on the first abutment surface at the closed position; and an opening/closing link connected to the shutter and configured to move the shutter between the open position and the closed position, the opening/closing link being movable in a first direction to move the shutter to the closed position and in a second direction opposite the first direction to move the shutter to the open position, wherein, in a case where the shutter abuts on the first abutment surface to be placed at the closed position, the opening/closing link is further movable in the first direction while the shutter is maintained at the closed position.

14. The image-forming apparatus according to claim 13, wherein the first abutment surface faces upstream in the sheet conveying direction.

15. The image-forming apparatus according to claim 13, wherein the opening/closing link comprises:

a shutter link connected to the shutter and configured to move the shutter between the open position and the closed position;

a link cam connected to the shutter link and movable in the first direction and the second direction; and a spring movable in accordance with movement of the link cam and configured to urge the shutter link, wherein, in the case where the shutter abuts on the first abutment surface to be placed at the closed position, the spring abuts on the shutter link to urge the shutter link in the first direction, and the spring resiliently deforms to allow the link cam to move further in the first direction while the shutter is maintained at the closed position.

16. The image-forming apparatus according to claim 15, further comprising a housing that accommodates the fixing device therein, the housing comprising a printer-body link configured to move the link cam, wherein the link cam comprises:

a link cam body pivotally movably supported by the fixing frame about a pivot axis extending in an axial direction, the link cam body having a through-hole penetrating through the link cam body in the axial direction; and a protrusion protruding from the link cam body in the axial direction, the protrusion being engaged with the printer-body link, wherein the shutter link comprises:

a shutter link body pivotally movably supported by the fixing frame about the pivot axis; and a boss protruding from the shutter link body in the axial direction and received in the through-hole of the link cam body, wherein the spring is a coil spring having a coil part supported by the link cam body and an arm part extending radially outwardly from the coil part, the arm part being positioned in the through-hole of the link cam body, wherein the link cam body has an engagement groove that is recessed in a circumferential direction of the link cam body corresponding to the first direction and the second direction, the engagement groove having a groove bottom positioned most downstream in the first direction thereof and engageable with the arm part to restrict the arm part from moving in the first direction relative to the link cam body, wherein the arm part is configured to resiliently deform in the engagement groove to allow the link cam body to move in the first direction relative to the arm part while the shutter is maintained at the closed position, wherein the link cam is movable between a first position and a second position, the link cam being movable in the first direction to reach the first position for moving the shutter to the closed position, and the link cam being movable in the second direction to reach the second position for moving the shutter to the open position, wherein the link cam body has a first end face and a second end face defining the through-hole, the first end face and the second end face opposing each other in the circumferential direction of the link cam body, the first end face being positioned downstream relative to the second end face in the first direction, and wherein the second end face is separated from the boss of the shutter link when the shutter is urged to move toward the open position from the closed position while the link cam is at the first position.

17. The image-forming apparatus according to claim 15, further comprising a housing that accommodates the fixing device therein, the housing comprising a printer-body link configured to move the link cam, wherein the link cam comprises:

a link cam body pivotally movably supported by the fixing frame about a pivot axis extending in an axial direction, the link cam body having a through-hole penetrating through the link cam body in the axial direction; and a protrusion protruding from the link cam body in the axial direction, the protrusion being engaged with the printer-body link, wherein the shutter link comprises:

a shutter link body; and a boss protruding from the shutter link body in the axial direction and received in the through-hole of the link cam body, and wherein the printer-body link is configured to move the shutter link in the second direction in conjunction with attachment of a cartridge to the housing, and to move the shutter link in the first direction in conjunction with detachment of the cartridge from the housing.

18. The image-forming apparatus according to claim 15, wherein the shutter link and the shutter are connected to each other at a first connecting portion, wherein the shutter link and the link cam are connected to each other at a second connecting portion, and wherein the heating member and the pressing member are configured to nip the sheet therebetween at a nipping point, the first connecting portion being positioned opposite the second connecting portion with respect to the nipping point in the sheet conveying direction.

19. The image-forming apparatus according to claim 15, wherein the fixing frame has a second abutment surface on which the shutter is configured to abut at the open position, and wherein, in a case where the shutter abuts on the second abutment surface to be placed at the open position, the spring abuts on the shutter link to urge the shutter link in the second direction, and the spring resiliently deforms to allow the link cam to move in the second direction while the shutter is maintained at the open position.

* * * * *